United States Patent [19]

Boulton et al.

[11] Patent Number: 5,566,291
[45] Date of Patent: Oct. 15, 1996

[54] METHOD AND APPARATUS FOR IMPLEMENTING USER FEEDBACK

[75] Inventors: David A. Boulton, Apros; Wayne Vucenic, Cupertino; John P. Stallings, Campbell, all of Calif.

[73] Assignee: Diacom Technologies, Inc., Scotts Valley, Calif.

[21] Appl. No.: 466,463

[22] Filed: Jun. 6, 1995

Related U.S. Application Data

[60] Division of Ser. No. 362,801, Dec. 22, 1994, which is a continuation-in-part of Ser. No. 173,962, Dec. 23, 1993, abandoned.

[51] Int. Cl.⁶ ....................................................... G06F 3/14
[52] U.S. Cl. .......................... 395/161; 395/159; 395/155; 434/118
[58] Field of Search ..................... 395/161, 159, 395/155, 156, 153, 157; 434/118, 322, 323, 350

[56] References Cited

U.S. PATENT DOCUMENTS

| | | | |
|---|---|---|---|
| 4,503,499 | 3/1985 | Mason et al. | 395/100 X |
| 4,809,170 | 2/1989 | Leblang et al. | 395/700 |
| 4,845,665 | 7/1989 | Heath et al. | 395/157 |
| 4,860,203 | 8/1989 | Corrigan et al. | 395/700 |
| 4,866,635 | 9/1989 | Kahn et al. | 395/51 |
| 4,939,689 | 7/1990 | Davis et al. | 395/600 |
| 5,008,853 | 4/1991 | Bly et al. | 395/153 |
| 5,047,918 | 9/1991 | Schwartz et al. | 395/600 |
| 5,047,977 | 9/1991 | Hill et al. | 395/600 X |
| 5,086,393 | 2/1992 | Kerr et al. | 434/118 X |
| 5,175,814 | 12/1992 | Anick et al. | 395/161 |
| 5,202,828 | 4/1993 | Vertelney et al. | 395/159 X |
| 5,220,675 | 6/1993 | Padawer et al. | 395/155 X |
| 5,231,578 | 7/1993 | Levin et al. | 364/419.1 |
| 5,237,678 | 8/1993 | Kuechler et al. | 395/600 |
| 5,261,093 | 11/1993 | Asmuth | 395/600 |
| 5,363,507 | 11/1994 | Nakayama et al. | 395/153 X |
| 5,433,615 | 7/1995 | Clark | 434/322 |

*Primary Examiner*—Raymond J. Bayerl
*Attorney, Agent, or Firm*—Hickman Beyer & Weaver

[57] ABSTRACT

A method and apparatus for implementing user feedback. A user may activate an enter feedback mode command in a computer environment to provide feedback in a feedback interface. A feedback record is created and the user's context within a product, process, service, or issue to which the feedback refers is recorded in the feedback record. Attribute icons that the user may select to identify the nature of the feedback are displayed in the feedback interface. Selected attributes, the time at which the feedback is made, the physical location and identity of the user, and comments by the user are recorded in the feedback record. A feedback visualizer for a reviewer for organizing and presenting user feedback receives feedback from users, the feedback being collected and stored in a database. The visualizer identifies a reviewer's visualization preferences, which include indications of feedback attributes that the reviewer desires to review. Collected feedback records are then filtered in accordance with the visualization preferences to create a combined set of records that include the records having the preferred attributes. The visualizer graphically displays an indication of the number of records in the combined set. A reviewer can change his visualization preferences, and the feedback records are refiltered and displayed in accordance with the changed preferences. The reviewer can also select a specific feedback record to display message content stored in the record and respond to the feedback.

40 Claims, 34 Drawing Sheets

METHOD AND APPARATUS FOR IMPLEMENTING USER FEEDBACK

CROSS REFERENCE TO RELATED APPLICATIONS

This application is a divisional application of patent application Ser. No. 08/362,801, filed Dec. 22, 1994 on behalf of Boulton et al., entitled, "Method and Apparatus for Implementing User Feedback", which is a continuation-in-part of patent application Ser. No. 08/173,962, filed Dec. 23, 1993, now abandoned, on behalf of Boulton et al., entitled "Method and Apparatus for Implementing User Feedback", which is incorporated herein by reference in its entirety.

BACKGROUND OF THE INVENTION

1. Field of the Invention

This invention relates generally to a system that facilitates the collection, organization, and visualization of user feedback. In one described implementation a system for permitting users of computer software to make feedback as to the content of the software while the software is in use is described.

2. Background of the Related Art

Organizational learning systems are incorporated in such organizations as schools, which teach students a curriculum, and businesses, which teach employees skills. An organizational learning system typically includes at least two basic roles: a learner and a teacher. The learner wishes to learn new concepts, procedures, or other information. The teacher ideally wishes to present the information to the learner in a way that best meets a learner's individual learning needs. However, it often occurs that the learner "stutters" in the learning process or "flow": the learner comes upon a concept, instructions, or information that he or she does not understand, either partially or completely. It is in the teacher's interest to know which information the learner had trouble understanding, if the learner had trouble due to the presentation method or style, and how the presented information can be improved to facilitate learning. Once the teacher has obtained and understood these aspects of the taught information, the teacher can change and improve the presentation of the information to more fully meet the learners' learning needs and facilitate the learning process. A critical resource for the teacher to discover how to improve taught information and the learning organization is learner "feedback", which is the information, comments, suggestions, and questions sent from the learners to the teacher about the taught information.

The most essential feature of any self-regulating, self-correcting, or self-optimizing system is feedback. Without feedback, the system is stagnant: learners or users will continue to have problems learning or interfacing within the system, and have no way to voice those problems to effect improvements. Learners know which parts of taught information gave them the most trouble or could best be improved, and it is essential in the system's implementation to capture and analyze their feedback. It is critical that the learning system gathers feedback and presents the feedback to people who can improve the learning system so that the system may continually improve.

For example, a business organization must continually improve and refine its products and internal processes to remain competitive. A business' ability to optimize its products and services is directly related to how well it can "learn" from its customers' experiences of those products and services through customer feedback. Feedback is also necessary for internal departments and processes within a business. The more effectively that employees can learn a new procedure or suggest improvements to, for example, manufacturing processes, the better will the business perform competitively.

Feedback is just as necessary in education. A student may often reach a point in course material where he or she does not understand the concepts being taught. If the student can indicate to the teacher where the difficult material is, the teacher can be more aware of difficult concepts and can improve the course. Or, the student might eventually struggle to understand a concept and have his or her own suggestions of how to better present the material. If these learning needs of the learner are not addressed using feedback, the learner may become used to skipping over difficult concepts, ignoring their own questions about the concepts since those questions are not answered within the system. If the learner can provide feedback about a course, the course can be improved and the outcome is better learners.

Feedback is also very necessary in other environments besides learning environments. For example, a testing environment in which a product or service, such as software, is being tested for operability, reliability, ease of use, etc., can implement user feedback. Product users and testers can send feedback about products or services which can greatly aid developers in testing and developing those products and services. Similarly, any product, process, service, or issue experienced by users can be improved through the collection and analysis of feedback.

In the past, the need to collect feedback from learners and other types of users has been recognized by organizations. Typically, however, feedback-gathering systems have been inefficient at best. One of the most prevalent problems in prior feedback-gathering systems is motivating users to supply accurate and worthwhile feedback. There are several reasons why users typically resist feedback. One reason is that users complain that giving feedback takes too much time and is too distracting. Conventional feedback-gathering methods typically take the form of supplying the user a questionnaire or similar response opportunity after at least a large portion of the material being taught has been presented or after a service has been experienced. For feedback to be given in any amount of detail, relatively lengthy questionnaires are required which can take a great a deal of time to complete. In addition, since such questionnaires are typically filled out long after any problems were experienced, it may be difficult for the user to remember the details of a problem or suggestion. For example, it may be difficult for a learner to remember all the details of course materials and in which areas he or she had trouble and/or suggestions.

Another reason users typically are not motivated to supply feedback is that they know what is wrong or what needs to be changed, but they don't know enough about the entire situation or concept to explain the problem. That is, a user often does not know or cannot explain the context of the problem or suggestion that is necessary to "place" the feedback in the mind of the recipient. The step of describing the context of a user's problem can therefore take a lot of time and potentially cause misunderstandings between the reviewer or provider and the user.

Other reasons why users are not motivated to supply feedback are that users often do not know whom to give the feedback to and are reluctant to provide critical and useful feedback for fear of possible reprisals. The user may want only certain reviewers to receive his or her feedback, but typically has no control over the visibility of the feedback to reviewers. Also, in many cases, a user may believe that the reviewer does not really want to hear the feedback. A user may believe that nothing will result from their feedback— i.e. that there is little reason to voice their opinion, since they cannot change anything. If users are not motivated to provide feedback, they may start to neglect their own questions and become used to ignoring questions or suggestions they may have about a course subject, product, issue, etc. The user may become accustomed to accepting a product or service with which they are dissatisfied without trying to add their own input about how to improve the product or service.

The prior art feedback systems not only have problems in gathering feedback, they also generally fail to provide an efficient and functional way to organize and present feedback to a teacher, supervisor, or reviewer. Once the gathering of feedback has been accomplished, the reviewer must somehow organize that feedback into logical and relevant categories. This can be quite a problem when a large number of feedback items are collected. Once the feedback is organized, the reviewer must determine a method to present the feedback in a way that will show significant patterns within the feedback and help the reviewer to draw conclusions from the feedback. Since the organization and presentation of feedback can involve substantial amounts of time and effort for the people involved, an organization may have no specific method to view feedback and may just examine a few responses to determine what an "average" user is "complaining about." This method does not consider the individual user and his or her learning needs or other needs. Or, an organization may organize feedback into specific categories, each category having a simple percentage indicating how many learners provided a specific response. Such a system does not allow a reviewer to view feedback in more than a few simple patterns which may not be the most effective way to draw conclusions from feedback. In addition, an individual teacher may want to view a particular subset of the total collected feedback in a way specific to his or her own course material or personal duties. When a system does not provide for presenting feedback to an individual reviewer's needs, the time and effort required to organize and view feedback in relevant ways can in itself be a deterrent to taking steps to improve the learning system.

In view of the described drawbacks of existing feedback systems, what is needed is a feedback system that minimizes the effort and time required of individual users to enter feedback and provides motivation for the users to supply the feedback. The system would provide easy, quick feedback opportunities as the user is learning or using the provided product or service. What is also needed is a feedback system that organizes and presents collected feedback to reviewers quickly and in a form relevant to the reviewer's needs so that the reviewer may easily draw conclusions about aspects of the product or service provided to the user which require improvement.

SUMMARY OF INVENTION

The present invention addresses the problems in the prior art by providing a method and apparatus for implementing user feedback. A feedback interface of the present invention quickly and easily collects feedback from a user. A feedback viewing interface of the present invention receives feedback data from one or more users and presents the feedback data to a reviewer according to specific preferences of the reviewer. The feedback system of the present invention collects feedback from users and presents feedback to reviewers in forms capable of promoting improvement in systems incorporating these roles.

A preferred method and apparatus of the present invention acquires user feedback from a user relating to the user's experiences in a specified context or location. The feedback includes a portrayal of a user comment about the user's experiences at the user's context or location, and a reviewer who is interested in user feedback will typically evaluate the feedback. An enter feedback mode command may be activated by the user to provide feedback. When an enter feedback mode command is received, such as selecting a feedback icon in a graphical user interface, a feedback record is made. The location or context of the user in a product, process, service, physical location, issue, etc. referred to by the feedback is recorded in the feedback record. A multiplicity of attribute indicia are displayed that the user may select to quickly and simply identify the nature of the feedback and minimize the user's time and effort. The attributes selected by the user are recorded in the feedback record. In various preferred embodiments, the method may also include the step of recording in the feedback record the time at which the feedback is made, an indication of the physical location of the user, an identification of the user, and/or comments made by the user. Preferably, a feedback dialog box is displayed having attribute icons that serve as the attribute indicia and a feedback message box arranged to receive comment inputs from the user. The user can input the feedback while using a wide variety of devices and environments, including application programs, educational software, a manual, or test software. The feedback dialog box also preferably includes a list of prompted feedback items which are feedback items that have been entered by other users and/or have been entered many times. The list allows a user to quickly review and select a feedback item if it matches his or her own feedback and thus reinforce the importance of that feedback item to users of the feedback system.

A method and apparatus for organizing and presenting user feedback to a reviewer is also described. The feedback has been preferably arranged into a multiplicity of feedback records, each record being arranged to contain feedback information referring to the user's location or context within a product, process or service, or issue and a plurality of attribute identifiers that identify the nature of the feedback provided. The method includes the step of identifying a reviewer's visualization preferences that include indications of the attribute identifiers that the reviewer desires to review. The feedback records are then filtered in accordance with the visualization preferences to create a combined set of records that include each of the records having attributes in accordance with the preferences. The method further includes displaying an indication of the number of records in the combined set that include the indicated attribute identifiers. In preferred embodiments, the method also includes the steps of receiving an indication of a change in the reviewer's visualization preferences, refiltering the feedback records in accordance with the changed visualization preferences, and displaying an indication of the number of records in the refiltered combined set. The attribute identifiers are preferably displayed in bar chart form or pie chart form, and are preferably arranged into attribute categories, wherein just one attribute identifier in each attribute category may be stored in the feedback record. The bar graphs may be selected or deselected to add or subtract, respectively, records that include that particular attribute from the combined set of presented feedback records. The visualization preferences include an indication of a time range of interest to the reviewer and an indication of the context of the user in a product, process, or service that is of interest to the reviewer. The reviewer can also preferably select a specific feedback record to display a message content stored in the selected feedback record and directly respond to the feedback.

A method and apparatus for implementing a feedback system including at least one user and at least one reviewer in a computer environment is also described. The method includes the step of collecting a feedback item from a user while the user is using a software program on a first computer system, where the feedback item includes a context or location of the user within a product, process, or service. The feedback item is then provided to a reviewer on a second computer system and presented to the reviewer according to preferences of the reviewer. The first computer and the second computer are preferably connected in a computer network. A feedback interface is preferably displayed to the user on the first computer system, and at least one attribute is preferably provided which the user can assign to the feedback item. The feedback item is stored in a feedback record, which also preferably stores the time and physical location of the user and an inputted message from the user. The feedback record is preferably stored on a database with other feedback records, which are read from the database and presented to the reviewer by displaying a viewing interface on the second computer system. The viewing interface preferably displays bar charts which each indicate the number of feedback items having a particular attribute. A message content of feedback items can also be displayed when the reviewer selects particular feedback items. The reviewer can preferably select a subset of feedback items which are presented in the viewing interface, and can select to display only a set of feedback items having a particular attribute, user location, context, and/or time of creation.

The present invention collects user feedback from individual users in a quick, functional, and versatile manner. The users can enter feedback with minimal distraction, effort or time and can quickly specify the intended meaning, the precise context, and the desired response for the feedback. Users thus have direct motivation for entering feedback. Since users are able to provide feedback quickly and conveniently, a learner or other user can become more used to questioning problems and suggesting solutions. A learner, for example, thus becomes more internally aware of his or her meaning needs, and the outcome is better learners that will follow through with their own questions rather than ignoring those questions.

The present invention also has the advantage of organizing and presenting user feedback to reviewers who desire to view feedback to improve a provided process, product or service and/or help the users of the system, product, process or service. The feedback visualizer of the present invention presents overall patterns in received user feedback and also presents specific feedback message content from individual users. The reviewer can select to view different attributes and properties of the feedback as required by the reviewer's needs. With the ability to view feedback quickly, conveniently, and flexibly, a reviewer can more easily draw conclusions from the feedback and implement improvements to the provided process, product or service.

These and other advantages of the present invention will become apparent to those skilled in the art after reading the following descriptions and studying the various figures of the drawings.

BRIEF DESCRIPTION OF THE DRAWINGS

FIG. 9 is a screen display showing a feedback interface window in feedback mode for the learner interface of FIGS. 8a and 8b;

FIG. 10 is a screen display showing an attribute segment list for the feedback window FIG. 9;

FIG. 29b is a screen display showing an embodiment of a feedback interface similar to the feedback interface shown in FIG. 29a;

DETAILED DESCRIPTION OF THE PREFERRED EMBODIMENTS

The user feedback system of the present invention is well-suited for personal computer systems such as the keyboard-based, pen-based, voice-based and mouse-based systems that are currently popular. For the purposes of illustration, the invention will be described in connection with personal computer systems. The present invention, however, can also be used with other computer systems, such as mainframe computer systems, palm top computer systems, game machines, personal digital assistants, etc.

Figure 1:
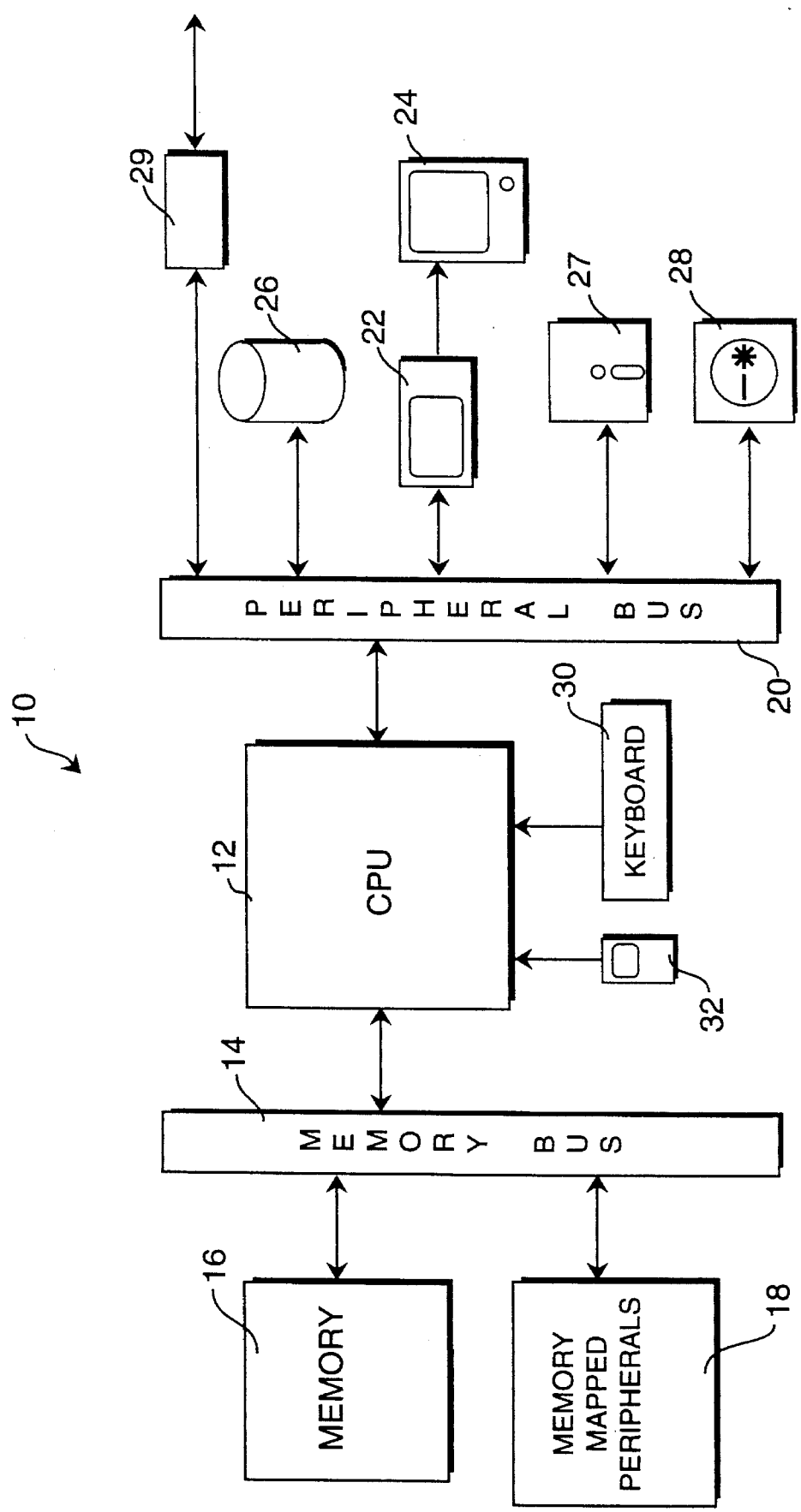
FIG. 1 is a block diagram of a computer system suitable for use with the present invention.

As shown in FIG. 1, a computer system 10 suitable for implementing the components of the feedback system of the present invention includes a central processing unit (CPU) 12, a bi-directional memory bus 14 which couples the CPU to memory 16 and memory mapped peripherals 18, and a bi-directional peripheral bus 20 which connects the CPU to a variety of peripheral devices. The memory 16 typically takes the form of both read only memory (ROM) and random access memory (RAM). Memory mapped peripherals typically include video adapters and data storage devices. A variety of peripheral devices can be coupled to the peripheral bus 20. By way of example, peripheral devices that are frequently connected to the peripheral bus include a video card 22 which controls a display monitor 24, a hard disk drive 26, a floppy disk drive 27, a CD ROM 28, and/or a network interface card 29 for linking the computer system 10 to other computer systems. Additionally, a keyboard 30 and a pointer device 32 such as a mouse or track ball are typically connected directly to the CPU 12 or through an input/output interface. Both the keyboard and the pointer device are arranged to function as user input devices. As will be appreciated by those skilled in the art, a wide variety of other peripheral devices can be connected to either the peripheral bus or the memory bus and the buses which connect the described peripherals to the CPU can be switched and/or additional buses can be added. For example, a display tablet with a stylus can also be connected to peripheral bus 20 to provide output displays and/or input functions when the user uses the stylus or other pointing implement to "write" on the tablet. A voice input device can also be connected to computer system 10 to allow a user to input vocal commands, data, etc.

Figure 2:
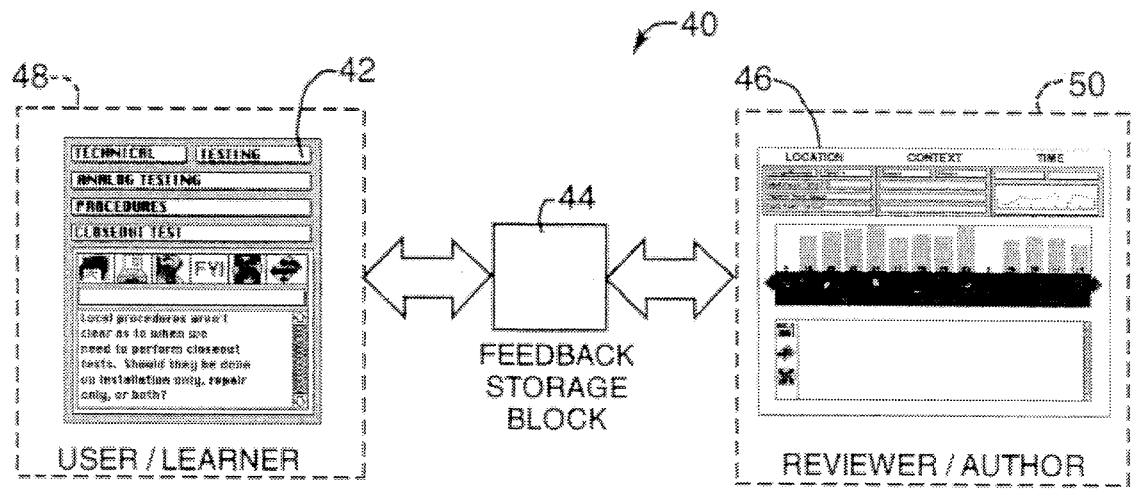
FIG. 2 is a pictorial representation of a user feedback system of the present invention.

FIG. 2 is a schematic diagram of the components of a user feedback system 40 of the present invention. It is important to note that, although the embodiment of the user feedback system described herein is mostly addressed to learning environments for explanatory purposes, the described invention can easily be used for other user environments on a computer system, such as a product testing environment or the like. Thus, the term "learning environment" can also apply to other computer environments or devices, and the term "learner", as used herein, can also apply to any user of a computer environment or device that may find a use for sending feedback to other people using the computer system or to people who have provided a process, product, service, or issue which the user can return feedback about.

Feedback system 40 includes a user feedback interface 42, a feedback control block 44, and a viewing interface 46. One or more user feedback interfaces 42 are provided at one end of the system. In the described embodiment, the feedback interface is provided within a larger computer environment 48. One computer environment described herein is a learning environment, which can include such organizational systems as a computer educational system implemented on several networked computers and used to teach course material to students. Another learning environment may take the form of an employee in a business organization, such as a field worker that carries a portable computer or PDA that includes an installation/maintenance/repair or the like manual that can be used as an instructional material for field work. In the first learning environment, a student or other learner can be situated at one computer terminal, such as computer system 10, and "navigate" through a school course or subject, i.e. move from lesson to lesson or concept to concept within the course. The courses can be provided on each terminal by a teacher or "author" of the course by any one of a variety of well-known interface techniques.

If, at any time while navigating through a course or other "meaning space" (body of information), a learner reaches a point in the course where he or she does not understand the concepts or ideas being described, the user may want to inform the author of the course about his or her trouble. Or, a user might "stutter" (i.e., slow down or become stopped) while involved in a process or service or using a product; for example, a consumer might have trouble operating an appliance. The consumer may want to inform the supplier of the appliance of his or her trouble. To accomplish this, the user sends feedback to the author or supplier of the product, process, service, or issue. Herein, "feedback" is defined as comments, suggestions, questions, or other information sent by a user or learner to an author of the learning material, reviewer of the learning system, provider of a product, process, service, or issue, or other person responsible for improvement, maintenance, organization, or content of a product, process, or service. For example, by informing the author about difficult spots in the course with feedback, the student can help the author to become alert to which areas in the course need improvement. A student can also provide feedback suggestions to an author or reviewer about how a course can be changed to better suit that individual learner. A student thus can help improve the entire learning environment for himself and other students by sending feedback. Similarly, a consumer can send feedback information to a manufacturer describing his problems with the manufacturer's product to help the manufacturer improve that and later products. An employee can send feedback information to an employer describing departmental problems to help the employer improve the working environment. A user of a computer network can send feedback to a system operator about a network performance issue that the operator has brought to every user's attention, and so on.

In the described embodiment, when a user wishes to send feedback to a reviewer, he or she accesses the feedback interface 42. The user then inputs his feedback using tools provided by the interface. When the user has finished with the feedback, he or she selects a specific control to "send" the feedback and provide access to the feedback for a reviewer (and/or other people using and maintaining the user's computer system or providing the process, product, service, or issue). Feedback interface 42 automatically sends the entered feedback to the other components of the system. The user can then easily exit feedback interface 42 and, for example, resume where he or she left off in the course of the learning environment 48 before accessing feedback interface 42. The feedback interface can be a separate interface from a computer environment, so that is displayed in a separate window, dialog box, full-screen display, etc. Alternatively, the feedback interface can be implemented as inherent within a displayed learning or other computer environment, so that, for example, a learner need only select a few side controls to send feedback without displaying a new window, screen, etc.

By using feedback interface 42, a user can quickly and easily enter feedback about a specific topic without taking a lot of extra time to do so. Thereafter, a user can just as easily resume the learning process ("flow") or other activity in the computer environment after inputting the feedback. The user is thus encouraged to enter more feedback, and more constructive feedback, to help the reviewers or providers on the other end of the system to improve the learning subject or the provided product, process, or service.

The feedback information input by the user in feedback interface 42 is preferably sent to a feedback storage block 44. In the described embodiment, block 44 includes a database, accessible through a network, which stores the feedback information sent by the user of feedback interface 42. Alternatively, feedback data can be stored on storage devices local to a feedback recipient, such as on a hard disk drive of computer system 10, and, for example, mailed throughout a network when so requested. Block 44 provides the feedback information in the database to specific author or reviewer computer systems which access the feedback information. Which specific computer systems receive the feedback information can depend on user-defined settings selected in feedback interface 42 and recorded in the feedback data when the user sent the feedback, and also, more importantly, a reviewer's preferences which are preferably defined in viewing interface 46. Other predefined settings may also determine which computer system addresses receive the feedback information, such as reviewer access level. Depending on the feedback system layout, storage block 44 may be included within learning or other computer environment 48 or authoring environment 50, or block 44 may be part of a central processing system, as shown in FIG. 2. Methods and apparatus for storing database information are well known to those skilled in the art.

Block 44 also can provide specific tools and data for the user using feedback interface 42. When feedback interface 42 is accessed by the user, data describing the features, appearance, and operation of feedback interface can be provided from block 44 to environment 48 and/or feedback interface 42. For example, a reviewer operating viewing interface 46 may be able to control or set the appearance and operation of menu items, icons, messages, prompted feedback entries (described below), and other features available to the user in feedback interface 42 to provide an interface customized for the user's and reviewer's applications. The data which describes and implements the reviewer-selected features can be stored in storage block 44 and provided to feedback interface 42 when the feedback interface 42 is accessed by the user, or, alternatively, whenever these features are changed (e.g., changes to the features can be saved locally to the feedback interface).

Viewing interface 46 receives feedback information from storage block 44. In the described embodiment, viewing interface 46 can be a component of an authoring environment 50, which can include other authoring tools for creating and editing courses and other information presented. Alternatively, viewing interface 46 can be independent of an authoring environment and can be used only for viewing, analyzing, and responding to feedback data. For example, an author can use the viewing interface as one more tool in his creation and editing of learning courses. A superintendent or other administrator in an organization might not be an author of any courses but might still want to view feedback of information or a service provided within the organization as part of overall review of the organization. The administrator would thus only require the viewing interface 46.

A reviewer receives the feedback information at his or her own computer system preferably through a network system connecting the computers in the entire system. Such a network system can be implemented, for example, using a network interface card 29 connected to a computer system 10 as shown in FIG. 1. Other methods can also be used to provide the feedback data from users to a reviewer's computer; for example, feedback data can be manually transported on a floppy disk or other medium to a reviewer's computer. Or, the reviewer can use the same computer system that a user used to enter feedback. The viewing interface 46 receives those feedback items from storage block 44 which fall into preferred categories and criteria of the reviewer. The viewing interface then sorts and displays the feedback data into the specific categories, patterns, and modes which the reviewer has specified to be displayed on his or her display screen. The reviewer can select different icons or other controls and settings displayed by the viewing interface to alter the patterns and view the feedback information according to specific reviewer preferences, criteria and needs. The reviewer can also respond to feedback items by sending a direct response to or implementing an action for the user who entered feedback or to another related person. In addition, the reviewer can preferably customize the appearance and function of the viewing interface 46 and the feedback interface 42 according to his or her needs. Viewing interface 46 is described in more detail with reference to FIGS. 16–19 and 30.

Feedback system 40 can entail several feedback interfaces 42 at one end of the system and several viewing interfaces 46 at the other end of the system. Each of hundreds or thousands of users can send feedback about any subject in the learning or computer environment or anything in their interest. All of this feedback information is organized by the feedback system and received by reviewers at the other end of the system. Thus, virtually no time is needed to accurately and flexibly present feedback to reviewers who can then help the users and improve the computer environment or other product, process, or service.

Feedback system 40 can be used, for example, in several different learning environments. As described above, a student can use the feedback system while learning from a school course or subject on a computer system in an educational environment. A teacher or course author receives the feedback and can correspondingly change and improve the course to suit the students (more options to the course can be added, further description can be added, etc.). Similarly, feedback system 40 is well-suited to business environments in industry. Workers or employees of various levels can use feedback interface 42 to input feedback about job procedures, company procedures, on-the-job problems, etc. as they are learning procedures on a computer system. Managers, supervisors, planners, organizers, and other administrative people can view the workers' feedback on the viewing interface 46 and become informed of company inefficiencies and problems firsthand. When management can receive feedback directly from workers, a company's inefficiencies can be effectively reduced.

Other computer environments also have a need for the user feedback system of the present invention. For example, a beta testing environment provides a product or service to several testing personnel or customers who provide feedback to the developers about the product or service. A feedback system, such as that of the present invention, that greatly enhances and amplifies the ability to collect, view and analyze feedback would be invaluable in discovering problems in a tested product, process, or service. Feedback interface 42 could be used, for example, by users testing a software product; the feedback interface can be implemented as a separate application program or as a feature or tool included within a software product. Any environment in which there exists a bi-directional flow of information between a provider of a product, process, or service and a user of that product, process, or service would find a need for a feedback system, such as the embodiments disclosed herein, to effect improvements and maintenance in the product, process, or service.

In an alternate embodiment, a single person can assume the roles of both user and reviewer. For example, a person can efficiently enter feedback, such as comments, suggestions, or ideas, into a feedback interface 42 on a personal computer system, such as a portable handheld system. That same person could, at a later time, become a reviewer by using the viewing interface 46 to filter and present his or her own feedback items and messages. Such an embodiment can have use as a "memory extender" to allow a person to efficiently collect, organize and present feedback to himself or herself for self-improvement.

Figure 28:
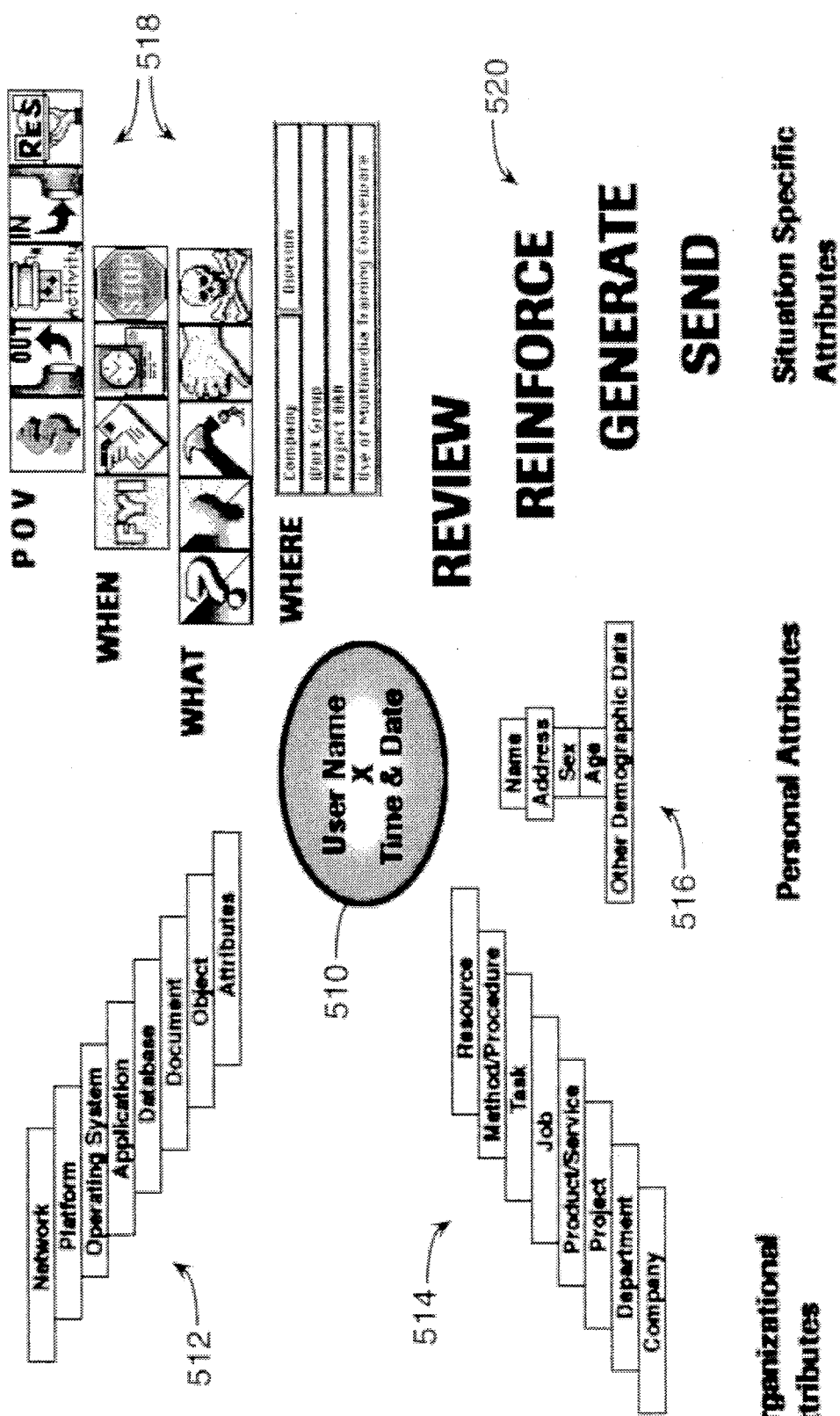
FIG. 28 is a diagrammatic illustration of a categorization of a user's feedback and the attributes and functions used to describe and provide that feedback from the feedback interface.

FIG. 28 is a diagrammatic illustration of a categorization of a user's or learner's inputted feedback and the attributes and functions used to describe and provide that feedback from feedback interface 42. In the described embodiment, the feedback from a user 510 is generally contextualized by technical attributes 512, organizational attributes 514, personal attributes 516, general attributes 518, and situation specific attributes 520. Technical attributes 512, organizational attributes 514 and personal attributes 516 can be considered "system discernable" attributes in that these attributes can preferably be automatically discerned by the computer system which the user is using to enter feedback. General attributes 518 and situation specific attributes can be considered "system augmented" attributes in that a user is preferably required to enter or confirm these attributes or functions, and the user's ease and capability to select these attributes and functions is augmented by the feedback system.

A user is represented by central block 510. The user accesses feedback interface 42 to provide feedback to storage block 44. In the described embodiment, feedback is preferably organized into a feedback record for each feedback item entered by the user. This is described in greater detail with reference to FIG. 15 below. As shown in user block 510, the feedback interface preferably automatically inserts the date and time at which the feedback interface is accessed by the user. Alternatively, as described below with reference to FIG. 15, the date and time of the user first accessing the feedback interface and the date and time when the user exits the interface can both be recorded in the feedback record.

Technical attributes 512 are those attributes describing the computer environment which is implementing the feedback interface 42 which can preferably be discerned by the feedback system and automatically inserted into a feedback record when a user initiates the feedback interface. The technical attributes, somewhat hierarchically shown in FIG. 28, can be stored in a feedback record and include the network type and current node of the computer environment implementing the feedback interface, the hardware platform the user is using (i.e., manufacturer, hardware type, peripherals, etc.), the operating system used by the user, the application program used just prior to using feedback interface 42, the database the user was previously using, the document the user was previously manipulating, the object in the document the user had selected, and attributes of the object that the user had selected, such as size, color, meaning, etc. Obviously, many of these technical attributes may not be applicable or discernable for a given situation; for example, if the user was not using or connected with a database, no database information would be included in the feedback record.

Some or all of these technical attributes, in some situations, may also be the context of the user which the user's feedback refers to and describes (i.e., the context of the user's feedback). In other situations, technical attributes 512 can simply provide data about the user and the system he or she was using, while the user's feedback has a different context. For example, technical attributes 512 can describe the context of the user's feedback when the user enters feedback about a sentence ("object") in a word processing program ("application") that the user was using previous to entering the feedback interface. If that word processing program was being used with the same operating system, hardware platform, and network as the feedback interface, then all of the technical attributes correctly describe the context of the user's feedback. However, if the user entered feedback on a topic such as employee salaries or a word processing program on a different hardware platform, the technical attributes would not (or would only partially) describe the context of the feedback (feedback context is described in greater detail with reference to FIG. 4). The technical attributes 512 are preferably always saved in the feedback record in a specific field to provide information about the technical context of the user to reviewers at the other end of feedback system 40 (see FIG. 15).

Organizational attributes 514 are attributes which further define the user by describing the user's place in an organizational hierarchy or other organizational structure, such as a business organization, school system, club, etc. These attributes, like technical attributes 512, can preferably be automatically inserted into a feedback record by the feedback system when a user accesses feedback interface 42 (i.e., system discernable attributes). The organizational attributes can include the user's company (or district, etc.), department, project, product and/or service for which the user is responsible, job (i.e., occupation title), specific task of the user, tile standard method or procedure for implementing the user's task, and the resources the user has access to for implementing the method or procedure. Not all these organizational attributes may be applicable in a particular situation. For example, a user employee of a company may work in the Quality Assurance department on a project for the latest product release, and may have no specific task, method, or resources assigned to him; those organizational attributes would thus not be recorded in the feedback record.

Organizational attributes are system discernable attributes and thus can be specified as default attributes for a particular feedback interface. For example, a worker's company, department, etc., can be input beforehand into a specific computer terminal or associated with a particular feedback interface which that worker would normally use; or this information could be stored on a database connected to the feedback interface via a network. The information could then be automatically retrieved by the feedback interface. Similarly to the technical attributes 512, some or all of organizational attributes may specify the context of the user's feedback in some cases in which the user's feedback is concerned with user's project, job, etc. as well as describe the user. In other cases, the organizational attributes may not describe the feedback context at all and only describe the user.

Personal attributes 516 are attributes which describe personal data about the user of feedback interface 42. These attributes are also preferably system discernable, although, in other embodiments, they can be entered by a user. Personal attributes 516 include the user's name, address (e.g., postal address, work address, etc.), sex, age, and other demographic data. Such demographic data can include the user's home city or the city he or she works in, the city or location where feedback is entered, the user's state, region, social security number, education, etc. Other personal attributes can also be added to a feedback record, such as a user's eye color, medical history, driving history, test scores, height, weight, hobbies, and other interests. These attributes may not typically describe a feedback context, but can help describe the user and provide more information in a feedback record about a user which a reviewer might use as criteria to filter and present feedback items.

General attributes 518 are system augmented attributes, i.e., they are defined, selected, and/or confirmed by the user each time the user enters feedback information in feedback interface 42. The general attributes can include "what" (situation) attributes, which describe the situation of the user when entering feedback; "when" (response) attributes, which describe the urgency of the feedback and a response to the feedback; and "who" (sharing) attributes (not shown), which describe which users and reviewers can determine who entered the feedback. These attributes are described below in the embodiments of feedback interface 42 shown in FIGS. 4 and 10. General attributes 518 can also include a point of view (POV) attribute, which describe the point of view of the user entering the feedback and which can be implemented as attribute icons similar to icons 76 or 160 as described in subsequent embodiments. For example, the "$" attribute segment icon can indicate that the user entering the feedback has a point of view of a customer (a consumer, a department which purchases from another department, etc.) Similarly, the other icons can indicate points of view based on activity, output of the user, input informing the user, or the resources used by the user. General attributes 518 can also include the "where" attributes, which is the context or "location" of the user in a product, process, service, or physical location which is referred to by the feedback, i.e. the feedback context as described with reference to fields 57 of FIG. 4. These attributes are "augmented" by the feedback system in that the user can quickly and easily specify a wide range of feedback attributes and context using the feedback interface.

Situation specific attributes 520 are system augmented attributes or functions which provide a user with additional options when entering feedback, and which may be specific to particular user's needs. The "review" function of feedback interface 42 allows a user to review a list of prompted feedback items which may describe the user's feedback, and are described with reference to the prompted feedback items 121 and 123 of FIG. 6. The "reinforce" function of feedback interface 42 allows a user to send out a selected prompted feedback item from the review list. The user thus does not have to spend time entering general attributes 518 for his or her feedback. By selecting and sending a prompted feedback item, a user reinforces the users' need for a reviewer to respond to these common feedback items. The "generate" function of feedback interface 42 allows a user to generate his or her own feedback if the previous, prompted feedback items or reviewed feedback items don't correspond to his or her own feedback. The user generates the feedback through the described features of feedback interface 42, including the general attributes 518, specific message content, and other menus, buttons, etc. as described below with reference to FIGS. 4–7 and 9–14. Finally, the "send" function allows a user to provide his or her feedback to a reviewer, preferably via a storage block 44 of feedback records, once the feedback has been generated or reinforced.

Figure 3A:
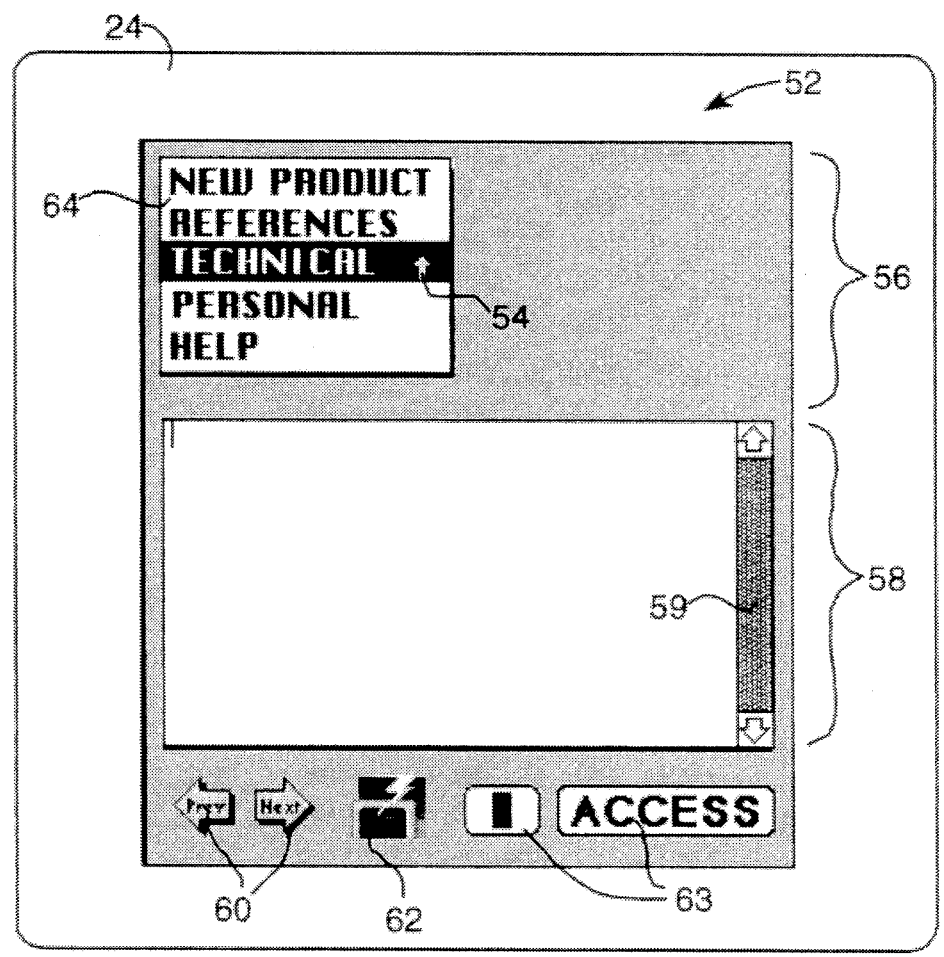
FIGS. 3a–3d are screen displays of a learner interface suitable for use with the present invention.

In FIG. 3a, display screen 24 of a computer system 10 is shown. A first embodiment of a learning interface 52 for a learning or other computer environment 48 is displayed on screen 24. Interface 52 can be used, for example, in a working environment of a company where a worker can look up testing procedures, company policies, personnel, etc., or browse through an instructional manual. Interface 52 can also easily be used for a testing environment, wherein, for example, users wish to enter feedback about a tested or used product. Category fields 56 indicate the subject categories, i.e. the context, that are selected by a user to access a specific subject in learning interface 52. Preferably, fields 56 become more specific in scope going from left to right and top to bottom (more fields 56 are visible in FIGS. 3b–3d). Display area 58 is used for displaying information about the subject which the user has accessed. Slider bar 59 can be used to scroll through a document or other form of information. Arrow icons 60 are used to display additional information stored in related information modules. For example, a specific document in a course can be viewed, and the next or previous document in a linearly-organized course outline can be accessed using arrows 60. Feedback icon 62 is used to access the feedback interface 42 (explained in further detail with reference to FIG. 4). Buttons 63 are used for other learning interface functions, such as navigation through a course, access to user display preferences, and access to a notepad or similar feature.

FIG. 3a shows arrow 54 selecting a category from a list in first field 64. Arrow 54 indicates where a pointing device, such as a mouse, stylus, etc., is currently pointing. The list of subjects in field 64 is a choice of categories for the learner to select to define the subject to be displayed. Other fields (shown below) will show sub-categories of selected categories in previously-defined fields.

Figure 3B:
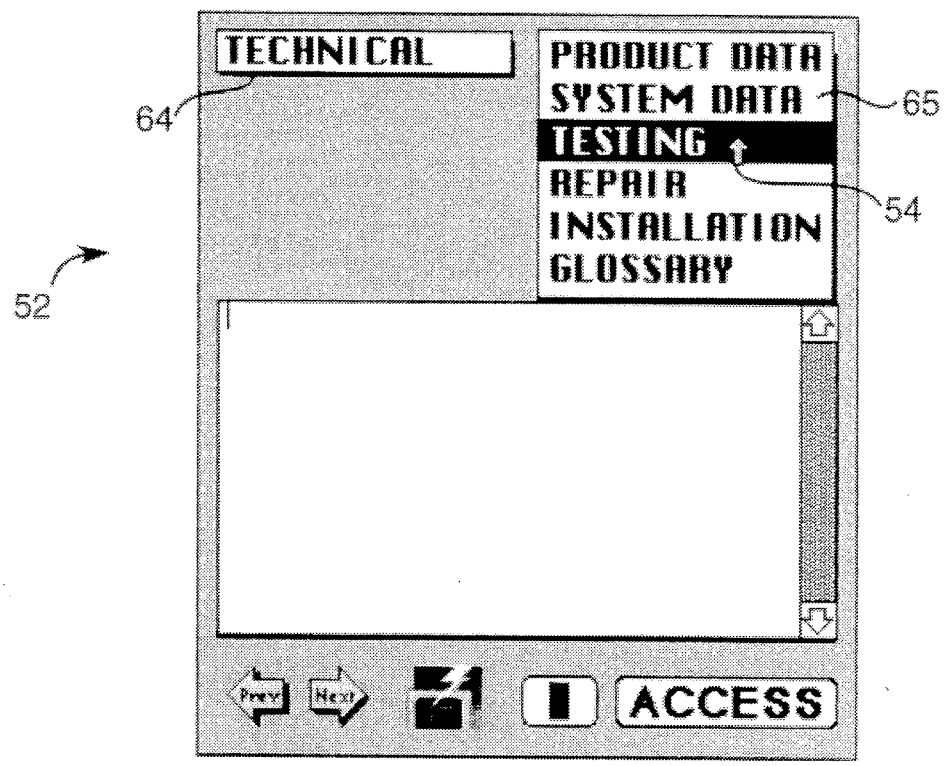
Figure 3C:
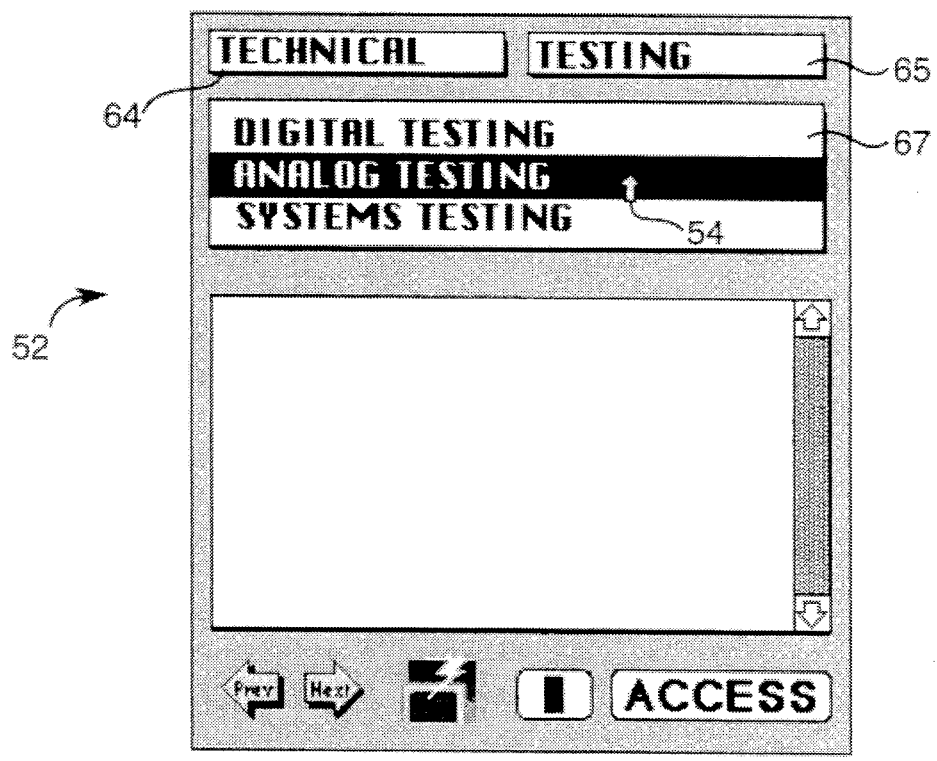

FIG. 3b shows learning interface 52 in which the learner has selected "Technical" from the first field 64 and has clicked on second category field 65. Preferably, a blank second field, similar to first field 64 as shown in FIG. 3b, is automatically displayed when a category has been selected in first field 64; the learner can then select the blank field to display a list of categories as shown in FIG. 3b. The displayed topics are subcategories of the selected category chosen in field 64 ("Technical"). In FIG. 3c, learning interface 52 is shown in which the category "Testing" has been chosen in second category field 65, and the third category field 67 has been selected to provide the displayed list of sub-category choices under the second field's category.

Figure 3D:
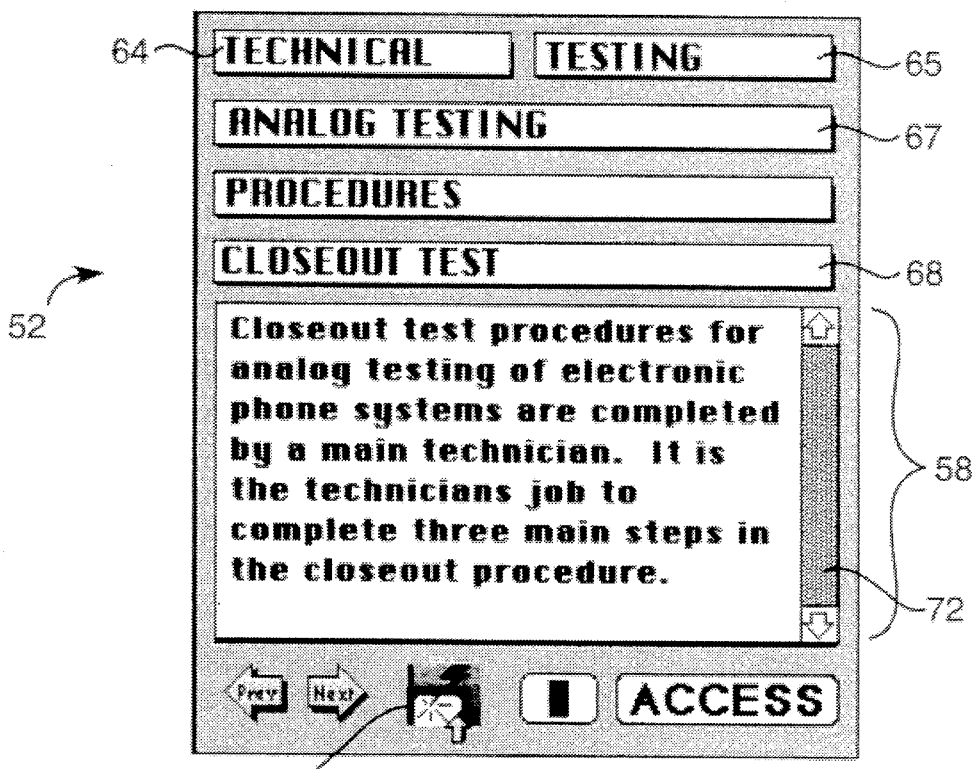

FIG. 3d shows a learner interface in which a learner has defined the subject he wishes to learn about, i.e. his learning context, down to a fifth field 68. Different subjects can have different amount of categories associated with them. A user knows that a subject can be defined further when, after a field topic is selected, the next field is displayed as a blank field. Each category in a field is a sub-category of the category listed above it. Depending on the learning interface used and the subject chosen, different subjects will typically have different degrees of detail. For example, some subjects might only have three levels of categories, while others may have five levels. Display area 58 displays textual information on the chosen category. Thus, in FIG. 3d, text for closeout test procedures for analog testing is shown. In the described embodiment, a scroll bar 72 can be used to display different portions of the textual information. Information in other forms besides text can also preferably be displayed in display area 58. For example, pictures or animation can be displayed in conjunction with sound from a connected speaker to present information in a different style.

FIG. 3d also shows feedback icon 62 highlighted, indicating that the learner has selected the icon to access the feedback interface (shown in FIGS. 4–7).

Figure 4:
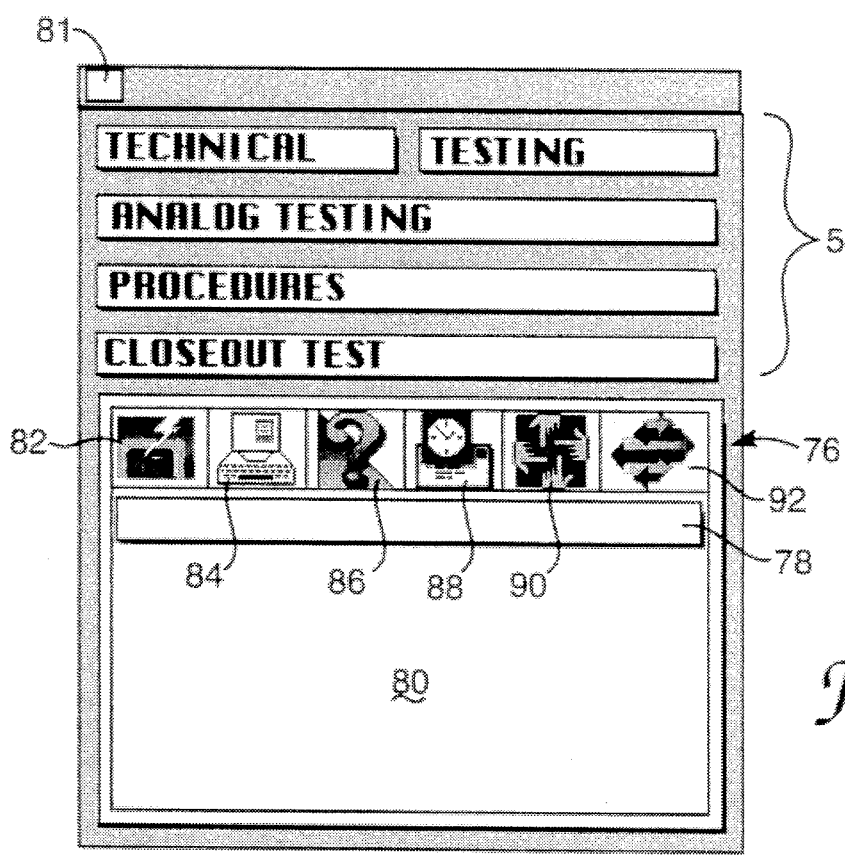
FIG. 4 is a screen display showing the feedback interface for the learner interface of FIGS. 3a–3d.

FIG. 4 shows a preferred feedback interface 42 for the learning interface 52. Feedback interface 42 can also be used as an independent application program, independent of a learning or other interface. Feedback interface 42 preferably includes fields 57, attribute icons 76, prompted feedback field 78, input area 80, and close box 81. The feedback interface is preferably displayed once the learner has selected feedback icon 62 as shown in FIG. 3d. Fields 57 specify the subject or context of the feedback, i.e., fields 57 refer to the product, process, service, or other context which the user wishes to enter feedback about. This context can also be referred to the user's "location" in a product, process or service (which can include, for example, a physical location in space or within an organization, network, etc.), and corresponds to the "where" general attribute as shown in FIG. 28. For example, the user's location within the learning course is specified by fields 57. Fields 57 are preferably displayed in the feedback interface having the same categories specified and in the same displayed area as fields 56 in the learning interface 52. Thus, a learner using learner interface 52 does not have to specify which subject or context he or she is sending feedback about, since the learning interface already specifies that subject or context.

In other embodiments, fields 57 can be specified by the computer environment used by the user when feedback was selected. The feedback interface 42 can provide user technical attributes 512, organizational attributes 514, or personal attributes 516, known from the user's computer system as described with reference to FIG. 28, as a default context in fields 57. For example, if the user was operating a word processor when he selected to access feedback interface 42, fields 57 can be automatically set to specify the word processor, the document, the page, etc. where the user was located when he chose to enter feedback. This can be convenient if the user's feedback refers to such an automatically-specified context.

Fields 57 can also preferably be modified by the learner or user in the same way as fields 56 are modified in learning interface 52. A user can thus change categories to a new subject or context and enter feedback on that new subject or context. In computer or other environments where the user's context cannot easily and automatically be discerned and specified in fields 57, the user could select the context in fields 57 each time feedback interface 42 is accessed, or have a desired set of preferred or default categories be automatically specified (from the technical or other types of attributes as shown in FIG. 28, or from a customized list of default categories). In the preferred embodiment, the specific categories selected in fields 57 can directly influence the appearance and function of icons and other features provided in feedback interface 42, as explained below.

Feedback interface 42 also includes a row of icons 76. Each of these icons can be selected by the learner to provide a list of selections that further define the feedback item. In the preferred embodiment, icons 76 are set to default or preferred selections which the learner specified previously, for example, the last time he or she accessed the feedback interface, or in a special preferences window. The specific icons displayed can vary depending on the context specified in fields 57, as described below.

Icons 76 of the described embodiment include feedback icon 82, input mode icon 84, situation attribute icon 86, response attribute icon 88, sharing attribute icon 90, and send icon 92. Feedback icon 82 allows the learner to select from different feedback modes. Examples of feedback modes are described in detail below with reference to FIGS. 9, 11 and 12 which show a second embodiment of a feedback interface. Input mode icon 84 allows the user to specify the mode of input he or she prefers to use. For example, when icon 84 is selected, a drop-down menu is displayed which provides icon choices for keyboard input, stylus or pen input, voice (microphone) input, telephone/voice mail input, etc.

Situation (or "what") attribute icon 86 shows a selected attribute that is assigned to the current feedback item. If icon 86 is selected by the learner, a list of several situation attributes are displayed vertically. The learner can select one of the attribute items in the list, and the selected item is the displayed as icon 86. Situation attribute icon is described in more detail with reference to FIG. 5a. Response (or "when") attribute icon 88 shows a selected response attribute that is assigned to the current feedback item. Icon 88 is described below with reference to FIG. 5b. Sharing (or "who") attribute icon 90 shows a selected sharing attribute that is assigned to the current feedback item, and is described below with reference to FIG. 5c. Of course, other attributes besides the ones shown can also be used to describe a user's feedback. For example, the "POV" attribute shown in FIG. 28 can be available for a user to describe feedback. Send icon 92 is used to send the current feedback item to the database, where it is stored and may be accessed by authors and reviewers. In the preferred embodiment, once the send icon is selected, the user is automatically exited from feedback interface 42 and returns to learning interface 52 (or other computer interface or environment). In an alternate embodiment, the user can enter another feedback item by altering the context fields 56 and/or icons 76, and feedback interface 42 can be exited by selecting close box 81 or a menu item (not shown).

Prompted feedback field 78 is used to display prompted feedback items for the user, and is described in more detail below with reference to FIG. 6. Message window 80 is used by the learner to enter a specific feedback message about the selected subject/context. This message can be viewed and responded to by reviewers on the other end of the feedback system.

Figure 5A:
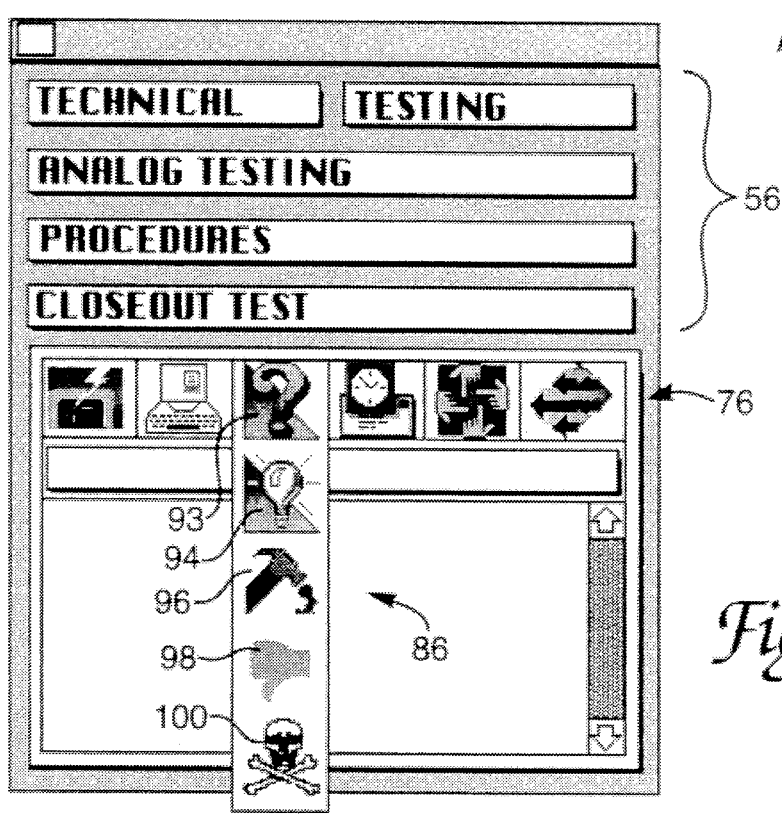
FIGS. 5a–5c are screen displays showing a feedback interface with an attribute segment list displayed.

FIG. 5a shows feedback interface 42 with situation attribute icon 86 selected. A list of possible situation attribute "segments" is displayed vertically. Herein, an attribute segment is one of the possible attribute choices for that particular attribute. Attribute segment 93 indicates that the user has a question about the subject specified in fields 57. Attribute segment 94 indicates that the user's feedback is a suggestion or idea about the specified subject. Attribute segment 96 indicates that the user's feedback is about a problem the user is having in the specified context, attribute segment 98 indicates the feedback concerns a complaint that the user has concerning the specified context, and attribute segment 100 indicates the feedback describes that the user is experiencing a very significant problem or "disaster" concerning the specified context. Preferably, the user selects one of these situation attribute segments to describe his or her feedback. The user may also decide not to select any of these situation attribute segments if, for example, the user's feedback does not easily fit into one of these situation contexts. Of course, in alternate embodiments, additional types of situations can be added to the situation attribute list; for example, a "comment" icon can be added for user comments about the specified context.

The specific segments 93, 94, 96, 98, and 100 preferably vary dynamically with the specified context shown in fields 57. The segment choices that can be selected in the vertical menu can be made more appropriate for the specified context. For example, if a context of "closeout test" is specified, the icons shown in FIG. 5a are presented. However, if a context of "Employee Activities" is specified, an additional segment indicating "employee comments", for example, can be displayed in addition to the segment icons shown in FIG. 5a.

Figure 5B:
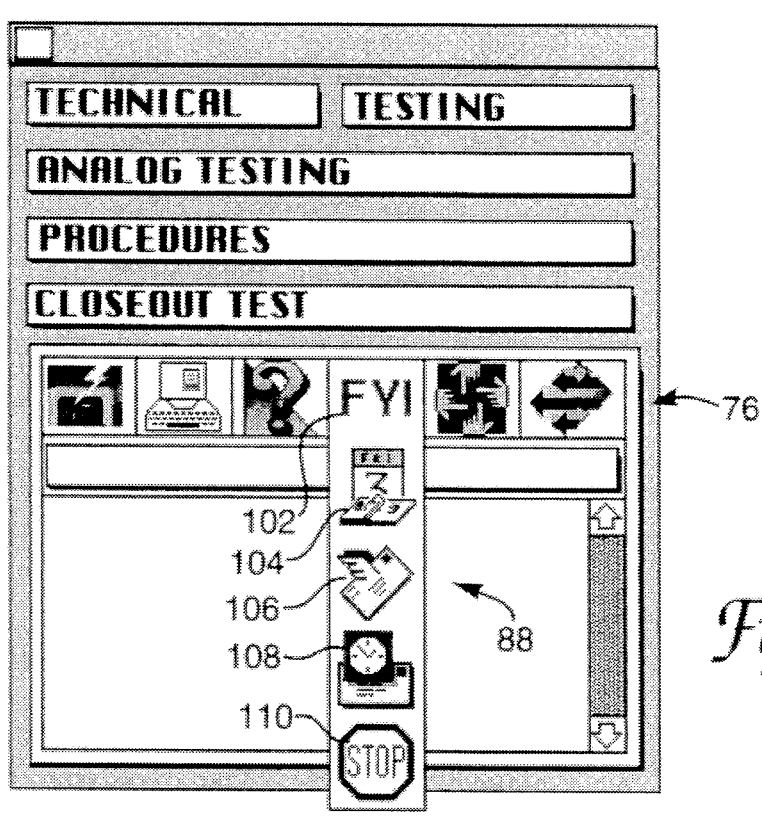

FIG. 5b shows feedback interface 42 with response attribute icon 88 selected. A preferred list of response attribute segments is shown. The response attributes indicate various degrees of urgency for the reviewer which can be assigned to a feedback item. Attribute segment 102 indicates that the feedback message is provided "For Your Information", i.e., the feedback item has a relatively low priority. Segment 104 indicates that the feedback has a somewhat higher level of priority. Segment 106 indicates to the recipient that the user would like to receive a response. Segment 108 indicates that the user is waiting for a response to his or her feedback. Segment 110 indicates that the user is, for example, stopped in his or her learning flow or other activity within the computer environment, and immediately requires a response to the feedback message before he or she can continue. In alternate embodiments, additional levels of priority can be added to the response attribute list. Alternatively, priority assigned for the reviewer to read the feedback and the urgency with which the reviewer is requested to respond to the feedback can be separated into two different attributes. Similarly to the situation icon described above with reference to FIG. 5a, the number and identity of the response icons 88 can vary dynamically with the particular context specified in fields 57.

Figure 5C:
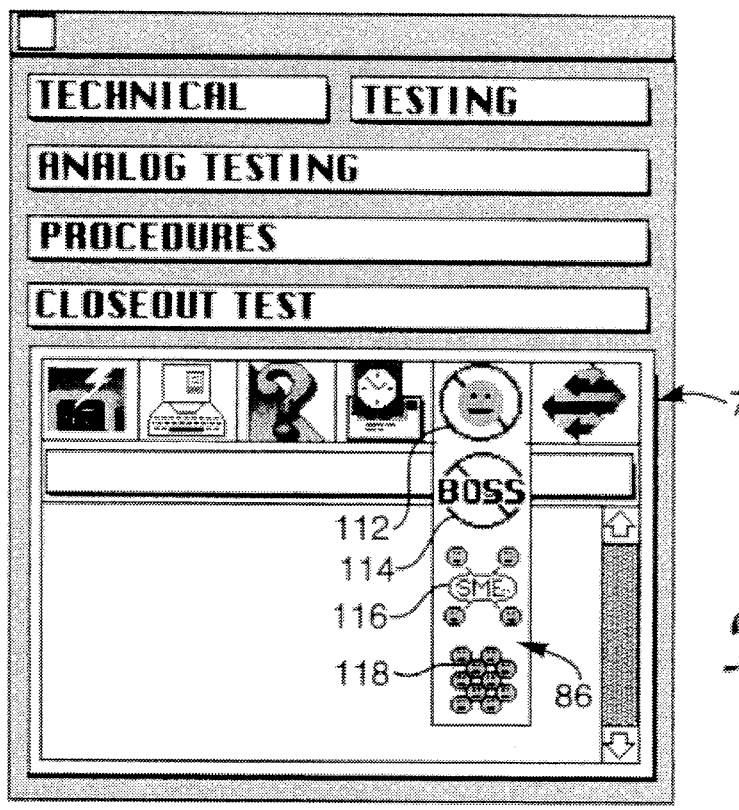

FIG. 5c shows feedback interface 42 with sharing attribute 90 selected. A preferred list of sharing attribute segments is shown. The sharing attribute indicates the degree of privacy which can be assigned to the identity of the learner who sends a feedback message. Attribute segment 112 indicates that the identity of the learner who sent the feedback message will be shared with no one. Segment 114 indicates that the learner's identity will not be sent to a supervisor, boss, or similar person responsible for the learner's department, course, used product or service, etc. Segment 116 indicates that the learner's identity can be shared with the primary author/reviewer and other reviewers that are in the primary reviewer's department, workgroup, or other organizational unit. Segment 118 indicates that the learner's identity can be received and known by anyone connected to the feedback system. Other variations of sharing attributes can also be used, such as not sharing feedback with other specific groups like administrators, upper management, etc. In alternative embodiments, a sharing attribute can be used to specify degrees of privacy for the content (attributes, message, etc.) of a feedback message rather than (or in addition to) the identity of the learner who sends the feedback. Thus, if a user did not want a boss to know either the content of a particular feedback message or the user's identity he could select the necessary attributes. Similarly to the situation icon described above with reference to FIG. 5a, the number and identity of the sharing icons 86 can vary dynamically with the particular context specified in fields 57.

Figure 6:
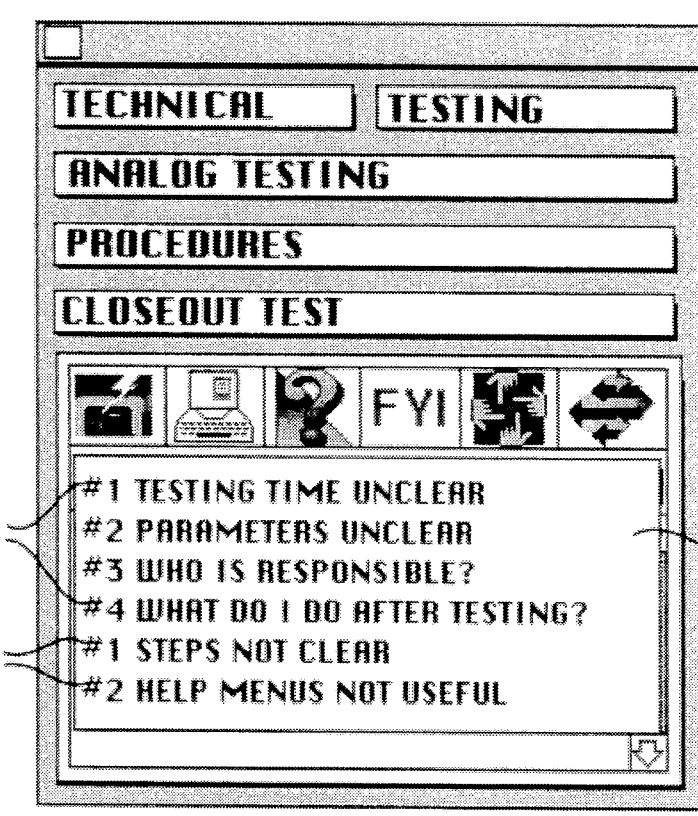
FIG. 6 is a screen display showing a feedback interface with a prompted feedback field list displayed.

FIG. 6 shows feedback interface 42 with prompted feedback field 78 selected by the user. The field 78, when selected, is replaced by a prompted feedback window 120. Window 120 displays a list of feedback items that can be directly selected by the user. In a preferred embodiment, the feedback items are a predetermined number of the most commonly inputted feedback items within the feedback system. For example, if many users have sent feedback stating that the time required for a particular test is unclear as taught in a learning environment, then that feedback item could be displayed in prompted feedback window 120. If the current user happens to have the same feedback, he or she can quickly and directly select the prompted feedback item without having to input any other information. A preferred number of the most common feedback items 121 are displayed. When a user selects a prompted item 121, predefined attributes are automatically assigned to that item. For example, a context in fields 57 and icons 76 can be automatically set to selections associated with a chosen item 121; these associated selections can be assigned by the reviewer that provided the item 121. The selected item can be displayed in field 78, and the user can then select send icon 92 to send the feedback item, as described with reference to FIG. 7.

The prompted feedback items 121 can also be presented as contexts or icons rather than the message content shown in FIG. 6. For example, if many users are entering feedback "disasters" (icon 100) about the "closeout test" context, both icon 100 and the context "closeout test" can appear is prompted window 120. Other descriptions can also be displayed in window 120, such as physical locations, descriptions of a product, process, or service, or suggestions from the reviewer (as in items 123, described below).

Prompted feedback window 120 can also display specific feedback items 123 about which authors or reviewers want direct feedback. A reviewer can insert an item 123 into the list (as well as associated selections for context fields 57 and icons 76) so that all users, or specific users, can see the feedback item and select the item if it is relevant to them. Reviewer-specific feedback items 123 are preferably displayed after the common feedback items 121 in the list.

By providing prompted feedback items to users, the system offers a quick, simple way to enter feedback. If a learner or user does not want to go to the trouble of selecting feedback attributes from the icons 76 and does not want to input their own message, the user can quickly check the prompted feedback items list to determine if their problem or suggestion is listed. When a prompted feedback item is selected, predefined feedback attributes are automatically set by the system, allowing a user to quickly exit the feedback interface and resume their learning or other activity. The user thus "reinforces" the particular feedback item by adding his or her support to the prompted feedback item. If a large number of users reinforce a prompted feedback item in such a way, the feedback item may be viewed with more importance by a reviewer since many users have the same feedback.

Additional "pop-up" windows, similar to prompted feedback field 78 and window 120, can be used for other features of the feedback interface. Preferably, a pop-up window or similar list of selections (not shown) can be used to present a user with a history of feedback selections and items that the user has sent in the past. The user can preferably select and "review" (as shown in FIG. 28) a certain subset of his past feedback items by defining preferences in a separate window, menu list, etc. For example, a pop-up window can present a list of feedback items sent by the user which occurred during a particular time frame, have a particular attribute, have a particular context, or have any other particular characteristic which the user desires to view. The previous feedback items can be filtered by the general attribute icons 76 or by context fields 57. For example, if the user wishes to see his own previous feedback messages which are concerned with "suggestions" in the "situation" (or "what") attribute, the user can select the suggestion icon 94 when displaying the previous feedback records. Alternatively, the user can decide to view all past feedback. The user can preferably view the feedback items as a list of items and can select one of the items to view the particular content or message of that item. One way to implement review of past feedback is to load past feedback records from a database of stored records and display those records in feedback interface 42; retrieval of feedback records is explained in more detail below with reference to viewing interface 46. The feature of selecting and reviewing past feedback items can also be implemented in other ways, such as with menu selections.

Figure 7:
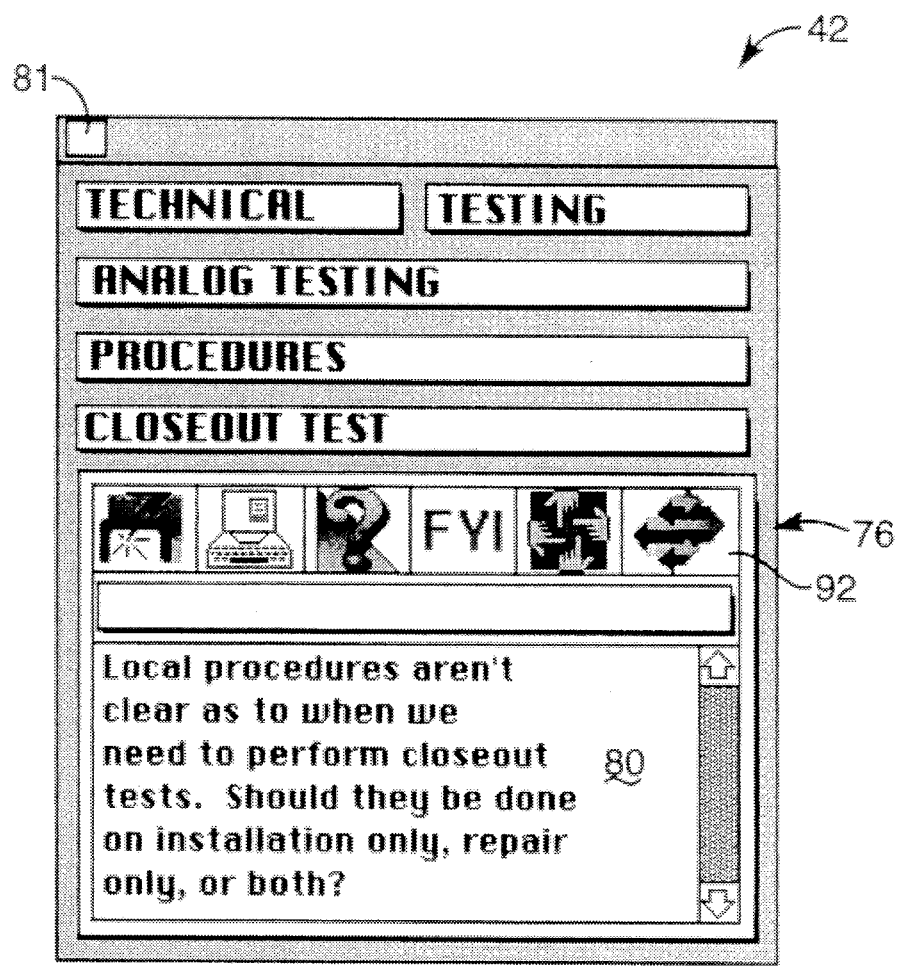
FIG. 7 is a screen display showing a feedback interface with a feedback message entered in an input area.

FIG. 7 shows feedback interface 42 after a user has inputted specific information into input area 80. After a user selects which attributes (displayed as icons 76) he or she wishes to characterize the feedback, the user can input the actual feedback comments. If no comments or message is necessary, the user can also choose to not input any message in input area 80. In FIG. 7, a learner has entered text from a keyboard; the actual method of input depends on the media input mode selected with icon 84.

Once the feedback comments are entered, the user can select send icon 92. In the described embodiment, this selection will send the feedback item to the database to be stored as a record (detailed below). A feedback item is a specific message, including any attributes and context, that the user is sending. Once the feedback item is sent, the feedback interface 42 is then preferably removed from the screen and the user is automatically returned to his or her "location" in computer environment 48 before accessing feedback interface 42. In an alternate embodiment, a user can enter additional feedback after sending a feedback item by selecting appropriate icons and fields on interface 42. Feedback interface 42 can be exited at any time by selecting close box 81, which will cancel all feedback that has been entered but not sent.

Figure 29A:
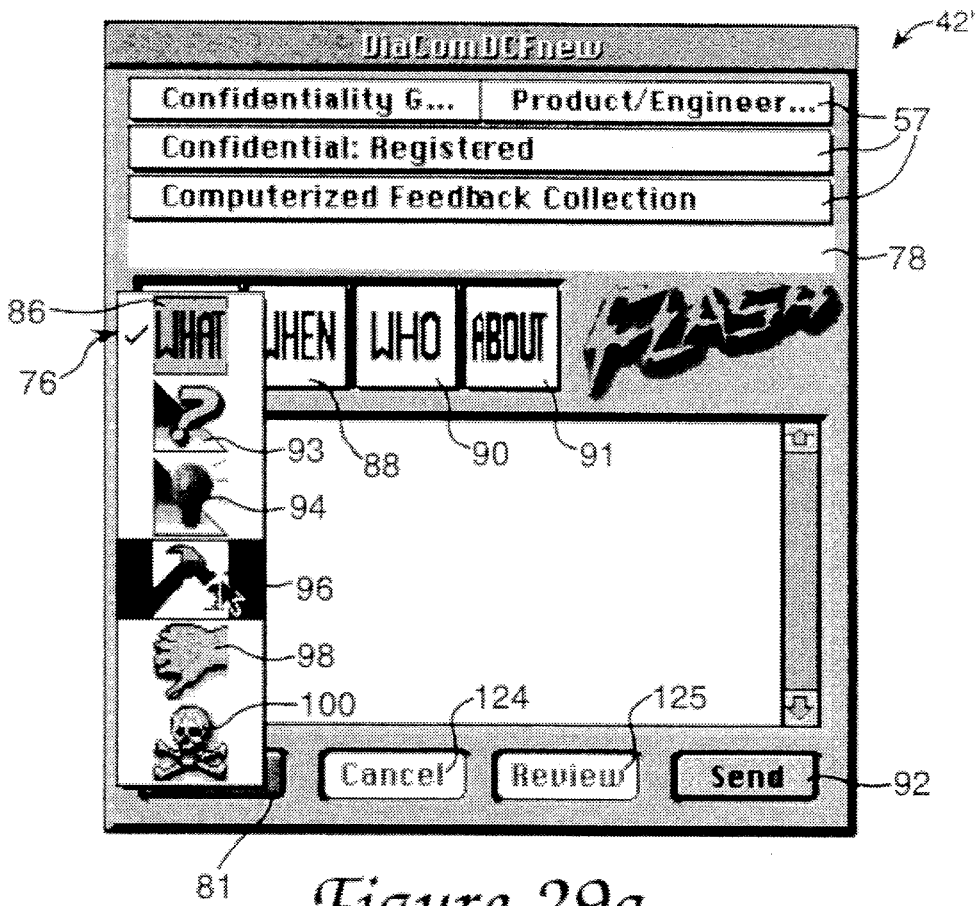
FIG. 29a is a screen display showing a variation of the embodiment of the feedback interface as shown in FIG. 4.

FIG. 29a shows a variation 42' of the embodiment of feedback interface 42 as shown in FIG. 4. Interface 42' includes context fields 57, which can be similarly selected as shown in FIGS. 3a–d and 4. Icons 76 are shown as label icons which initially designate an attribute name ("what", "who", etc.). A user can select an icon 76, such as situation or "what" icon 86, and a list of attribute segments for that attribute are displayed. Similar to the situation attribute of FIG. 5a, "what" icon 86 includes a question segment icon 93, an idea segment icon 94, a problem segment icon 96, a complaint segment icon 98, and a disaster segment icon 100. Once an attribute segment is selected, the selected segment is displayed in place of the "what" label icon 86. Alternatively, a selected attribute segment can be displayed in a different area of the feedback interface 42, such as in an area below icon 86.

Response or "when" icon 88 and situation or "who" icon 90 are selected similarly to "what" icon 86 and display segment icons similar to those shown in FIGS. 5b and 5c. "About" icon 91 is another attribute icon which preferably displays a list of subjects for the user to select. About icon 91 is described in greater detail with respect to FIG. 29b. Message window 80 displays feedback message content that the user inputs, as described with reference to FIG. 7. Interface 42' also includes a quit button 81, which functions similarly to close box 81 shown in FIG. 4. A send button 92 sends out a feedback item similarly to send icon 92, described with reference to FIG. 7. A cancel button 124 can be selected by the user to cancel all selections made since feedback interface 42' was first accessed and to return the fields and icons to their initially displayed selections. A review button 125 can be selected by a user to cause a list of prompted feedback responses to be displayed in message area 80; this list can be scrolled to display further items using scroll bar 127. This feature is described in detail with respect to FIG. 6. A user can select a prompted item, similarly to the window 120 shown in FIG. 6, and then select send button 92 to send out the prompted item to the storage block. Alternatively, a user can select a separate "reinforce" button to send a selected prompted feedback item. In other embodiments, review button 125 can be used to display a separate window or display of prompted feedback items 121 and 123. In yet other embodiments, a button or field can be used to display a pop-window similar to window 120 of FIG. 6.

In one preferred embodiment, once a user has finished selecting a context in field 57 and attributes from icons 76, the list of prompted feedback items is automatically displayed in message area 80. Then, if the user finds that none of the prompted items match his or her own feedback, he or she can clear the prompted feedback list and enter his or her own message in area 80.

Figure 29B:
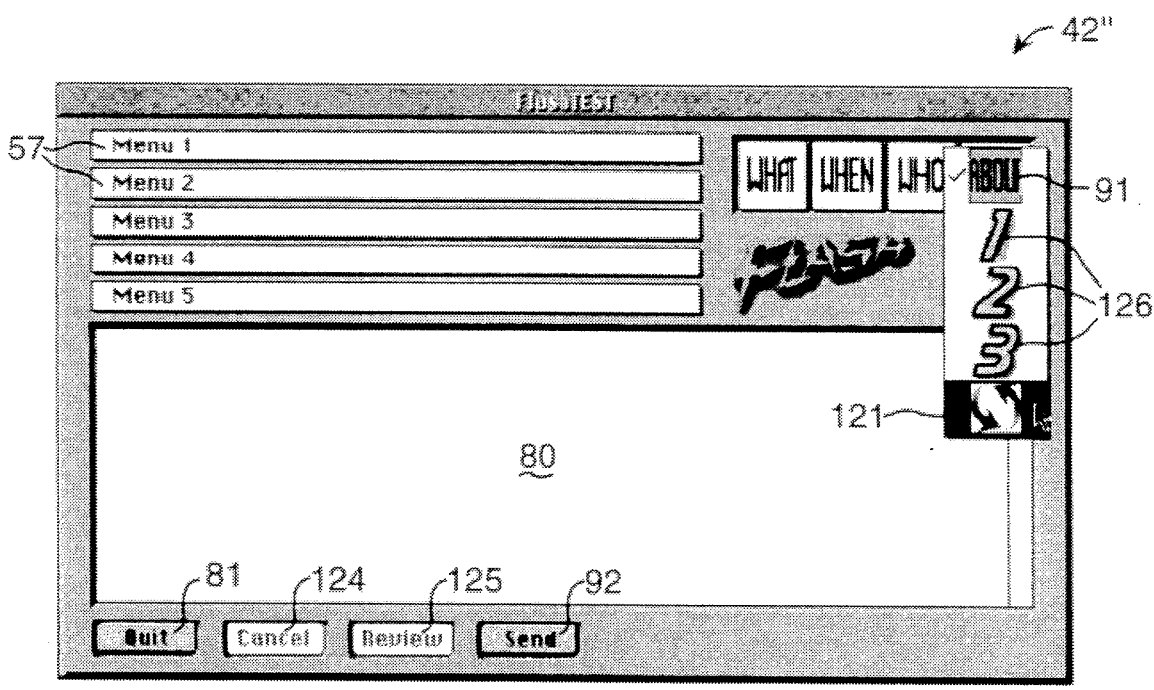

FIG. 29b shows a feedback interface 42" similar to feedback interface 42' shown in FIG. 29a. Feedback interface 42", however, is different in appearance: icons 76 are positioned to the right of context fields 57, and message window 80 is larger. About icon 91 is shown being selected by a user. Attribute segment icons displayed for about attribute 91 include three number options 126, labelled as "1", "2", and "3", respectively. Additional number (or other) icons can be added by a reviewer or operator of the feedback system, or the shown icons can be removed, as necessary. These numbers can refer to specific subjects, contexts, or other topics that a reviewer can provide for a particular system. The about icon can provide further information beyond what is specified in context fields 57. For example, if a feedback system 40 is being used in a business organization, a reviewer might want to specify icon "1" to designate a subject of "company procedures." Thus, when a user enters feedback on company procedures, he or she can select icon "1" from the about attribute menu. The reviewer will immediately know upon viewing icon "1" that the feedback is concerned with company procedures. This can be helpful when the context fields 57 may not fully describe the subject of the user's feedback. The user can determine the subject that each number references using a menu or other function of the feedback interface. Alternatively, specific icons can be provided by the reviewer to describe a subject, such as feedback segment icon 127, described below.

Feedback segment icon 127 is displayed in the about icon list with the number icons 126. The feedback icon 127 can be selected by the user when the user wishes to enter feedback about the feedback system 40 itself. For example, if a user selects icon 127, he or she is indicating to the reviewer that the current message is concerned with the feedback system: the operation or appearance of feedback interface 42, the efficiency of the system, the speed of responses, the difficulty of using the interface or system, etc. Alternatively, a user can select feedback icon 127, and then be presented with another menu of attribute segments describing the feedback about the feedback system; for example, attributes segments such as "difficulty", "response time", "appearance", "help features", etc., can be displayed in a horizontal menu of icons extending from icon 127. In yet another embodiment, once a user selects segment 127, he or she can select any icon 76, field 57, or other control presented in feedback interface 42. A representation of the selected control can then be displayed as the subject of the feedback, e.g. in message window 80. For example, a user can select feedback icon 127 and then select a "what" icon and the "problem" icon 96. This would indicate to a reviewer that the user had a problem with the look or operation of the sharing icon. The user can also add message content to describe the subject of the feedback in greater detail. Feedback about the feedback system can also preferably be made by specifying a feedback context in context fields 57. The feedback system 40, like any other system, can benefit from users entering feedback about its operation and presentation. The reviewers responsible for the feedback interface can then improve the feedback system more effectively.

Figure 8A:
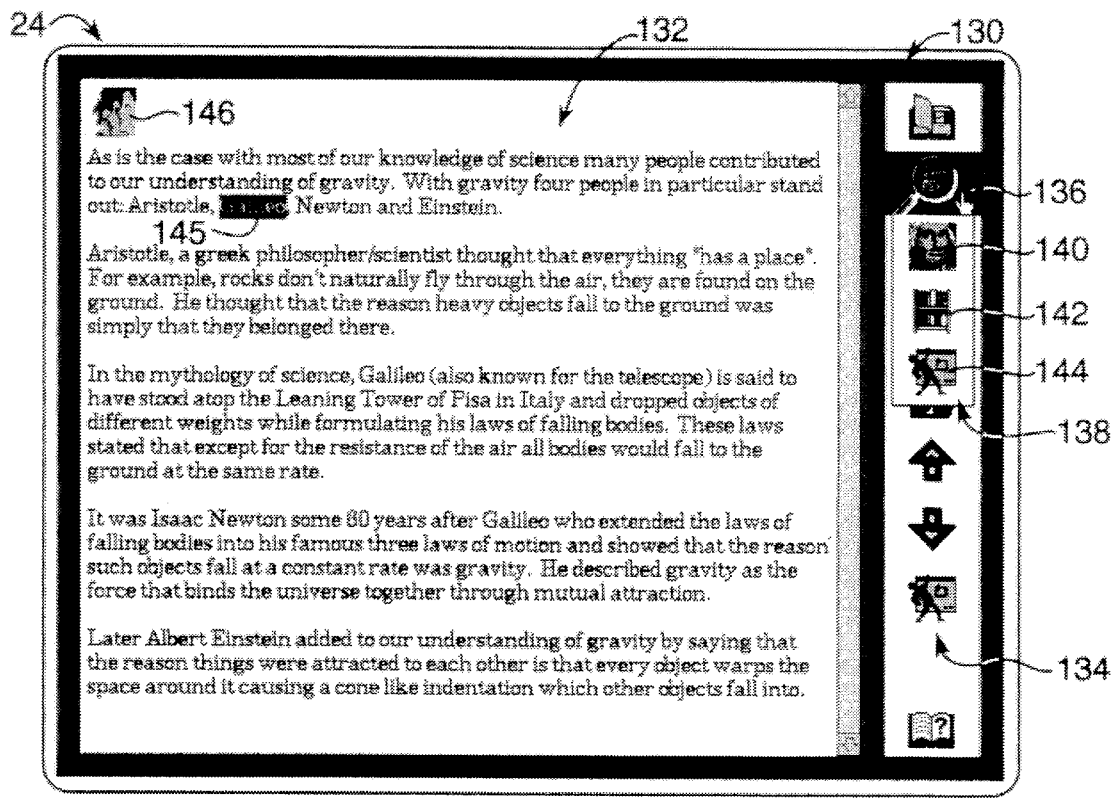
FIGS. 8a–b are screen displays showing an alternate embodiment of a learner interface with menu icons being selected.

FIG. 8a is a second embodiment of a learner interface 130 displayed on display screen 24 and implementing the feedback system of the present invention. Similar to learning interface 52 shown in FIGS. 3a–d, learner interface 130 can be incorporated into a learning or computer environment 48 shown in FIG. 2 and used, for example, within a school or similar educational system. Learner interface 130 includes display area 132 and icon menu 134.

Display area 132 is used by the learner interface 130 to present information or course material to a learner. The information can preferably be in the form of text, sound, pictures, movies, etc., depending on the learner's preferences. The learner can view information presently off-screen by using a scroll bar or similar controls. In FIG. 8a, the learner has highlighted a word 145, "Galileo", with a pointing device such as a mouse.

Menu 134 includes several menu icons that offer a learner choices within the learning environment. For example, one menu choice is a "quick reference" icon, which provides a list of references and other tools to help learn about text or other information that the learner has selected in display area 130. A different menu icon can provide different representations of a subject the learner selects, such as a practical representation, the central idea of the subject, the history of the subject, etc. A different menu icon can assist the learner in navigating through different course subjects or their own learning history. The learner is able to select various icon menu choices for any subject or topic he or she is learning about.

In FIG. 8a, a selection of text from which the learner is learning is displayed in display area 132. The representation mode that is being displayed is preferably shown as representation icon 146, which in FIG. 8a indicates that a "Personalities" subject is being displayed. Representation mode icon 146 indicates a specific presentation style that the learner has selected; Personalities might mean that the learner wishes to be presented a subject from a point of view of historical personalities of the subject. The learner has come across a word that he wants more information on, "Galileo", and has highlighted the word. Correspondingly, a quick reference menu icon 136 in menu 134 has been automatically highlighted by the learning environment to indicate that a menu of sub-choices exists for quick reference. A vertical list 138 of sub-icons is displayed vertically down from quick reference icon 136 when quick reference icon 136 is selected. Such sub-icons include, for example, a biographical icon 140, an encyclopedia icon 142, and a feedback icon 144. The learner can choose any of the sub-icons, which preferably will provide a further menu of sub-sub-icons. The sub-sub-icons, if selected, will perform a function, initiate an application program, display a further menu of icons, etc.

Figure 8B:
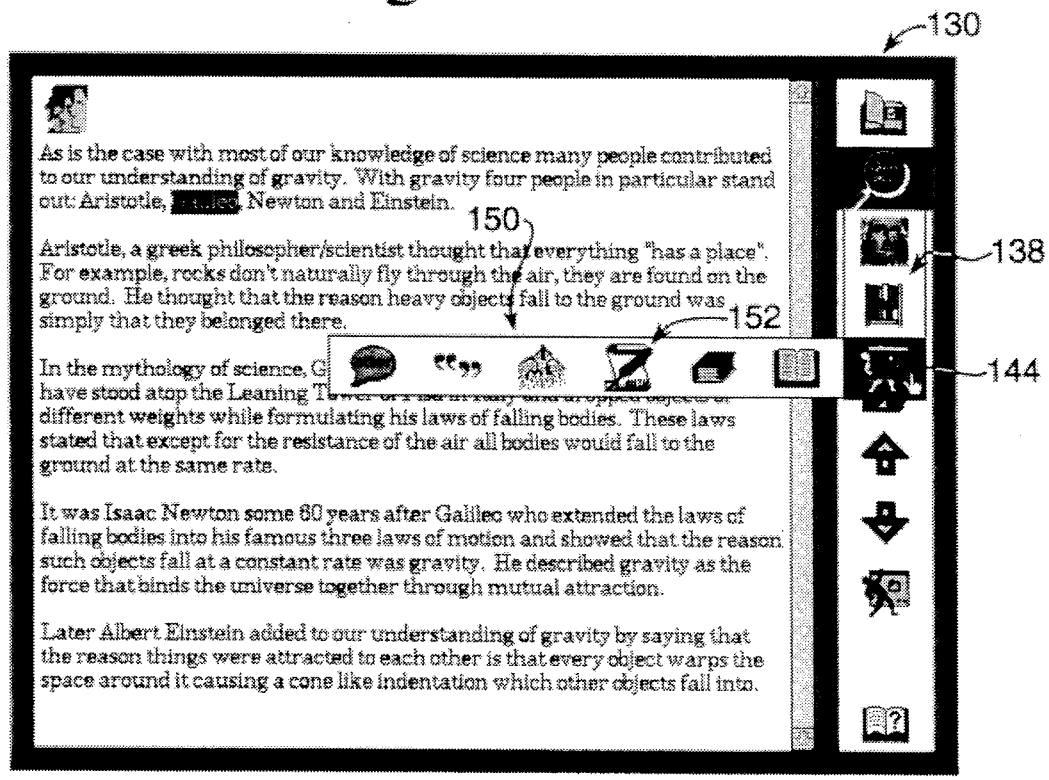

FIG. 8b shows learner interface 130 after the learner has selected feedback icon 144 in list 138; feedback icon 144 is highlighted to indicate it has been selected. Icon list 150 extends horizontally to the left of feedback icon 144 and lists several icons which were not shown in vertical list 138. The learner thus has several methods in which to enter feedback. The learner can select one of the icons in list 150 to enter feedback indicating that the selected icon needs to be presented in the first list 138. Or, the learner can click on one of the icons in list 138 to comment on one of those icons. Or, the learner can select another icon in menu 134 or an item in display area 132 to enter feedback on a specific subject or icon.

Figures 9, 10:
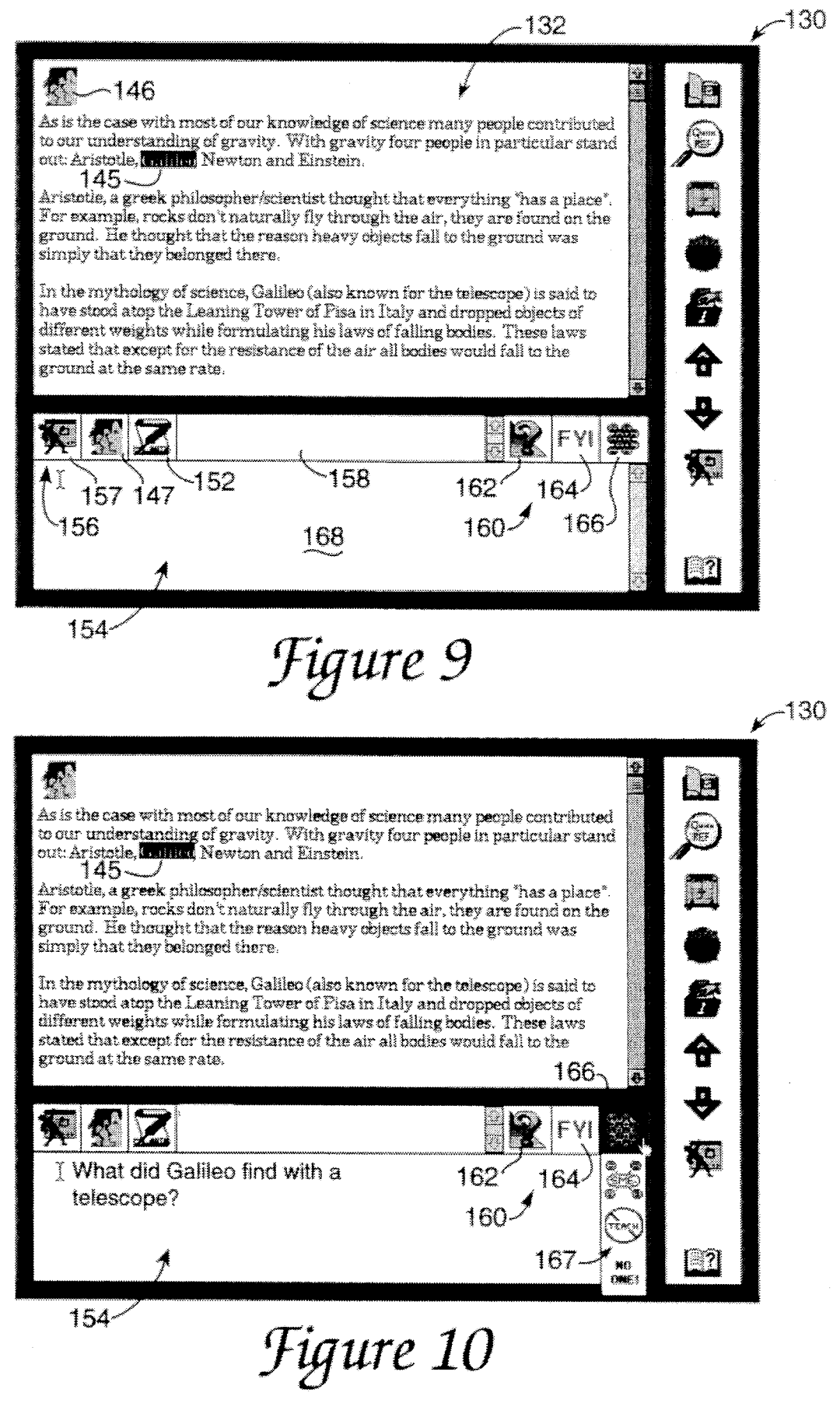

FIG. 9 shows learner interface 130 after a learner has selected an icon from list 150 as shown in FIG. 8b. For example, the learner has chosen "author's notes" icon 152. A feedback interface window 154 is preferably displayed in a lower portion of screen 24. The selected icon 152 appears in feedback window 154 to indicate the subject of the feedback. Alternatively, the feedback interface can be displayed on the entire screen 24, in a dialog box, in a window, etc.

The learner can preferably select from three different feedback modes. Mode icon 156 shows the current feedback mode. Mode icons 156 include a feedback icon 157, a contribute icon 159 (see FIG. 11), and a collaborate icon 161 (see FIG. 12). The learner can select the mode by selecting mode icon 156, which preferably causes a vertical list of icons to be displayed, similar to the icons 76 of FIG. 4. In FIG. 9, feedback icon 157 has been selected.

Representation icon 147 is displayed in feedback window 154 and shows the current representation mode being displayed in display area 132 as indicated by icon 146. Representation icon 147, selected icon 152, and highlighted word 145 in display area 132 thus define the context of the feedback item. Prompted feedback field 158, when selected by the learner, preferably causes a window similar to window 120 of FIG. 6 to be displayed. The window presents a list of feedback items that can be directly selected by the learner which are the most commonly inputted feedback items within the feedback system as well as reviewer-specific feedback items. Prompted feedback field 158 is similar in function to prompted feedback field 78, which is described with reference to FIG. 6. In an alternate embodiment, field 158 can be used as a subject field to display the text 145 that was highlighted by the learner in display area 132, and which is the subject the learner wishes to enter feedback about.

Attribute icons 160 display the currently-selected attributes for the feedback item. These attributes are similar to the attributes described in FIGS. 5a–c, and preferably include a situation attribute icon 162, a response attribute icon 164, and a sharing attribute icon 166. These icons, when selected, preferably display a vertical list of attribute segments to select from, similar to the attribute lists shown in FIGS. 5a–c. Input area 168 is used to enter specific feedback comments or messages, and is similar to message window 80 of feedback interface 42.

FIG. 10 shows learner interface 130 displaying feedback window 154. The learner has selected sharing attribute icon 166. A vertical list 167 of attribute segments is displayed, and the learner can select the most appropriate sharing attribute for the feedback item. The other attribute icons 160 display similar lists when selected.

Figure 11:
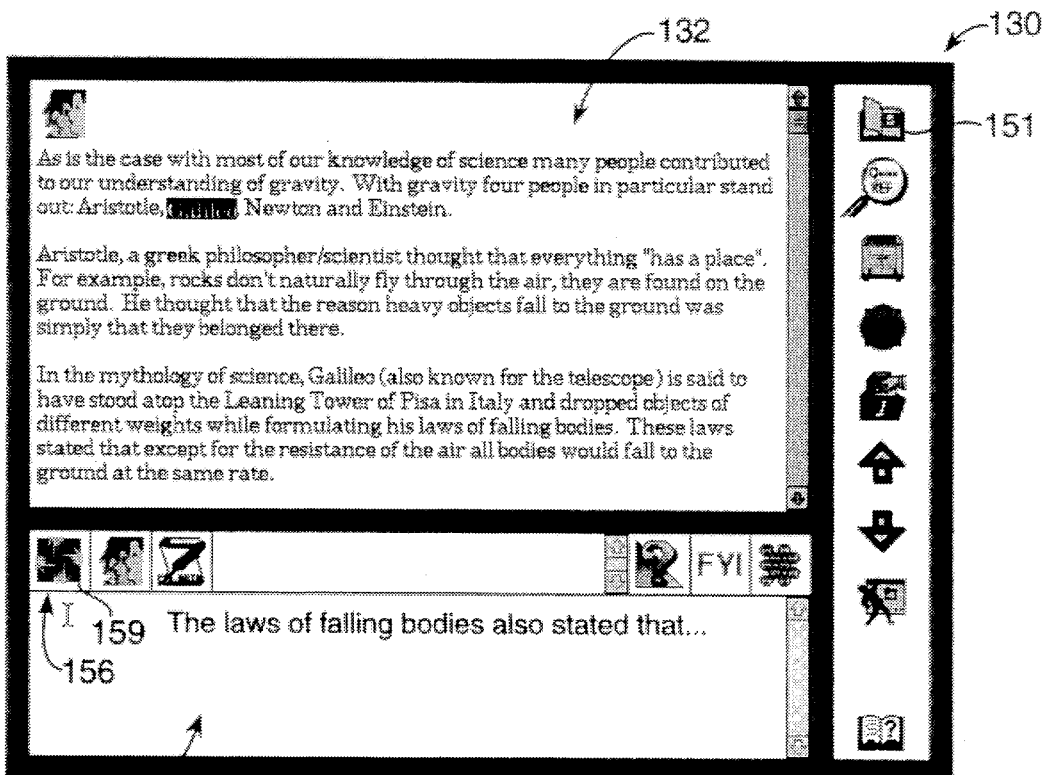
FIG. 11 is a screen display showing a contribute mode for the feedback window FIG. 9.

FIG. 11 shows learner interface 130 displaying feedback window 154. The learner has selected author's notes icon 152 from list 150. The learner has also selected contribute icon 159 as the mode icon 156. In contribute mode, the learner can input text or other forms of information that they wish to add to the course or environment from which they are learning. A reviewer can preferably view these contributions in the viewing interface 46 to determine if the contributions are worthwhile and/or take the appropriate action. Once the learner has inputted his contributions, he may send the feedback using the send icon 151.

Figure 12:
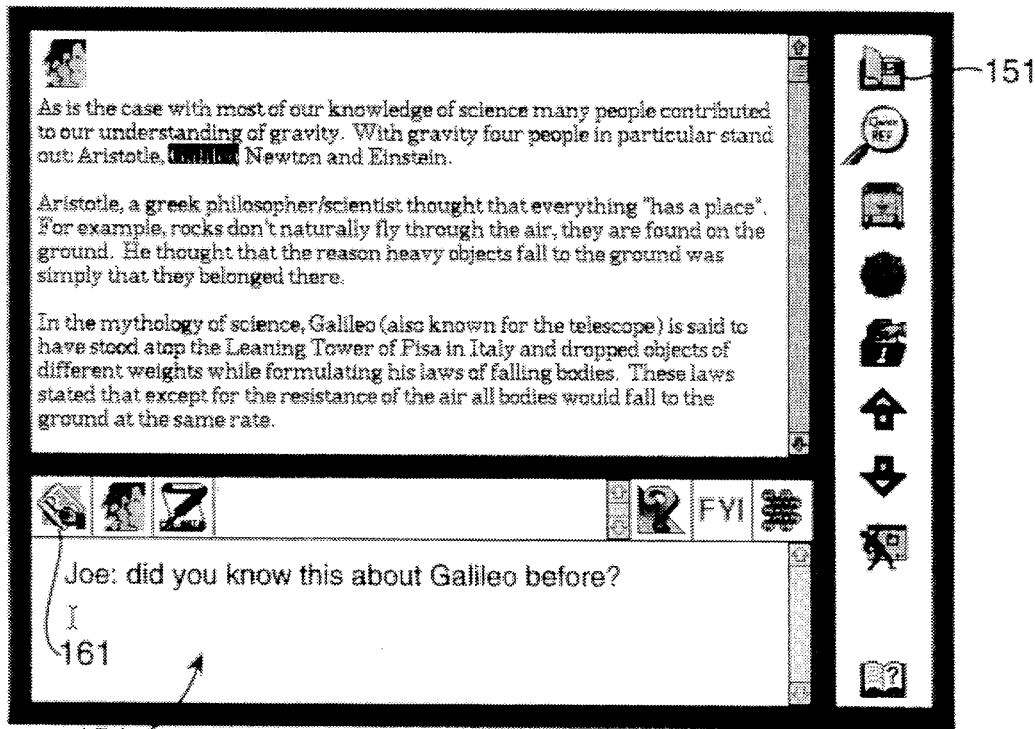
FIG. 12 is a screen display showing a collaborate mode for the feedback window of FIG. 9.

FIG. 12 shows learner interface 130 displaying feedback window 154. The learner has selected the collaborate icon 164 as the mode icon 156. In collaborate mode, the learner can input information that they wish to share with other learners, users of the system, or the author/reviewer. General comments, suggestions, or problems with a specific icon or other subject can be sent as feedback in this mode. The feedback can be sent with the send icon 151. Once the feedback is sent, the feedback window 154 is preferably removed from the display and the learner continues within the learning environment.

Figure 13A:
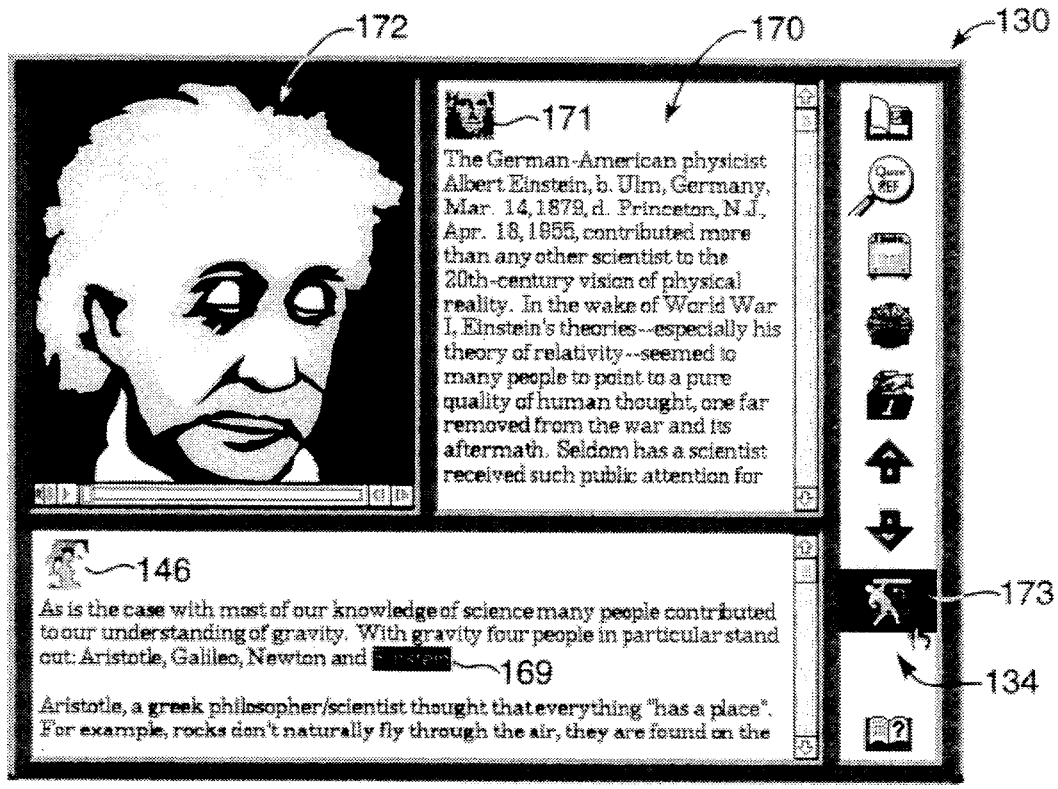
FIGS. 13a–b are screen displays showing a feedback icon and feedback context being selected in the interface of FIGS. 8a–8b.

FIG. 13a shows learner interface 130 in which the learner is displaying a course in display area 132 in Personalities representation mode, as indicated by icon 146. The learner has selected word 169 and has selected the biographical icon 140 as shown in the vertical list 138 of FIG. 8a. Display area 170 displays biographical information in response to selecting the biographical icon; the biographical window is indicated by representation icon 171. Picture window 172 is also displayed when the learner selected the biographical icon 140 according to the learner's preferences. The picture window displays a picture relevant to the selected representation and subject. The learner has also just selected feedback icon 173 which is located in main icon menu 134. The learner can now select any word or sentence in the text with a feedback cursor (shown in FIG. 13b).

Figure 13B:
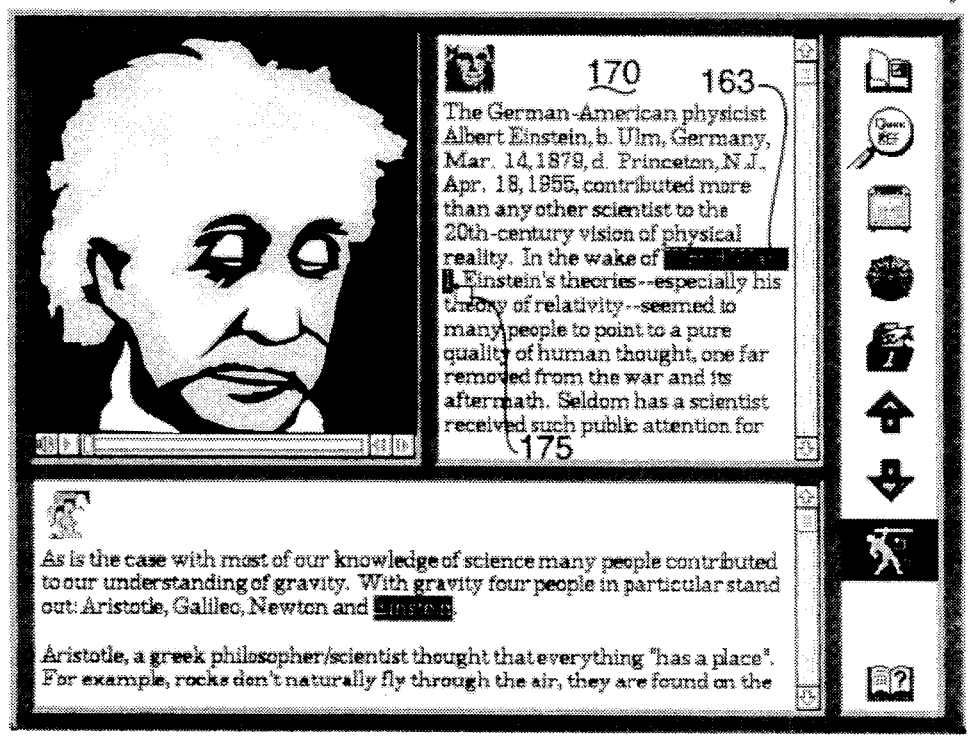

FIG. 13b shows the learner interface configuration of FIG. 13a, except the learner has selected a group of words 163, "World War I", with a feedback cursor 175. The feedback cursor indicates that the learner is in feedback mode. In the preferred embodiment, the learner is also able to select other forms of presented information to send feedback about. For example, the picture, or a portion thereof, displayed in picture window 172 can be selected or highlighted to enter feedback about the picture.

Figure 14:
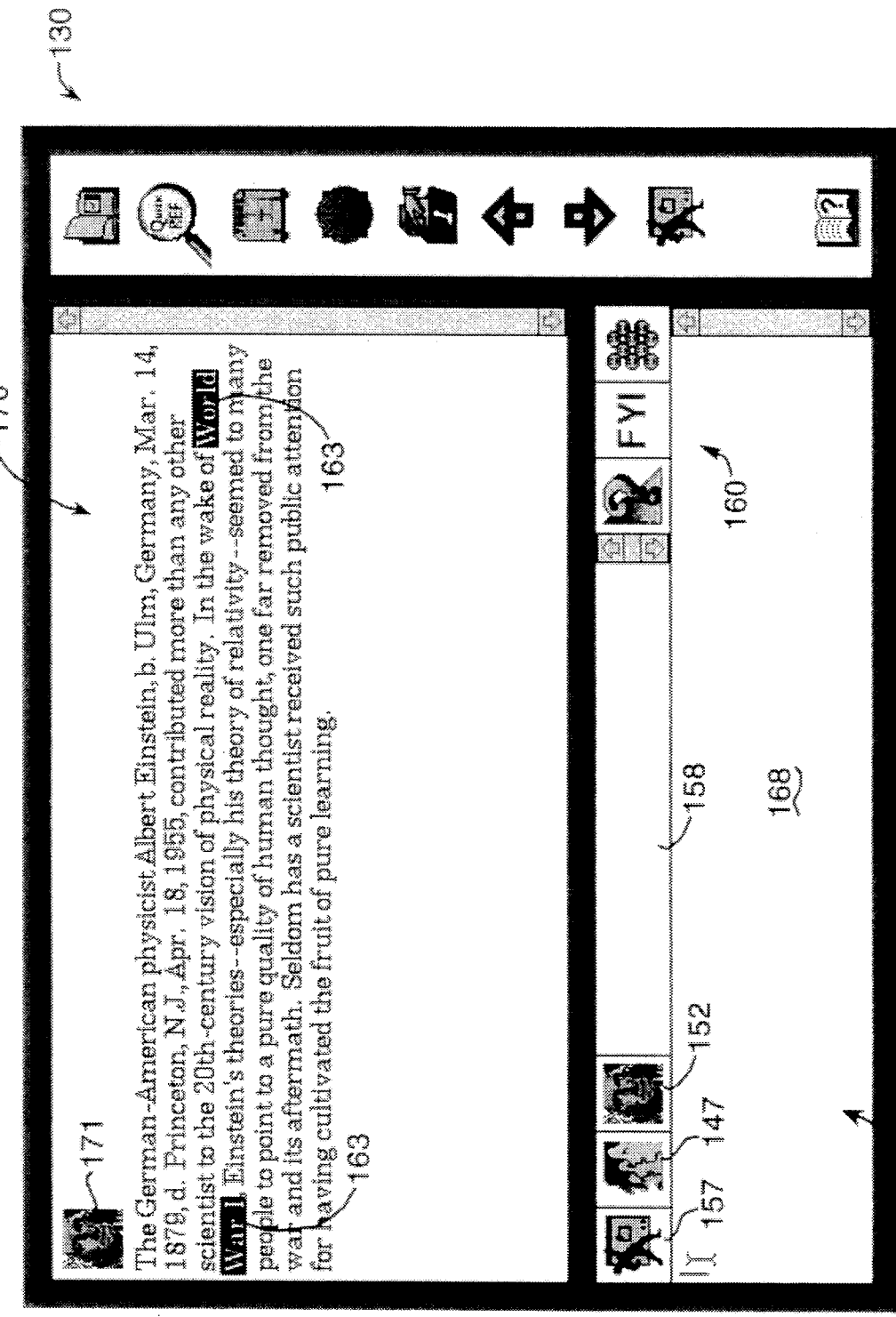
FIG. 14 is a screen display showing the feedback interface of FIG. 9 after the selection FIGS. 13a–b have been made.

FIG. 14 shows learner interface 130 with feedback window 154. Display area 170 is preferably displayed on the top portion of display screen 24 to indicate which window the subject of the feedback item originated. Display area 170 also shows highlighted text 163 to indicate the subject of the feedback item. Feedback window 154 of FIG. 14 is similar to the feedback window shown in FIGS. 9–12. Feedback icon 156 indicates that the feedback interface is in feedback mode. Representation icon 147 indicates that the learner is in Personalities representation mode. Icon 165 is the biographical icon from window 171 and indicates that this feedback item concerns that type of information. Prompted feedback field 158, attribute icons 160 and input area 168 are used in the same way as described with reference to FIGS. 9–12.

Figure 15:
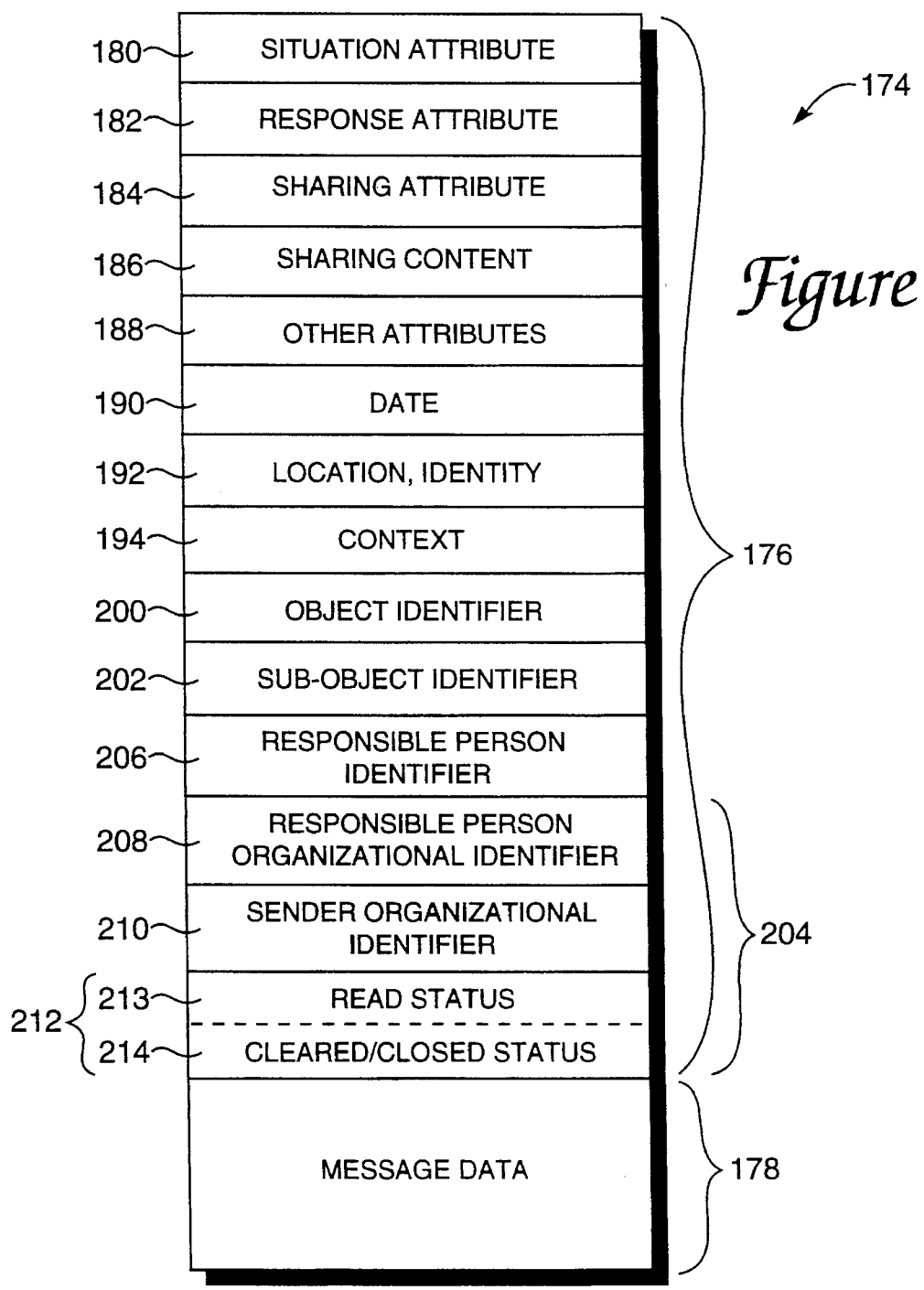
FIG. 15 is a schematic diagram of a preferred feedback record structure of the present invention.

FIG. 15 is a schematic diagram of a feedback record 174 suitable for use in the present invention. When the user or learner selects the "send" icon or a similar control to indicate he or she is finished and has sent the entered feedback item to the feedback system, the fields of a data structure, such as record 174, are filled in with the feedback information. This is described in more detail below with reference to FIG. 20. Record 174 is a data structure that is separate and independently stored from any context which the feedback record may reference; for example, record 174 is not incorporated within a data document which may be the context of the feedback information stored within the record.

Record 174 preferably includes a header portion 176 and a data portion 178. The header portion includes several fields that describe and qualify the feedback information which the user sent. Situation attribute field 180 is preferably a byte or other adequately-sized storage area sufficient for storing information describing which situation attribute the user selected. Response attribute field 182 and sharing attribute field 184 are similar to situation attribute field 180 in that they store information describing which response attribute and sharing attribute, respectively, the user selected. Sharing content field 186 is an optional field that can be used in an alternate embodiment of the feedback system in which the user can specify by name which authors, reviewers, or other learners can view the feedback message. In such an embodiment, the sharing content field would contain the names and/or identification numbers of the individuals specified to receive the feedback. Other attribute fields 188 are fields that are used for stored additional attributes describing the feedback or the user. For example, technical attributes 512, organizational attributes 514, and personal attributes 516 are preferably each stored in a separate attribute field 188 of record 174. Other attribute fields 188 can also be used or customized for additional attributes implemented by a particular system. For example, if a particular school system found a need to add an attribute for feedback describing the level of understanding achieved by a learner about a particular subject, these fields 188 in feedback record 174 can be used to store the attribute data.

Date field 190 stores the data defining the date and exact time when the user sent the feedback message. Preferably, this is the time when the user actually sent the feedback, i.e. when send icon 92 or 151 was selected. Alternatively, two times can be stored in this field: a time indicating when the user first accessed the feedback interface, and a second time indicating when the user selected the send icon to send the feedback. The amount of time that users are spending to send feedback could thus be collected and reviewed as a feedback item in itself to determine if the feedback system needs improvement.

Location/identity field 192 stores the identity of the user who is sending the feedback. A user can be identified in several ways. The identity of the user can be stored as the location of the user, physically or within the structure of the organization, where the most detailed level of the location can be the user's actual name. The user's identity can also be stored as an identification number, such as a student number, employee number, etc. A computer terminal identification number can also be stored, i.e. which specific hardware input interface the learner is using.

Figure 15A:
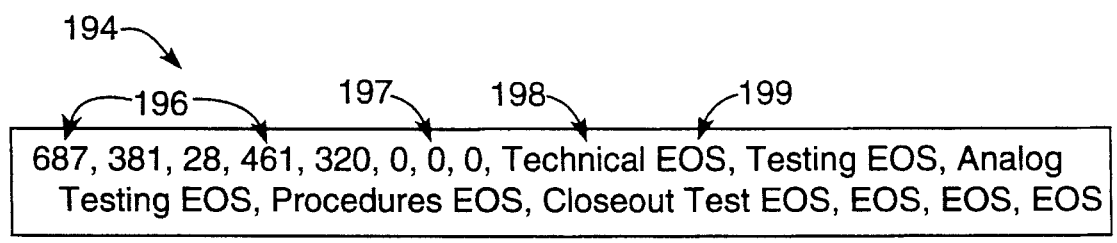
FIG. 15a is a schematic diagram showing an example of the context field of the feedback record of the present invention.

Context field 194 stores the context (or "location") of a feedback item. As shown above in feedback interface 52, the context can be implemented as a series of categories and sub-categories about a particular subject, each sub-category selection defining the context to a greater degree. In such an embodiment, each category or sub-category preferably is assigned a specific identification number which tells the learning environment or other environment the identity of the category. Categories can thus be moved to different category levels yet still be identified by the identification number. To store such categories in context field 194, the ID numbers of the categories may be first listed, followed by the string alphanumeric characters of the category names. For example, as shown in FIG. 15a, the context of the user as shown in FIGS. 4–7 is stored in context field 194. Identification numbers 196 are listed first, one number for each category chosen, preferably in the order of increasing narrowness of scope. Place holder numbers 197 indicate that no further sub-categories have been selected at the bottom three levels. Thus, in the described embodiment, a maximum of eight levels of categories can be specified. In other embodiments, a different maximum number, or a maximum number limited by available memory, can be used. String names 198 are the category labels and are listed in the same order as identification numbers 196, so that "Technical" is matched to "687", "Testing" to "381", etc. End-of-string characters 199 specify the end of each string name, and are also used to mark the last three unused levels of categories.

The context of feedback can also be specified as shown in the learner interface embodiment 130 of FIGS. 8–14. In such an embodiment, context can be specified in field 194 using a similar method as shown in FIG. 15a, where each representational icon and other selected icons have an ID number associated with them.

Object identifier field 200 is an optional field that stores an object identifier which references an object the user may be referencing with his or her feedback information. Examples of objects include a page of material in a course, a sentence or word on the page, a picture displayed on the screen, a movie, etc. In this described embodiment, for each object used in a learning environment or system, an identification number is associated with the object. Objects can thus be referenced and manipulated within the learning environment more efficiently. In the feedback system, objects can be used to further define the context when feedback is provided. If the learner were on a specific page in a course when he didn't understand something and entered the feedback interface, that page's identification number can stored in the feedback record in the object identifier field (in other embodiments, the page or other objects can be stored as part of the context 194 and/or as part of technical attributes 512). A reviewer viewing the feedback record then knows which specific object the learner was viewing at the time of feedback. In an alternate embodiment, object identifier field can also be used similarly to identify separate application programs which the learner may have been running within the learning system, such as a simulation program, a tutoring program, etc.

Sub-object identifier fields can be used to store identifiers for sub-objects, if any are used. For example, if an object within a learning system is defined as a page, sub-objects can be defined as certain sentences or words on the page. If the object is a picture, sub-objects can be defined as specific areas on the picture, or even attributes of the picture such as color or resolution. Alternatively, identifiers for sub-objects can be stored after parent objects in the object identifier field 200.

Author fields 204 are preferably filled in after the user has sent his or her feedback and has exited the feedback interface. A separate "clean-up" program can be used to fill in these fields before feedback record 174 is stored in the main database block 44. Author fields 204 include a responsible person identifier field 206, which stores an identifier referencing the "responsible" person for the feedback. In the described embodiment, a reviewer can preferably specify particular people in an organization who are responsible for specific contexts, courses, topics, information groups, etc. of the learning environment or computer environment. The CPU 12 or a different CPU in the feedback system accesses a separate listing or database of responsible people for various contexts. The context field 194 of a sent feedback record is examined and a responsible person is matched to the context. For example, the head of a physics department can be designated "responsible" for all feedback relating to physics. That person's identifier is stored in field 206 of feedback record 174. Other people responsible for sub-contexts of physics can also be listed in field 206.

Responsible person organizational identifier field 208 stores an identifier for the responsible person for the feedback record that identifies the responsible person's place within an organization. For example, the responsible person may be an employee three levels down from the manager of the division. The employee's position in the company's hierarchy is reflected in the identifier stored in field 208. The CPU 12 or a different CPU in the feedback system accesses information stored in a separate database that maps the responsible person's hierarchical position to a ID number. That ID number is stored in field 208. The responsible person fields 206 and 208 are optional, and in some embodiments, no responsible person is assigned and stored in each feedback record.

Sender organizational identifier field 210 stores an identifier that identifies the user's position within the organization. A CPU uses the same mapping information used for field 208 to map the hierarchical position of the user to an ID number, which is then stored in field 210. In other embodiments, the sender's organizational identifier can be stored in location field 192. Or, organizational attributes 514, stored in other attributes fields 188, can be used to specify the user's position within an organization.

Flag fields 212 store specific flags for feedback record 174. Two flags in the preferred embodiment are used for a read status field 213 and a cleared/closed status field 214. Read status field 213 stores a flag that indicates if the message of the feedback record has been viewed by the responsible person of the feedback (or other reviewer). A reviewer thus knows if he or she has viewed a feedback record's content. If several responsible people are indicated in responsible field 206, then a read status flag can be assigned to each responsible person. Cleared/closed status field 214 stores a flag that indicates if the feedback record has been cleared or closed, which means that the issue(s) that the feedback raises have been addressed and/or resolved. A reviewer can thus clear a feedback record once he or she has viewed it so that it is not on his or her "to do" list. The cleared record can be still accessible to other reviewers; alternatively, the cleared record can be considered resolved and not accessible to anyone.

Data portion 178 of feedback record 174 is used to store the actual feedback message that the user has inputted. The message data preferably first includes a field indicating which input mode the user used (keyboard, pen, microphone, etc.) so that the data can be interpreted correctly. The actual message data can follow the mode field. If text, the message can be stored as characters, and any other form of input can be stored as bits.

Although a specific feedback record embodiment has been described in detail, it should be appreciated that the actual structure of the feedback record may be widely varied within the scope of the invention. In some embodiments, it may be desirable to significantly reduce the size of (and thus amount of information stored in) the feedback record. In others, additional and/or different fields may be desirable to facilitate a specific purpose.

Figure 16:
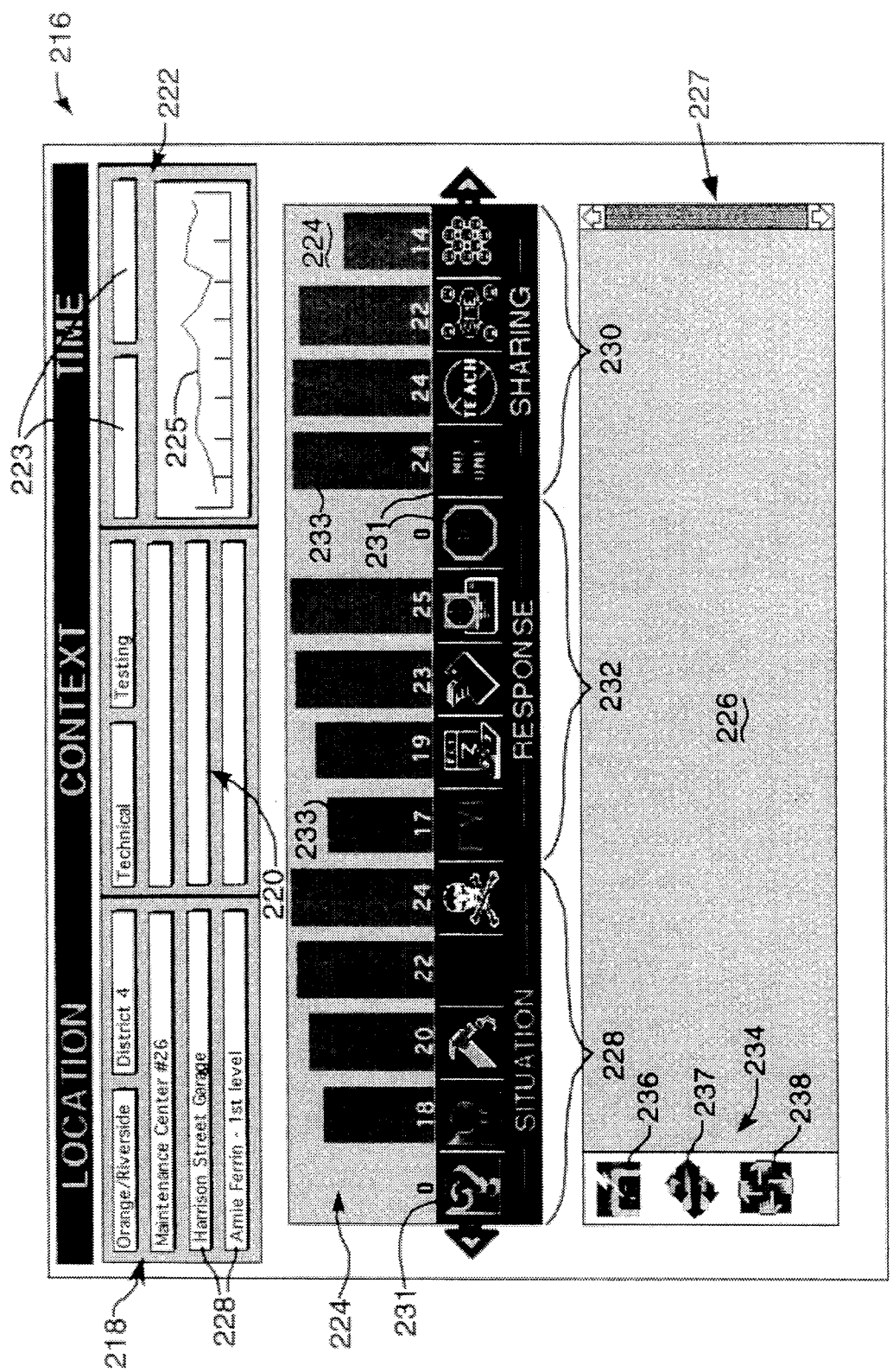
FIG. 16 is a screen display showing a first embodiment of a feedback viewing interface; the present invention.

In FIG. 16, display screen 24 shows a first embodiment of a feedback viewing interface 46 or "feedback visualizer" which is displayed at the reviewer end of feedback system 40 as shown in FIG. 2. The viewing interface can preferably be accessed and displayed at any time by a reviewer, whether that reviewer is working in an authoring environment or a reviewing environment. When the reviewer accesses the viewing interface, the database of feedback records 174 is scanned by the CPU, and the available feedback records are converted into visualizer records in RAM and presented by the viewing interface. This process is further detailed with respect to FIG. 22.

In the preferred embodiments, the viewing interface provides information about feedback records on two levels. The first level is a general overview level, in which general patterns in feedback can be discerned; this level would be often used, for example, by upper management or supervisors in an organization, or people looking for overall patterns in feedback. By making selections in the viewing interface, the reviewer should be able to effectively choose a specific subset of feedback records that are of interest to the reviewer, and then view the patterns of those selected feedback records. Herein, the selected subset of feedback records chosen by the reviewer to view is known as the "combined set" of feedback records. The second level of information presentation is a more specific level, in which particulars about each feedback record can be viewed, analyzed, and responded to. For example, in a learning environment, this level would be more often used by authors and teachers closer to students sending feedback and who have to deal directly with specific feedback issues. Viewing interface 46 preferably includes a location window 218, a context window 220, a time window 222, one or more attribute windows 224, and a message window 227.

Location, context and time windows 218, 220 and 222 are used by the reviewer to specify from, respectively, which users or physical locations he or she wants to view feedback, which contexts he or she wants the feedback to describe, and which time period from which he or she wants the viewed feedback records to originate. Location window 218 is used to specify the physical location from which feedback data will be presented. The window includes a number of fields 228 which are used to progressively define the source location for feedback. For example, the fields can be specified, from most generic to most specific, as follows: Orange/Riverside County, District 4, Maintenance Center #26, Harrison Street Garage, Arnie Ferrin—1st level. Thus the combined set of feedback records presented in viewing interface 46 must be from a user named Arnie Ferrin. If the last two fields were left blank, the combined set of selected feedback records will be from Maintenance Center #26, and so on. In some embodiments, the physical location of a user can be specified in context window 220 as a different form of feedback context. In other embodiments, window 218 can be implemented to specify different user attributes, such as organizational attributes 514, technical attributes 512, and personal attributes 516 as shown in FIG. 28.

Context window 220 specifies the context of the combined set of feedback records to be presented by the interface 46. The reviewer can specify context to the same level of detail that a user can specify. For example, if a user specified testing procedures down to the "closeout test" level as shown in FIGS. 3–7, a reviewer can specify to view feedback for this category as well, and the user's feedback message would be included in the combined set of feedback records presented to the reviewer. If the reviewer specified only "Testing" (second category) and left the next three fields blank, a larger amount of testing feedback data would be included in the combined set, including the "Closeout Test" (fifth category) feedback. As shown in FIG. 16, a context of "Technical/Testing" is selected to limit the viewed feedback record context to "Testing."

Time window 222 displays the preferred time period over which the reviewer wishes to examine feedback. The reviewer changes time parameter fields 223 to specify a time span. A graph 225 pictorially displays the distribution of feedback messages that have been received over the time period specified in fields 223, with the amount of feedback records being indicated in the vertical direction. Preferably, the graph is automatically scaled to vertically and horizontally fit into the window 222 according to the specified time span and the amount of feedback records. One of the fields 223 can be used to specify the horizontal resolution of the graph so that each horizontal division can represent a day, a month, a week, etc.

Attribute window 224 presents graphical representations of the combined set of feedback that the reviewer has selected in the viewing interface. The attribute window also allows a reviewer to select particular attributes which he or she would like feedback records in the combined set to include. In the described embodiment, the attributes are organized into the main attribute categories that may be assigned to feedback. In FIG. 16, there are three attributes (i.e., situation, sharing, and response) which are organized into situation group 228, response group 232, and sharing group 230. Each attribute group in window 224 presents each of the possible choices, herein known as "segments", for that attribute. A segment button 231 is preferably provided for each segment and can be toggled as "checked" or "unchecked" (i.e., selected or deselected, respectively, using a pointing device or other input device) by the reviewer. In FIG. 16, all buttons 231 are shown highlighted, i.e., checked. If the reviewer unchecks a checked segment button 231, records having that attribute segment are subtracted from the combined set of records. If the reviewer checks an unchecked segment button, records having that attribute segment are added to the combined set of feedback records. The checked or unchecked status of a segment is preferably shown as highlighted or unhighlighted, respectively.

Attribute window 224 displays bar graphs 233 above each of the segment buttons 231 for the attribute which is associated with the segment. The vertical length of each bar graph preferably represents a number of feedback records associated with the segment. A filled bar graph is displayed for a checked segment and indicates the number of feedback records which will be subtracted from the combined set of feedback records if the segment is unchecked. An unfilled bar graph is preferably displayed for an unchecked segment and indicates the number of feedback records which will be added to the combined set if the segment is checked (see FIGS. 17 and 18). Alternatively, all bar graphs can always be displayed as filled (or unfilled), and segment buttons 131 would alone indicate if the segment were checked or unchecked. In an alternate embodiment, the bar graphs 233 can be selected or deselected by the reviewer to check or uncheck a segment instead of (or in addition to) selecting segment buttons 231. In a different embodiment, bar charts can represent only the number of feedback records that will be subtracted from the combined set if the segment is unchecked (i.e., all unchecked segments will have a zero-level bar graph).

In FIG. 16, all the segments are checked and therefore the feedback records in the combined set are only limited or filtered by the location, context, and time windows. For example, situation group 228 presents the five situation attribute segments as defined in FIGS. 3–7. There are zero feedback records having the "question" attribute segment that would be subtracted if the question segment were unchecked, 18 feedback records having the "suggestion" attribute segment that would be subtracted, etc. In effect, a checked segment (filled) bar graph shows the amount of feedback records in the combined set that include that segment. Similarly, response group 232 presents the response segments "FYI", "higher priority", "feedback desired", "waiting for response" and "stopped" as filled bar graphs representing number of feedback records having those segments. Sharing window 230 presents similar bar graphs representing feedback messages with the "no one", "no boss" (or "no teacher"), "workgroup", and "everyone" sharing attribute segments.

In an alternate embodiment, attribute groups 224 can display "pie charts" instead of bar graphs to represent numbers of feedback records, wherein a single pie chart represents a single attribute. Each attribute segment can be displayed as a "wedge" in the circular "pie", and the entire pie can represent the number of feedback records in the combined set having a specific attribute.

Windows 218, 220, 222, and 224 can all be considered "filters", since they provide options for the reviewer to limit the number of feedback items in the combined set to his or her particular choices. A number of feedback records are thus filtered out so that the reviewer can view only those feedback records relevant to his or her needs.

In one embodiment, all segment buttons 231 are selected and the location, context, and time fields are blank when the viewing interface 46 is first accessed by a reviewer. This means that all of the feedback records accessible to the reviewer are included in the bar graph displays of windows 224. In another embodiment, the viewer's preferences can be read in when the viewing interface is first accessed, and the filters are automatically set to saved, preferred settings.

Message window 227 is used for viewing particular feedback messages and/or other information stored in a feedback record in a more detailed, specific way than the other features of the viewing interface allow, and includes a display area 226 and an icon area 234. Display area 226 preferably displays the amount of feedback messages available to the reviewer and then presents all or some of those messages, one at a time, for the reviewer. The message content displayed in area 226 is read from the message data portion 178 of the feedback records 174. The messages can be displayed in the mode that the learner entered them (as text, pictures, voice, etc.) or in whatever output mode is available.

Icon area 234 includes icons that the reviewer can select to manipulate the feedback message. Feedback icon 236, when selected, will allow the reviewer to send a response back to the learner who sent the feedback message displayed in display area 232, i.e. the reviewer can send feedback about feedback. Once the feedback icon is selected, the reviewer can preferably input a message in window 227. Send icon 237, when selected, will send the reviewer's response to the learner. Share icon 238, when selected, will cause a prompt to be displayed so that the reviewer can input names of other reviewers. The reviewer can then select send icon 237 to send a specific feedback message and/or the reviewer's response to the reviewers who were specified. Other icons that can be used which are not shown in FIG. 16 include a storage icon which causes the feedback message to be stored in specific areas for the reviewer's convenience. A prompted response icon can also be included which causes a menu of predefined responses to be displayed, similar to the prompted feedback window 120 of FIG. 6 for users. The reviewer can quickly choose a reply from the list of responses if an appropriate reply is shown.

Figure 17:
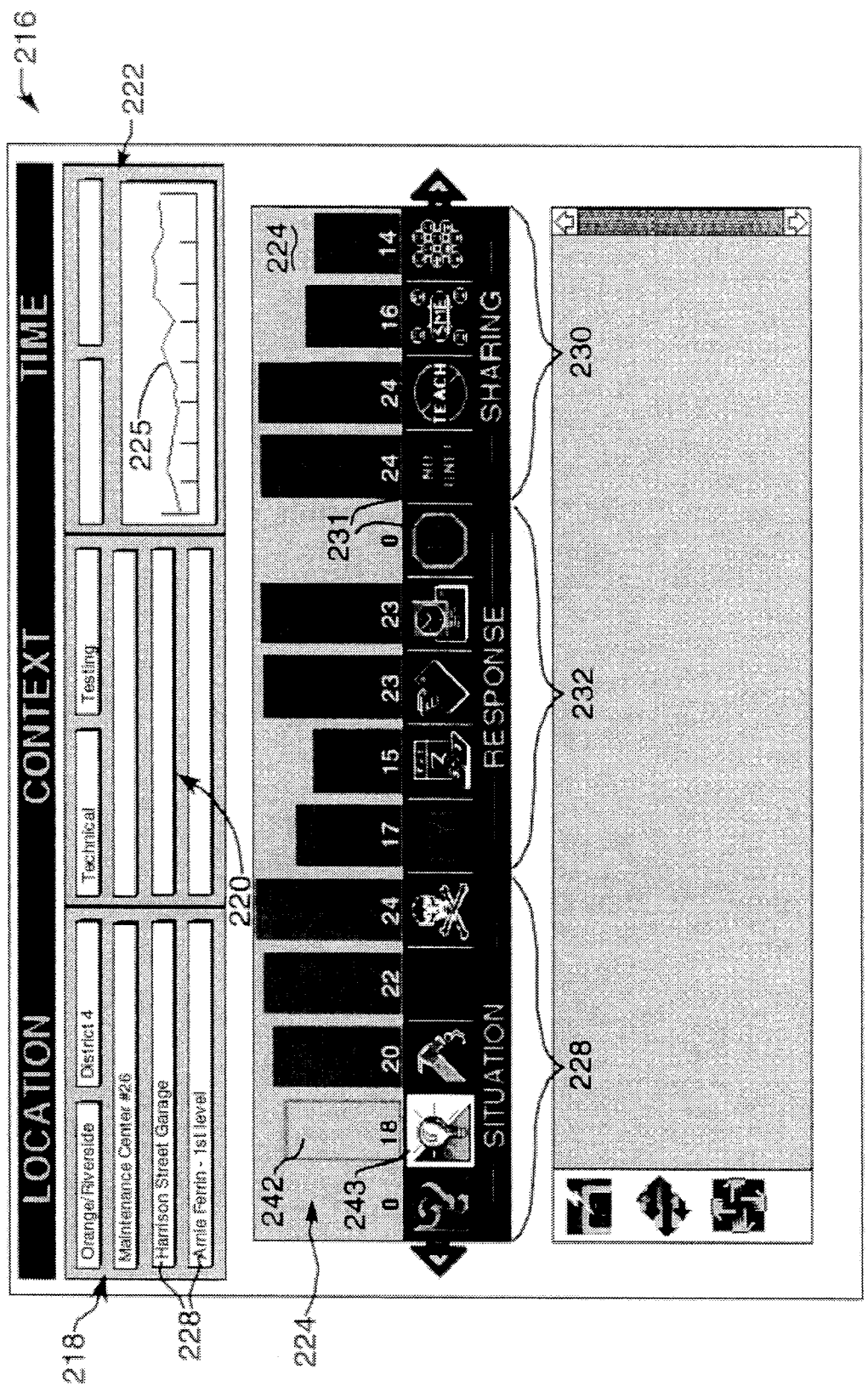
FIG. 17 is a screen display showing the viewing interface of FIG. 16 with a different set of preferences.

FIG. 17 shows viewing interface 46 displaying a different combined set of feedback records which the reviewer has selected using the filters. All visualization windows are updated when a reviewer checks or unchecks a segment or changes the location, context, or time span of the combined set. In FIG. 17, the reviewer has unchecked the "suggestion" segment 242 by selecting segment button 243. This means that the reviewer desires that all feedback records having the "suggestion" segment be subtracted from the combined set of feedback records. Segment bar graph 242 is now shown unfilled and represents the amount of feedback records which would be added to the combined set if the reviewer checked the "suggestion" segment. The unchecked "suggestion" segment does not effect the other segments in the situation group 228, since those segments are already describing feedback records that do not have the suggestion segment attribute. However, in sharing group 230 and response group 232, the bar graph levels have changed. These windows now present feedback records that do not have the suggestion attribute segment. Accordingly, the levels of their bar graphs will be the same or lower. Likewise, time window 222 displays a changed graph 225 of feedback records within the specified time range that do not have the "suggestion" attribute segment. The filter windows thus present the currently-selected combined set of feedback records, and each window must reflect the changes made in other windows.

Figure 18:
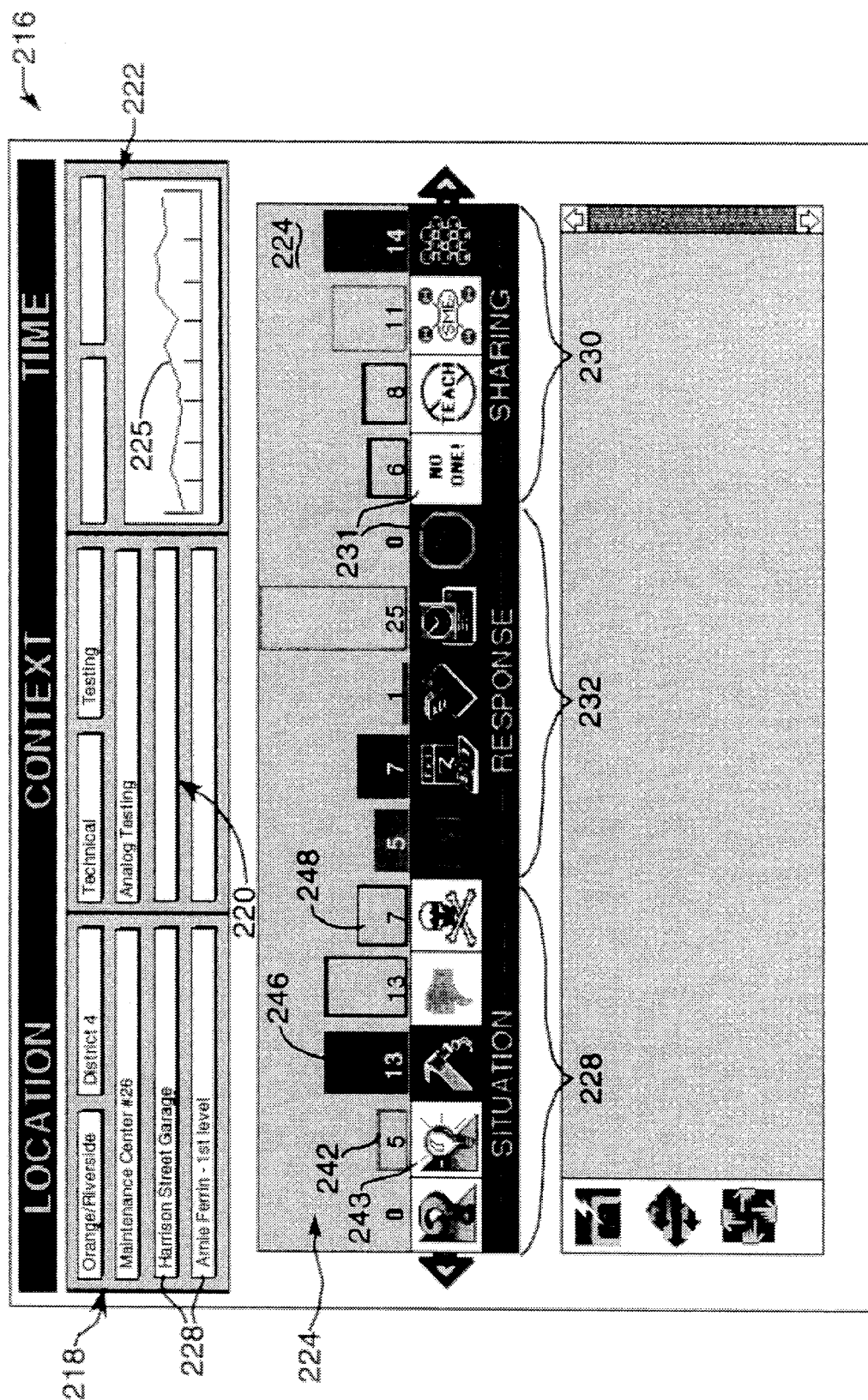
FIG. 18 is a screen display showing the viewing interface of FIG. 16 with a third set of preferences.

FIG. 18 shows another example of reviewer-selected settings affecting the combined set of presented feedback records in viewing interface 46. The reviewer has deselected all attribute segments except for the "everyone" sharing attribute segment 244, the "problem" situation attribute segment 246, and all of the response attribute segments. The reviewer has also further defined the context in context window 220 from "Testing" to "Analog Testing." As shown in attribute windows 224, all the bar graphs are shorter, since the selection of "Analog Testing" subtracted out all feedback records from the combined set which did not relate to analog testing, including other records about other types of testing. The bar graphs of attribute window 224 also are much changed. Unchecked segments show the amount of feedback records that would be added to the combined set if those segments were checked. The "question" situation segment, for example, shows a zero-level bar graph and indicates that no feedback records would be added to the combined set even if records with the "question" segment were included. Checked segments show how many feedback records having those segments are in the combined set. The bar graphs of response group 230 are affected further, since they can only present feedback records having both the "everyone" sharing segment 244 and the "problem" situation segment 246. The graph 225 in time window 222 likewise shows much reduced numbers of feedback records over time due to the more-specific reviewer preferences. Graph 225 has been automatically scaled to fit in time window 222. If the reviewer were to check one of the unchecked segments, for example the "disaster" segment 248, then all feedback records having the disaster attribute segment will be added to the combined set of presented feedback records and the graphs in the filter windows will change to reflect the new combined set. In this way, a reviewer can quickly input specific preferences for which feedback records they are most interested in and instantly view in all windows the amount of feedback records include those segments.

Figure 19:
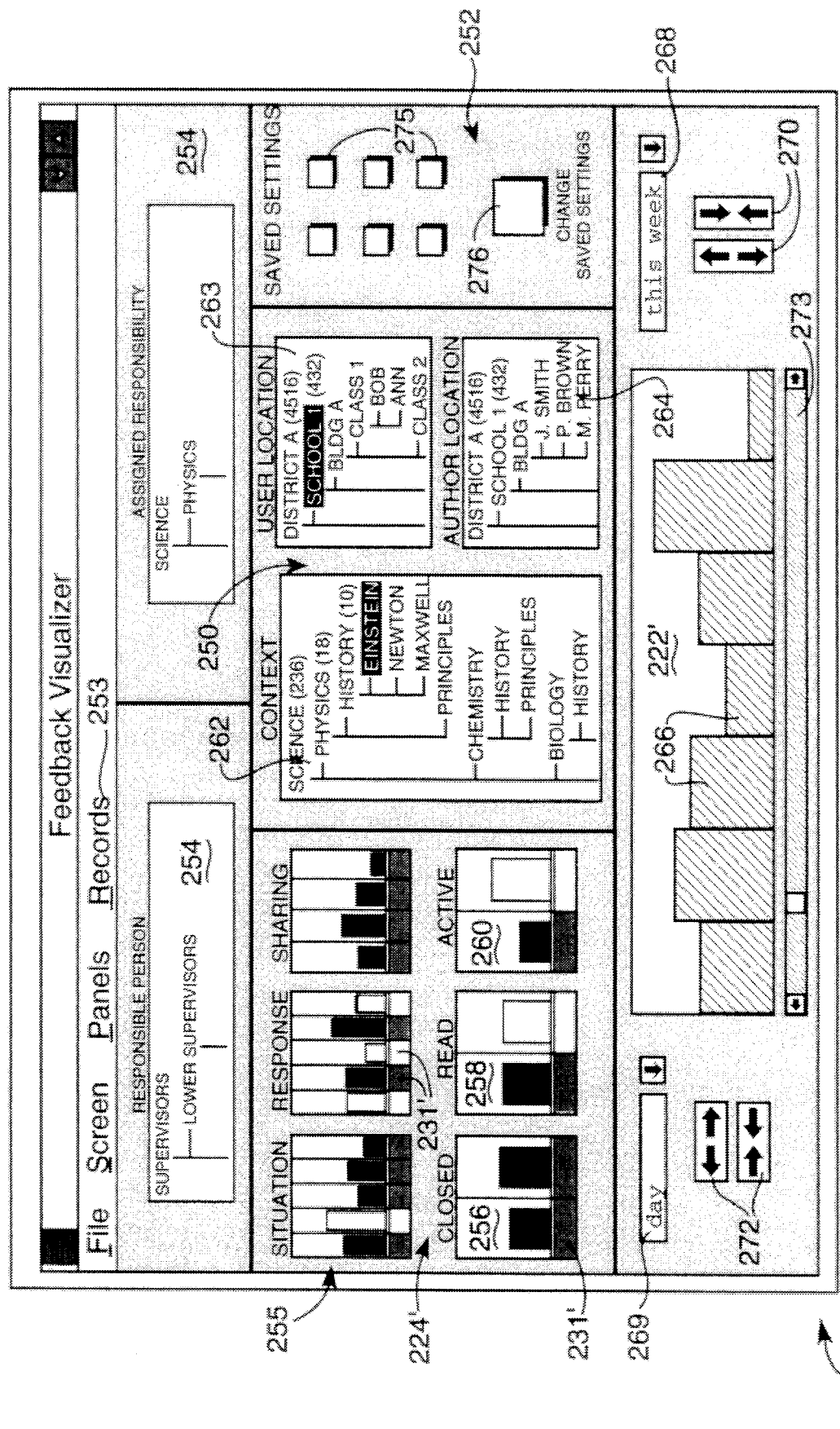
FIG. 19 is a screen display showing a second embodiment of a feedback viewing interface.

FIG. 19 shows a second embodiment of a viewing interface 46' which includes attribute windows 224', organizational trees 250, time window 222', saved settings 252, and responsibility area 254.

Attribute windows 224' are filters that are similar in function to the attribute window 224 described with reference to FIGS. 16–18. Each attribute that can be assigned to a feedback record has an attribute window, and each attribute window displays a bar graph for each possible segment that can be assigned to the attribute. An attribute window thus corresponds to an attribute group of FIG. 16, and the bar graphs of an attribute window are preferably filled and unfilled as described with reference to FIG. 16. Viewer interface 46' includes three attribute windows 255 for the three attribute groups shown in interface 46 and also shows additional attribute windows. Status window 256 shows feedback records having an open status and having a closed status as determined by flag field 214 of a feedback record 174. Read window 258 shows feedback records that have been read and not been read by the reviewer as determined by flag field 213 of a feedback record. Active window 260 shows how many feedback records are currently in the combined set of feedback records, i.e. how many feedback records are "active." Active window 260 also shows how many feedback records are inactive, i.e. how many records are not in the currently-selected combined set. If the active and inactive numbers are added together, the result is the total number of feedback records available to be viewed by the reviewer.

In the preferred embodiment, the bar graphs can be selected by the reviewer in several ways. For example, a reviewer can check or uncheck a segment by clicking a first button, such as a left mouse button, when a pointer is pointing to a bar graph or segment button 231'. The reviewer can also check one segment in a filter and uncheck all the other segments in that filter simultaneously by double-clicking the first button on the desired segment. The reviewer can also display the value (i.e. number of records) which a bar graph (or all bar graphs) represents by depressing a second button, such as a right mouse button, while pointing to a bar graph. The value could be removed from the screen when the second button is released.

In another embodiment, the reviewer can also preferably display a temporary combined set, for example, as follows. The SHIFT key on a keyboard is pressed simultaneously with a right mouse button to cause a selected segment to be checked and all other segments in the filter to be unchecked (similar to the double-click selection explained above). The temporary combined set of this selection is calculated and displayed in the viewing interface as long as the reviewer holds down the right mouse button. When the button is released, the original combined set is redisplayed.

Organizational tree windows 250 are similar to the location and context windows 218 and 220 shown in FIG. 16. Preferably, a context tree window 262 defines which context of feedback records the reviewer wishes to be included in the combined set. The context is displayed hierarchically, and branches and sub-branches of a tree can be selected to further define a context similarly to the category fields shown in window 220 of FIG. 16. For example, a branch heading "physics" can be selected, and a list of sub-branches under physics are displayed. The reviewer can click on one of the sub-branches to highlight the branch heading word and limit the feedback records to the context of the sub-branch. Preferably, next to each branch heading, a number indicates how many active feedback records are within that heading and in the combined set. Similarly, a learner location tree window 263 is used to select the feedback records having a particular source (learner) location, similar to the location window 218 shown in FIG. 16. An author location tree window 264 is also provided. In this tree, feedback items can be specified according to a particular author or hierarchical location of an author or other person responsible for content available to users of the feedback system. For example, the responsible person ID number and responsible person organizational ID number in fields 206 and 208 of a feedback record can be used to display the hierarchical structure of the organization at the author or reviewer end. Thus, for example, all feedback pertaining to a course that a certain teacher authored can be viewed in the viewer interface by selecting appropriate branches of the author location tree that include the teacher.

Time window 222' is similar to time window 222 shown in FIG. 16, and includes additional features. Bar graphs 266 represent the amount of feedback records in the current combined set distributed over a specified time period. Several additional controls allow the reviewer to customize the time window's display. Time span control 268 allows a reviewer to select a time span over which to view the distribution of feedback records. Choices in a drop-down menu include "This Week", "this month", "today", "yesterday", "last month", "date range", wherein "date range" allows the reviewer to enter a customized date range, and "all", wherein "all" selects all days and thus all the feedback records in the combined set. Resolution control 269 allows the reviewer to specify the time period resolution of each bar graph. For example, a reviewer can choose "day" from dropdown menu 269 and "this week" from time span control 268. Each bar graph in time window 222' will thus represent a number of feedback items for one day, so that seven bar graphs will be displayed for the week. Other choices for resolution control 269 include "week", "month", "quarter", and "year." Note that selections from controls 268 and 269 limit the combined set of feedback records and cause attribute windows 224' to change levels of bar graphs in accordance with the amount of feedback records in a specified time span.

Time window vertical scaling controls 270 and horizontal scaling controls 272 modify the display of bar graphs in time window 222'. Vertical scale controls 270 modify the vertical scale of the window so as to increase or decrease the displayed height of the bar graphs 266. Horizontal scale controls 272 expand or retract the horizontal time scale of window 222' so as to increase or decrease the width of bar graphs 266. Horizontal scroll bar 273, when selected, allows a reviewer to scroll the time window and thus move the bar charts to see other bar graphs not currently shown in window 222'.

Saved settings 252 are preferably a number of icons or buttons allowing the reviewer to load or save a desired set of selections in the viewing interface 46'. A saved settings button 275 represents a saved set of selections such as particular attribute segments checked/unchecked, a particular time span, context, etc. When the reviewer selects a button 275, the viewing interface recounts the feedback records and displays all bar graphs, organizational trees, and other displays according to the saved set of selections. Create/change saved settings button 276 will save the current selections in the viewing interface to disk or other storage device and assign one of the saved settings buttons to the set of selections as the reviewer specifies.

Responsibility area 254 (optional) is preferably used to assign specific reviewer responsibilities to specific contexts, locations, etc. used by the learning system. In the described embodiment, organizational trees similar to organizational trees 250 are displayed to specify a responsible person within the hierarchical organization. A reviewer can preferably assign responsibilities to people "under" him in terms of the organizational structure. For example, an administrator can access a specific set of records under a location and a context. The manager can assign people in his department to be responsible for specific contexts or locations of feedback records. One method of assigning responsibility is to use an organizational tree to select a specific individual, and then use a different context and/or location organizational tree to assign context or responsibilities to the selected individual. Once a person is assigned to be responsible for a particular subset of records, the database of feedback records can be scanned and the responsible person field 206 of those records in the particular subset is filled in with the person's name, ID number, etc.

In one embodiment, a separate message window (not shown) is displayed when the reviewer selects a menu heading, such as heading 253. Alternately, a reviewer can view message content by selecting a filter, such as bar graphs 266. The message window is similar to message window 234 shown in FIG. 16. A list of specific feedback records is presented in the message window with additional information such as the user who sent the feedback, the time it was sent, etc. The reviewer may select a feedback record from the list to display the specific message content from that feedback record which is stored in message data portion 178 of the record. The reviewer can then respond to the message, send the message to other reviewers, etc., as described with reference to FIG. 16. Alternatively, a reviewer can select a bar graph using a specific control, for example by "double-clicking" a right mouse button, to display a message window presenting a list a records having the selected segment. The reviewer can then select a specific record's message content as described above.

Menu headings, such as heading 253, can be used for other functions of viewing interface 46'. For example, a menu or similar controls can be used to further filter the type of feedback records viewed. A reviewer could thus specify from a menu list to view feedback records, for example, of a particular mode, such as feedback mode, contribute mode, or collaborate mode, as described with reference to FIGS. 9, 11, and 12.

Figure 30:
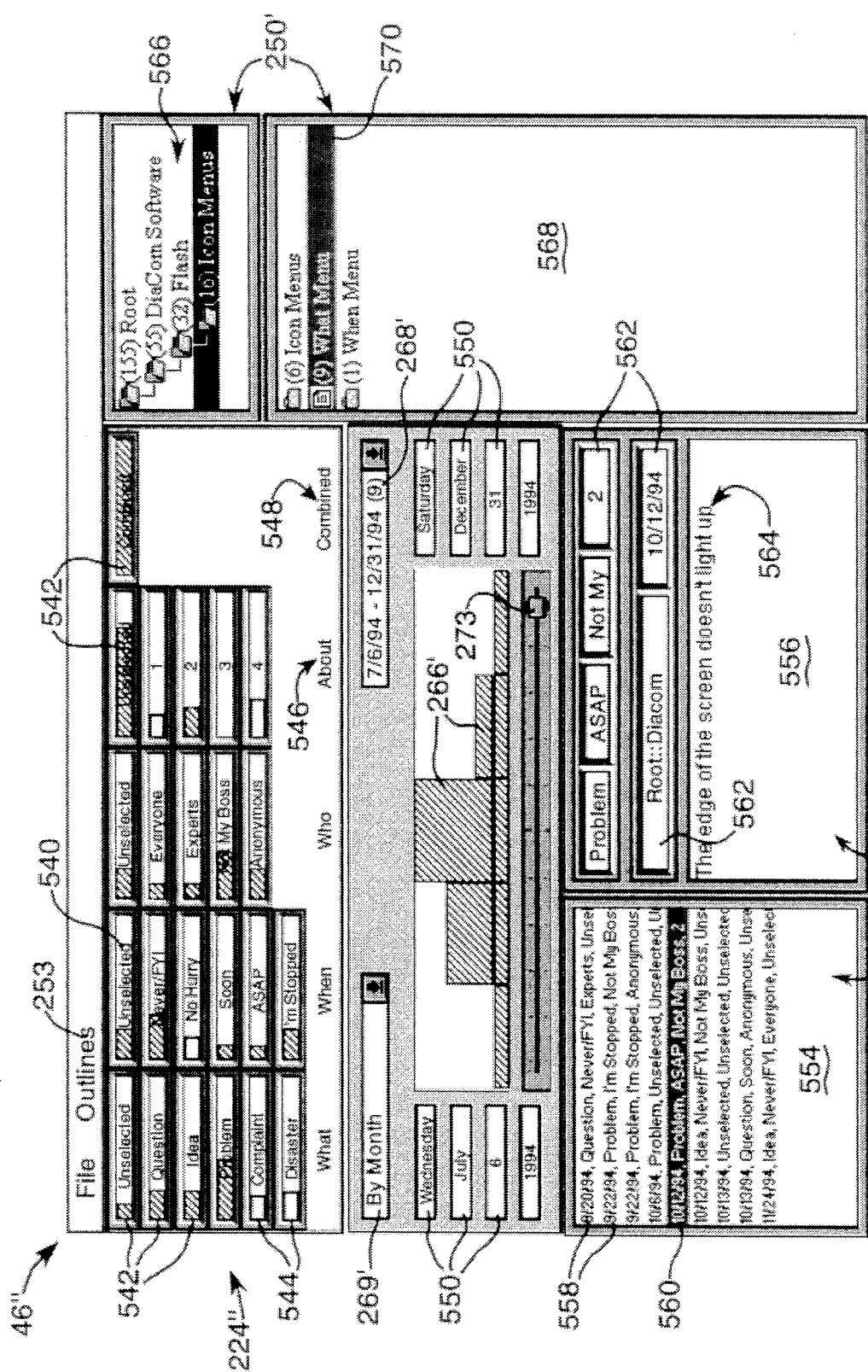
FIG. 30 is a screen display showing a third embodiment of the viewing interface for the visualization of feedback items.

FIG. 30 shows a third embodiment of a viewing interface 46" for the visualization of feedback items. Viewing interface 46" is similar to viewing interface 46' with filter windows organized differently. Attribute window 224" includes attribute segments that are displayed as horizontal bar graphs 540 which are functional buttons that can be selected or deselected by a reviewer. Segments of an attribute are organized vertically; for example, the segments of the "what" (situation) attribute are shown as a vertical group of buttons. A segment is considered selected (checked) when the bar graph is a solid, darker color, such as bar graphs 542. Conversely, a segment is considered "unselected" (unchecked) when the bar graph is a light-colored bar graph, such as bar graphs 544. A reviewer preferably clicks on a bar graph button to select or deselect that attribute segment. Other selections using other controls (such as double clicking, using the right mouse button, keyboard keys, etc.) Can also preferably be performed as described with reference to FIG. 19.

An additional segment of "unselected" is also shown for each of the attributes of viewing interface 46". The unselected bar graph shows how many feedback records in the combined set did not have a segment checked for that particular attribute. The "about" attribute 546 corresponds to the "about" attribute shown in FIGS. 29a and 29b above, and groups attribute segments that are designed by the reviewer, as well as a feedback attribute segment 127 for feedback records about the feedback system. Combined attribute 548 is similar to active attribute 260 as described with reference to FIG. 19.

Time window 222" is similar to time window 222' shown in FIG. 19. Bar graphs 266' show the amount of feedback records for each unit of time in a specified time range. Time span control 268' specifies the time span and also shows in parentheses how many feedback records are in that time span (which is also the number of feedback items in the combined set). Fields 550 are positioned on each side of bar graphs 266' and show the start and ending dates for the time span. Fields 550 also allow the reviewer to selectively change the time span by a desired unit. For example, the reviewer can select the "July" field 550 and choose a different month from a displayed list of months. Other fields, such as the weekday name, would change appropriately after such a selection. Resolution control 269 specifies the unit of time each bar graph 266' represents. In FIG. 30, not all the bar graphs are shown; however, other bar graphs in the specified time span can be scrolled on the screen by moving horizontal scroll bar 273' with a pointing device or other input device. Time window 222' can also be preferably used as a filter by selecting particular bar graphs 266'. For example, a reviewer can select two bar graphs representing the days Tuesday and Friday, which would filter the feedback records so that only records having a date of Tuesday or Friday would be included in the combined set.

Message windows 552 display individual feedback records and the content of those records, similar to message window 226 described in FIG. 16. In window 554, a list of feedback records in the selected combined set of records is displayed. Each feedback record is preferably displayed as a line of text 558, where each line of text preferably includes the date the feedback record was created and the attribute segments, listed in a predefined order, that the user selected (or did not select) for each attribute. In addition, the context is preferably listed (not shown in window 554). For example, a feedback record listed as "Sep. 20, 1994, Question, Never/FYI, Experts, Unselected, Root: DiaCom Software" would indicate that the feedback record was created on Sep. 20, 1994, and that the user selected "question" for the "what" attribute, "Never/FYI" fore the "where" attribute, "Experts" for the "who" attribute, and did not select an attribute for the "about" attribute. Finally, the feedback record has a context of "Root: DiaCom Software."

Window 556 displays the content of a feedback record selected in window 554. For example, text line record 560 has been selected by the reviewer by double clicking a mouse button. Text line record 560 is highlighted, and the listed date, attributes, and context of record 560 are displayed in fields 562 of window 556. The message content 564, if any, of the highlighted record 560 is displayed as text in window 556. Message content 564 can also be presented as audio information, graphical information, or in whatever form the user input the message and which the reviewer prefers to accept.

Context windows 250' are similar to organizational tree windows 250 of FIG. 19. In an alternate embodiment, context windows 250' can be selected to be displayed over the entire area of a display screen. The reviewer may further filter the feedback records in the combined set by selecting a context in a hierarchical tree. Context window 566 is used to show the hierarchical structure of contexts from which the reviewer can select. Each context category is shown as a "folder" with the number of feedback records having the specified context. For example, as shown in FIG. 30, 55 feedback records have the context category "DiaCom software." Of those 55 feedback records, 32 have the context category "Flash," and so on.

Context window 568 shows the context subcategories within a selected category of window 566. A category displayed as a "folder" icon indicates that sub-categories exist within that category, while a category displayed as a document sheet has no subcategories. Thus, as shown in FIG. 30, window 568 shows the subcategories of the highlighted "Icon Menus" category of window 566. These subcategories include another "Icon Menus" subcategory, a "what menu" subcategory, and a "when menu" subcategory. Each subcategory shown in window 568 also shows the number of feedback records having that subcategory. A reviewer may filter the combined set of records by selecting a subcategory in window 568 to allow only those feedback records having the selected category in the combined set. For example, "what" subcategory 570 is highlighted, indicating that only records having a context of "what" are presently in the combined set.

Additional functions can be implemented by viewing interface 46. One such function includes additional filters to further constrain the feedback records in the combined set according to reviewer preferences. One such filter is described below with reference to FIG. 32. A different function can include reviewer changes to the viewing interface 46 and the feedback interface 42. For example, a reviewer can preferably change the attribute names and attribute segment names. One way to do this is described with reference to FIG. 31, below. The changes would preferably appear in both viewing interface 46 and in feedback interface 42. A reviewer can also preferably change the appearance of icons in feedback interface 42 as a response to a user's feedback to improve the feedback system or as a preference of the reviewer. For example, a menu 253 can be selected which could display a screen of icons as they currently appear. The reviewer could select a different icon or could draw a new icon, and the changed icon could then be saved in storage block 44 so that the new icons would appear in a feedback interface 42 accessed by a user. A reviewer can also preferably make changes to the prompted feedback items 121 and 123 as shown in FIG. 6 to display new or additional items or remove some items from the item list. These changes would again be stored in storage block 44 and appear in every feedback interface 42 accessed by a user. Such editing and manipulation of graphical symbols (such as icons) and retrieval of these symbols from a database is well known those skilled in the art.

Other general features can also be implemented in the viewing interface which allow a reviewer or author to create material or information that is available to users of a learning environment or other computer environment implementing the feedback system. Such an authoring system can be incorporated within the viewing interface so that the creation of such information is fully complemented and supported by feedback information.

Another additional function which can be implemented in viewing interface 42 includes reviewer access to an exact context of a user which sent a feedback item. For example, a reviewer can examine a particular feedback message in a record which states that a particular symbol in a schematic, such as an OR gate, is unclear. The context of the user who sent the feedback is already stated by category names in context window 250 or 250' of viewing interface 46' or 46", for example, as "Application programs/drawing programs/schematic programs/schematic symbol/OR gate." The reviewer could also be presented with a button which, if selected, would provide the reviewer with a more detailed description of the context, even the exact context itself if the context were implemented on a computer system. In the case of the schematic symbol, the reviewer could select this button, which could launch the actual schematic program and document and present the reviewer with the exact symbol and application program which was the subject of the feedback message. To implement such a function, a link or pointer could be provided to an application program, document, or other data when a user selects a context for his her feedback associated with that application program, data, etc. Such a link, stored in the feedback record, could be predetermined for particular contexts. In yet other embodiments, a reviewer could effect improvements to the launched application in response to the feedback item at the time of viewing the exact context. Providing more detailed contexts, as described above, may not be beneficial or possible for some types of feedback messages, such as a complaint about employee benefits, for example.

Figure 31:
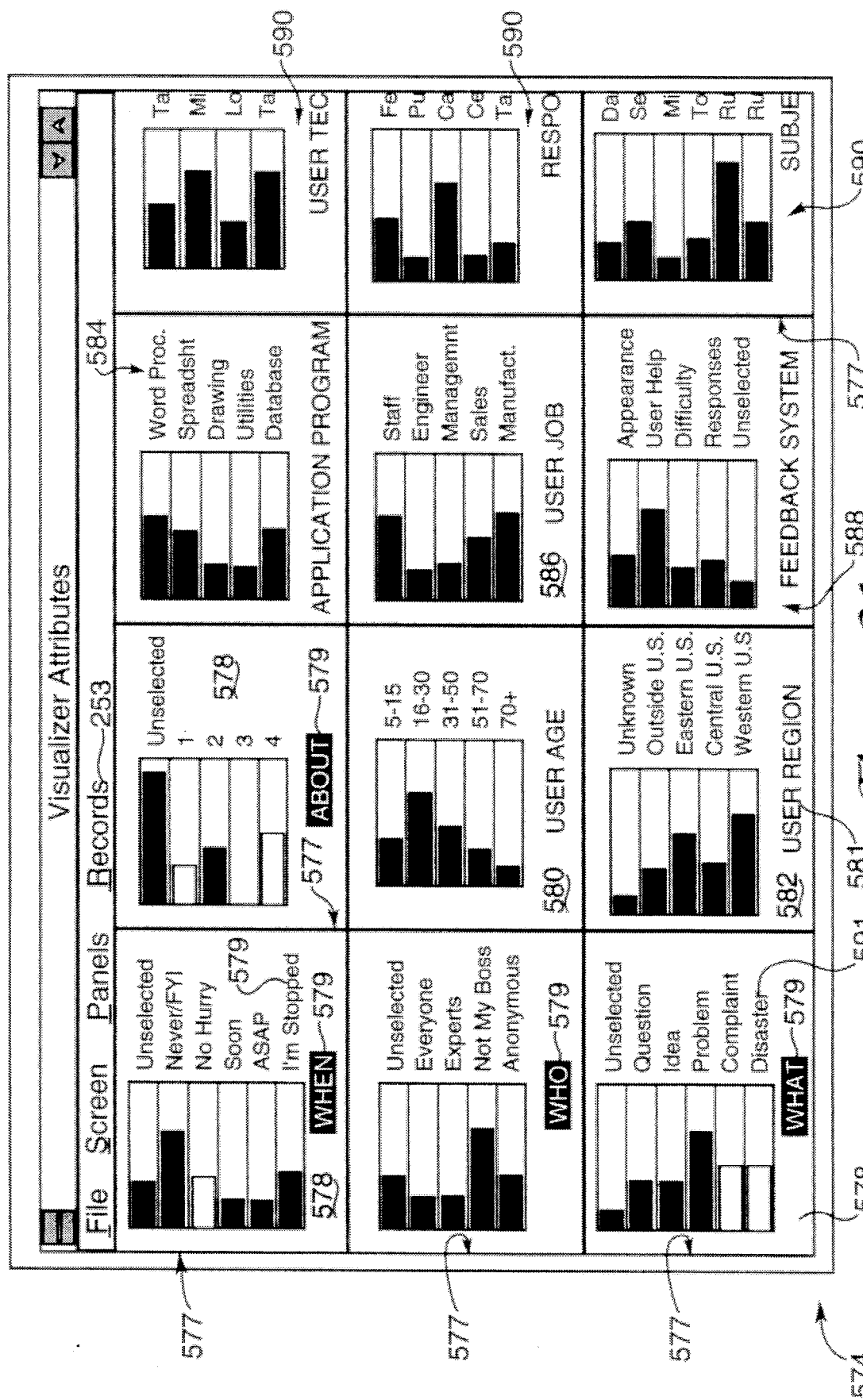
FIG. 31 is a screen display showing a separate list of visualizer attributes that can be used as a function of the viewing interface.

FIG. 31 shows a separate attribute list screen 574 of visualizer attributes that can be used as a function of a viewing interface 46 as shown in FIGS. 16, 19, and 30. Preferably, all of the available attributes which can be assigned to feedback records in the feedback system and selected in the viewing interface are presented in FIG. 31. Since, typically, there are many more attributes for a feedback record than can be efficiently and realistically presented in the viewing interface 46, many attributes are not shown in the viewing interface 46. For example, in the viewing interface 46" of FIG. 30, five attributes are shown in attribute window 224". These five attributes can be default attributes which are presented in the main viewing interface 46 and may be only a small portion of the total attributes that are assigned to a feedback record.

In this embodiment, a reviewer can view additional attributes on list screen 574 and can also preferably select other attributes to be presented in attributes window 224" of the viewing interface in place of the default attributes. The reviewer can access attribute list screen 574 using, for example, a menu selection from menu items 253 or other viewing interface control. Attribute list screen 574 is then displayed, showing some or all of the attributes and the attribute segments which can be assigned to a feedback record in the feedback system. In the described embodiment, each attribute is displayed in an attribute box 577. This list of attributes can vary from one feedback system to another depending on the attributes desired by the reviewers and users in a particular system.

The attributes shown in list screen 574 include the "when," "who," "what," and "about" attributes 578 shown in the viewing interface 46 of FIG. 30. In the described embodiment, "preferred" attributes (i.e., attributes which are currently selected to be displayed on the main viewing screen 46) are marked to distinguish them from other "non-preferred" attributes which are not displayed in interface 46. For example, the titles 579 of the preferred attributes 578 are shown in inverse, while the titles 580 of the non-preferred attributes are displayed as black letters. The non-preferred attributes in the example of FIG. 31 include technical attributes 512, organizational attributes 514, personal attributes 516, and other attributes of significance to the reviewer. For example, in FIG. 31, a user age attribute 580 is a personal attribute 516 that describes the user's age, and a user region attribute 582 is a personal attribute which describes the physical region at which the user was situated when he or she entered feedback. Similarly, technical attributes 512 such as application program attribute 584 can be included in the attribute list to provide information on which application program the user was using just prior to entering feedback. Likewise, organizational attributes 514 such as job attribute 586 (describing the user's job) can be provided. Other attributes can be used to provide information about a particular aspect of users' feedback; for example, feedback system attribute 588 provides information on how many feedback records were concerned with aspects of the feedback interface and system. Additional attributes 590 can preferably be scrolled onto the screen or displayed on attribute list screen 574 in place of the other attributes shown in FIG. 31.

Attributes displayed in list screen 574 are preferably shown similarly to the attributes displayed in viewing interface 46. In FIG. 31, they are displayed as horizontal bar graphs similar to the attributes of viewing interface 46" of FIG. 30. Filled (dark) bar graphs show the attribute segments that are currently selected, and unfilled bar graphs show the attribute segments that are currently deselected. Preferably, only those attributes selected to be displayed on the main viewing interface screen 46 can have deselected attribute segments, i.e., all attribute segments of non-preferred attributes are selected.

The non-preferred attributes may be of particular significance to a reviewer, who may desire to replace some or all of the currently preferred attributes with currently non-preferred attributes on the main viewing interface 46. For example, the reviewer may decide to replace the "about" attribute displayed in interface 46 with the "user age" attribute. To select an attribute to be displayed on the main viewing interface screen 46 (i.e. from non-preferred to preferred), several possible methods can be employed. For example, a reviewer can deselect a preferred attribute 578 by pointing to the title 579 or an attribute segment of the attribute 578, which can "unhighlight" that attribute 578 (display the attribute box 577 in a different color, etc.) The user can then select a non-preferred attribute in a similar way. This would cause the preferred attribute to become non-preferred, and vice versa. The previously non-preferred, now-preferred attribute could be displayed in the same area on viewing interface 46 which the attribute it replaced was displayed. Other methods can also be used to deselect and replace an attribute with a different attribute. In addition, an attribute can be deselected (made non-preferred) and not replaced with any attribute (a blank area, for example, can be displayed in viewing interface 46 where the deselected attribute was once displayed).

In some embodiments, a reviewer can also preferably deselect an individual attribute segment and replace that attribute segment with a different segment. For example, a reviewer might only wish to be presented with the "I'm stopped" segment of the "when" attribute and the "Disaster" segment of the "what" attribute, while leaving all other attributes and segments off the main screen. The reviewer can preferably select just these two segments to be displayed in viewing interface 46. The selection can be accomplished, for example, by selecting the segment words 591 to display that segment as a preferred segment (display the segment words as inverse, etc.) Segments that reviewer does not wish to be displayed can be designated non-preferred by clicking on segment words 591 a second time so that the words are highlighted in a different color, for example. Various other methods can be used to select particular segments as preferred or non-preferred.

In alternate embodiments, a reviewer also may preferably edit attributes and attribute segments and/or add new attributes or attribute segments. For example, the reviewer can select an attribute box 577 for editing by clicking with a different mouse button, etc. The attribute name can then be edited, or the particular attribute segment names can then be edited or changed. A reviewer could even remove some segments from an attribute in the editing process. In some embodiments, the changes that the reviewer makes to the attributes and segments can be saved in storage block 44 in the feedback system 40 and can be presented to users in feedback interface 42 if the reviewer desires.

Figure 32:
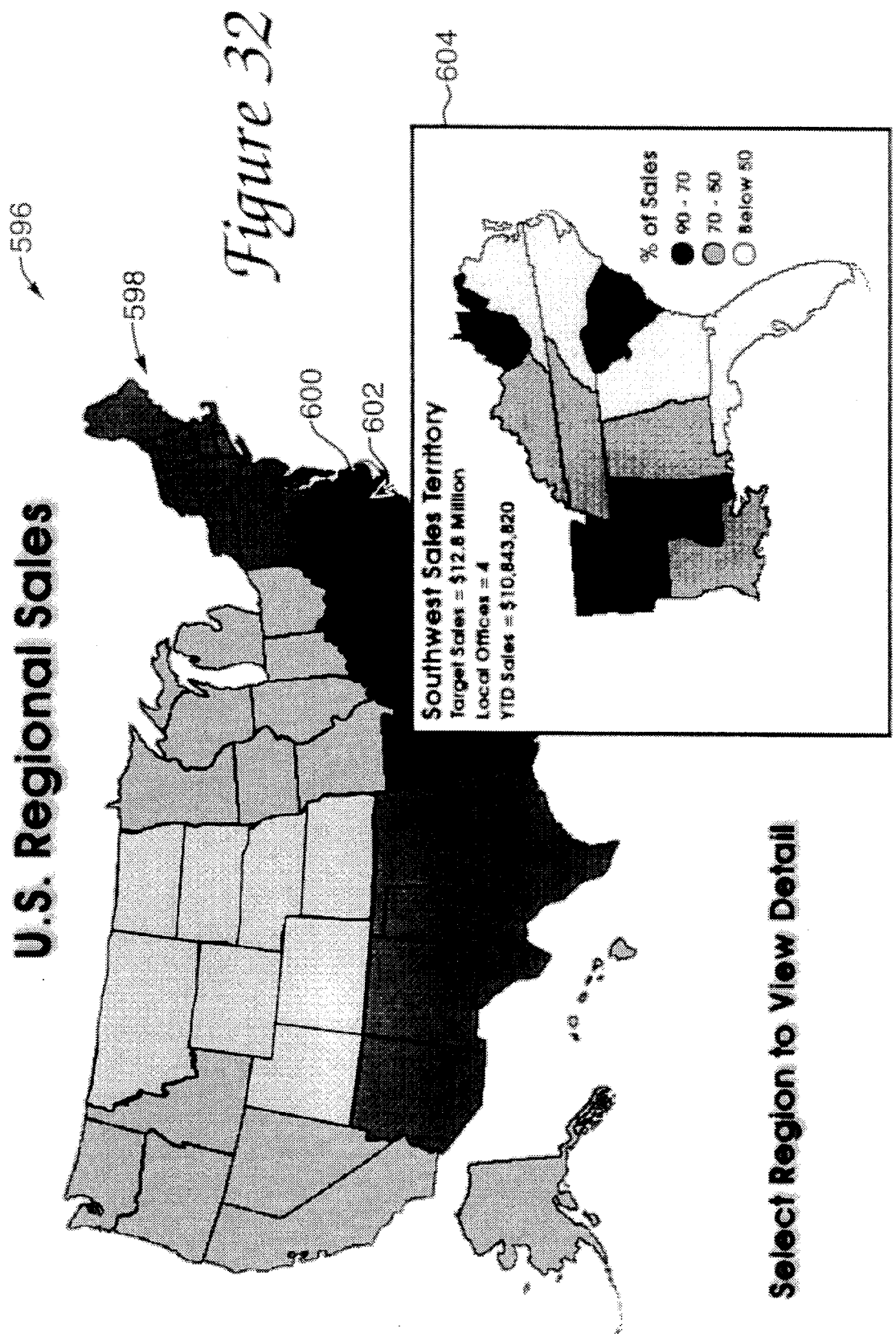
FIG. 32 is a screen display showing an example of an additional filter used for the viewing interface.

FIG. 32 is a screen display of an example of an additional filter 596 used in viewing interface 46. Filter 596 can preferably be available to reviewers using viewing interface 46 for specific applications. For example, data for filter 596 can be stored in storage block 44 and called by viewing interface 46" in accordance with a reviewer's selections. Filter 596, as shown in the example of FIG. 32, is preferably displayed as a geographical/spatial diagram. A map 598 of the United States is shown in which different regions are divided by different colors or shading. A reviewer has selected the southern region 600 using a pointer arrow 602, causing a second window 604 to be displayed. Window 604 preferably shows the selected region 600 in greater detail and with different states within the region distinguished by shade or color. The different colors can inform the reviewer about information keyed in a legend; this information can, for example, be related to the reviewer's organization or preferences. In the example of FIG. 32, the different colors indicate different percentages of sales made by the reviewer's organization. Other information, related to feedback, can also be presented in window 604 or screen 596. For example, a number can be displayed in each state or region indicating the number of feedback records which originated from those states or regions. A similar number indicating the number of reviewers in the feedback system can also be displayed.

A reviewer can preferably filter the presented feedback records by selecting geographic regions shown in screen 596. For example, by selecting the "southwest sales territory", the reviewer preferably has filtered the feedback records in the combined set to just those records originating from the southwestern territory. The reviewer could also filter the feedback to a particular state by selecting a state in window 604. Alternatively, selecting a state can cause a third window to be displayed in which the cities of that state are shown. A reviewer could then select a city to filter the feedback records to that city, and so on. Other information can also be displayed in screen 596 and window 604, such as cities, businesses, schools, etc., and a number of feedback records originating from those areas. The reviewer would thus have an idea of how much the combined set would be reduced if a particular area were selected. In other embodiments, different types of geographic or spatial areas can also be presented as a filter. For example, a school campus or company building can be shown, and a reviewer can select from which areas, offices, or buildings he or she wishes to view feedback and filter the combined set.

Filter screen 596 is just one example of additional filters or other visualization aids that can be implemented in conjunction with viewing interface 46. For example, other types of graphical presentations or simulations can be displayed when requested by a reviewer. Specific filters such as filter screen 596 can preferably be designed and/or implemented by operators of viewing interface 46 or the reviewers using the system. Such filters can be made available in viewing interface 46 and customized for a particular set of conditions. For example, the filter screen 596 might only be available to a review if a context of "sales in United States" is selected in context window 568 of viewing interface 46". Other filters can be only available for particular contexts, time ranges, physical locations, reviewer access level, or for other selections made in viewing interface 46.

Figure 20:
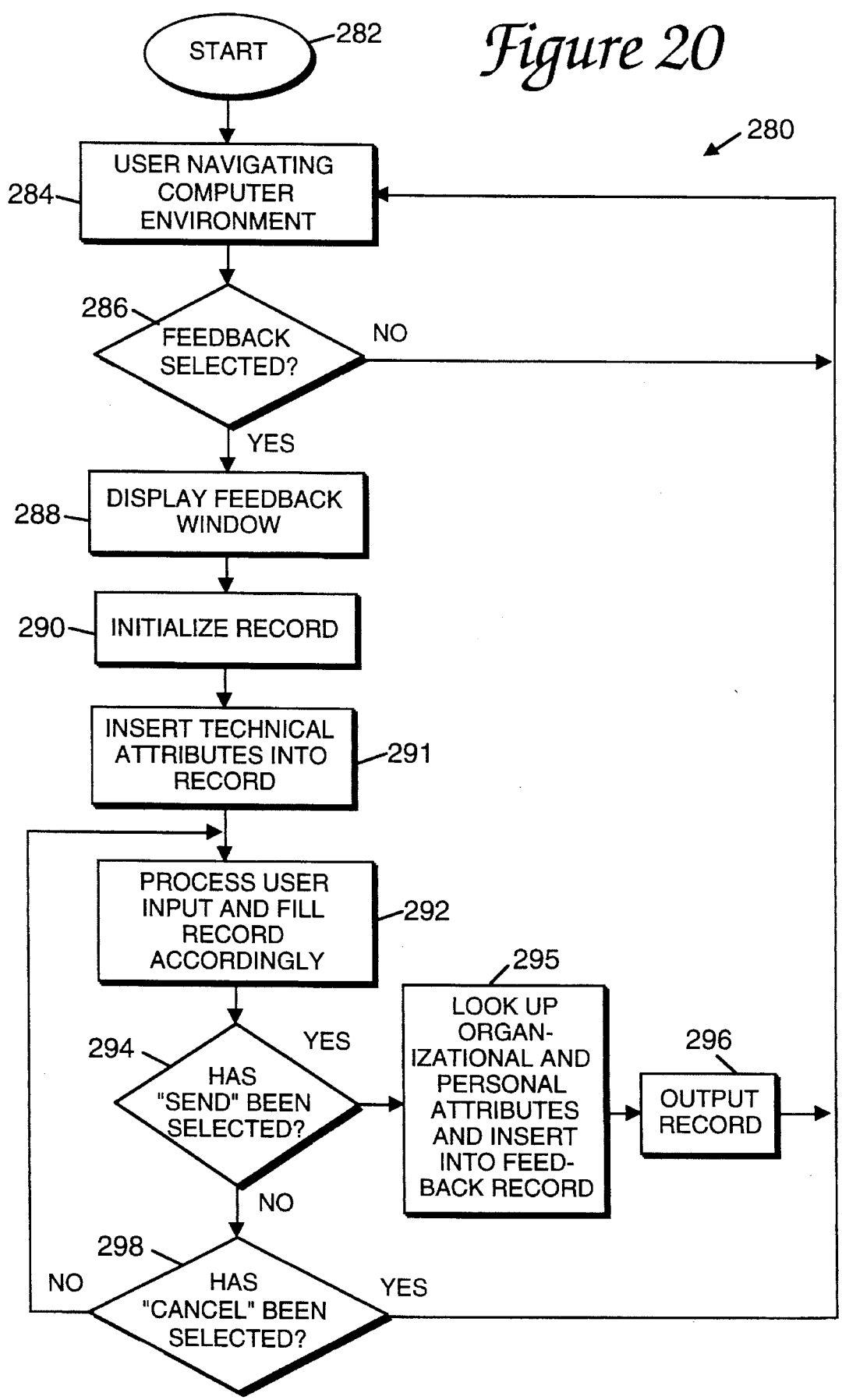
FIG. 20 is a flow diagram illustrating a preferred method of implementing the feedback interface of the present invention.

FIG. 20 is a flow diagram of a method 280 of using the feedback system of the present invention for the collection of feedback. The method starts in a step 282, and in a step 284, a user or learner navigates through a computer environment, such as a learning environment or other software environment. Such an environment, for example, can be implemented on a computer system as shown in FIG. 1. A learning environment can be navigated by using a learner interface 52 as shown in FIG. 3a, a learner interface 130 as shown in FIG. 8a, or any other suitable interface. By "navigating" a computer environment, it is meant that the user is, for example, using an operating system or an application program, controlling peripheral devices, searching data, displaying data, or performing other activities which make use of a computer's resources. In step 286, the logic (implemented by, for example, the CPU 12 of the computer system) preferably checks to determine whether the user has selected to input feedback by checking the feedback icon of the learner interface, such as icon 62 of FIG. 3a, icon 148 of FIG. 8a or icon 173 of FIG. 14a. If the icon has not been selected, the process loops back to step 284, in which the user continues to navigate the computer environment. In many computer environments, a computer system can check for a feedback selection concurrently while implementing other processes or the user's navigation activities.

If feedback has been selected in step 286, the process continues to step 288, in which a feedback interface window or dialog box is displayed on screen 24. Suitable feedback interface windows include feedback interface 42 of FIG. 4 and feedback interface 154 of FIG. 9. If learning interface 130 is being used, the logic first checks for additional user input defining the context of the feedback, such as a word, icon, etc., before displaying feedback interface window 154 of FIG. 9. Of course, feedback interface controls can be displayed without displaying a window or dialog box, or even without using a display screen 24. For example, a user can hear feedback options on a speaker and enter feedback using audio commands input to a microphone; such an embodiment is described with reference to FIG. 35.

In step 290, a feedback record is initialized, i.e., a record data structure is allocated in memory for the user. In step 291, technical attributes are preferably inserted into the created feedback record. These technical attributes are preferably system discernable attributes as described with reference to FIG. 28 and can quickly and automatically be inserted by the feedback system into the record. The process of inserting technical attributes into the feedback record is described in greater detail with respect to FIG. 33. Other attributes which preferably can be inserted into the record quickly or which are necessary to determine the appearance and functionality of the feedback interface can also be inserted at this time. Next, in step 292, the user's input in the feedback interface is processed and the feedback record's remaining fields are filled in accordingly. This step is described in further detail below with reference to FIG. 21.

In the next step 294, the logic checks if send icon 92 or 151 has been selected by the user. If the send icon has been selected, step 29 is implemented, in which the feedback system looks up the organizational and personal attributes for the user who sent the feedback message, as described in FIG. 28, and automatically inserts these attributes into the feedback record. These are fields that are not dependent on the specific characteristics of the user's feedback and can be automatically entered in the record, for example, by the CPU 12 or other processor of the feedback system. However, this information may take some time to retrieve and are can thus be inserted as the user is entering feedback or after the user has exited the feedback interface. This process is described in greater detail with reference to FIG. 34. Step 296 is then initiated, in which the filled feedback record is output from the user's computer or computer environment to the storage block 44 as shown in FIG. 2, which preferably includes a database of feedback records. In some embodiments, the feedback records may be "cleaned up" after they are output. For example, in large feedback systems, specific author fields 204 as shown in FIG. 15 may be automatically filled in the record before it is stored in the database. When desired, the time the user sent the feedback may also now be stored in the feedback record. The user then continues to navigate the computer environment in step 284. If the send icon is not selected in step 294, the logic checks to determine whether an exit or cancel button, such as close box 81 of FIG. 4, has been selected by the user. If the exit button has been selected, the feedback interface is exited without sending the new feedback record and the process loops back to 284, in which the user continues to navigate the computer environment. If the feedback icon is not selected in step 298, the process loops back to step 292, in which any continuing inputs to the feedback interface are processed and the feedback record filled appropriately.

Figure 33:
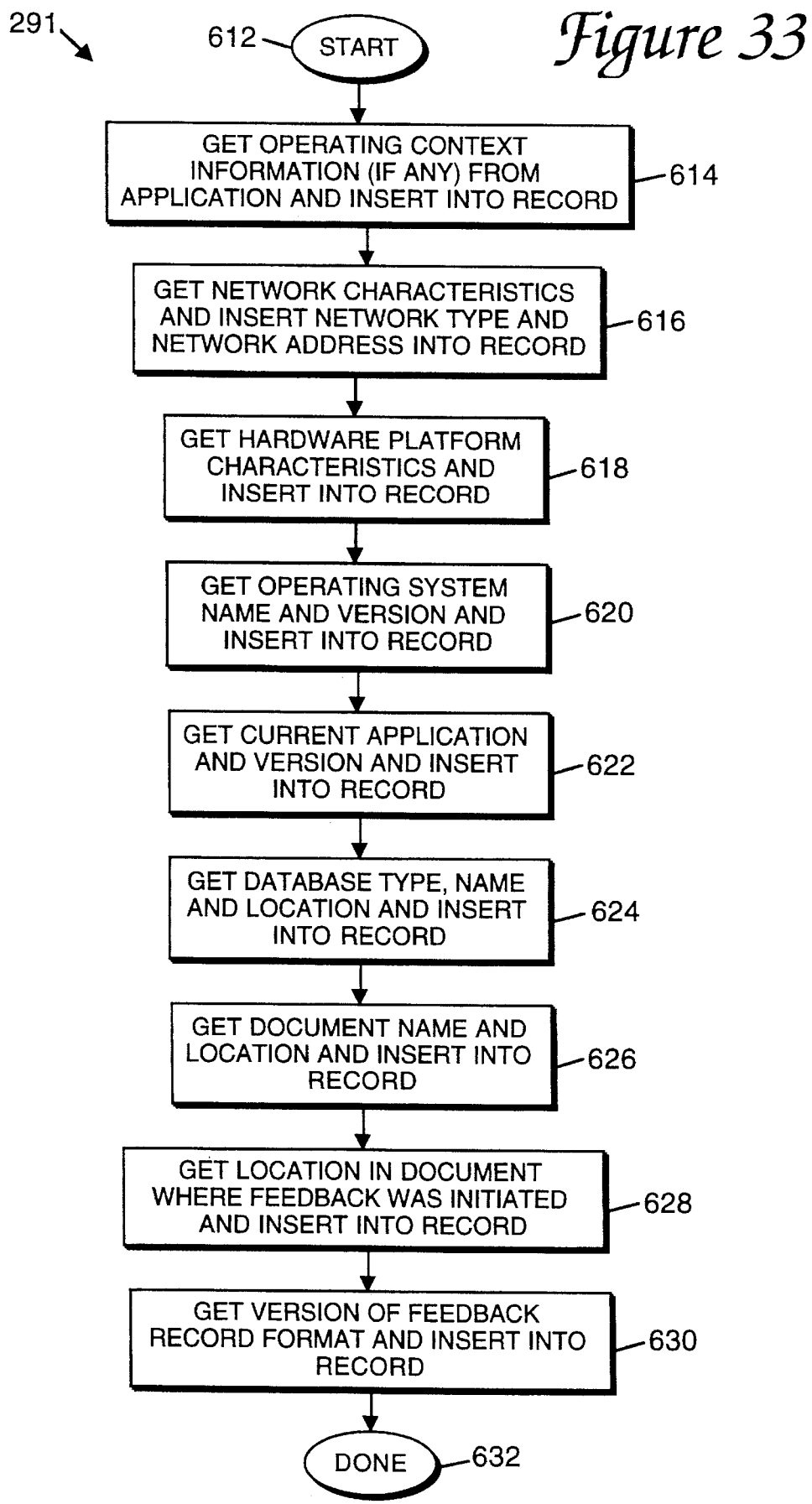
FIG. 33 is a flow diagram illustrating a step of FIG. 20 in which technical attributes are inserted into an initialized feedback record.

FIG. 33 is a flow diagram illustrating step 291 of FIG. 20, in which technical attributes are inserted into the feedback record that has been initialized. The process begins at 612, and, in step 614, the operating context information, if any, is retrieved from the application program and is inserted into the feedback record. The operating context information includes any information that is passed from the computer environment that the user was navigating to the feedback system controller. This information may allow the feedback system to quickly fill in the technical attributes explained below. For example, if a user was working in a work processing application program on a certain document before accessing the feedback interface 42, the word processor could pass the feedback system the name of the word processor, the version of the word processor, the document the user was working on, the page number, etc. Some or all of the desired technical attributes can be obtained in this step. The application program can pass the operating context information as, for example, one or more numbers which can indicate to the feedback system that a particular application a certain operating system, etc., was being used. Any technical attributes retrieved in this way do not have to be retrieved in the steps of process 291 described below. In other embodiments, even organizational attributes 514 and personal attributes 516 of a user can be retrieved as operating context information, similar to describe above, instead of being retrieved in step 295 of FIG. 20.

In steps 616 through 628, specific technical attributes are retrieved and inserted into the feedback record. In some cases, all of these attributes will not be available, and only the attributes applicable to a particular computer system need be retrieved. For example, if no database program is being implemented on the computer system, step 624 can be skipped. In next step 616, the network characteristics of the system implementing the feedback interface 42 are retrieved and the network type and network address are stored in the feedback record. Network characteristics include the network operating system type (vendor, company, etc. and network system version), the network address of the user, and any other information concerning the network connecting the computer environment to other computers. This information is typically available to other programs or the feedback system through the network operating system. In step 618, the hardware platform characteristics are retrieved and inserted into the feedback record. Hardware characteristics include the microprocessor type, speed, and functionality, other chip types (co-processors, etc.), the amount of RAM available on the computer system, and the peripherals connected to the computer system, such as display adapters, storage devices, modems, I/O cards, etc. All these hardware platform characteristics are preferably inserted into the feedback record.

In next step 620, the operating system name and version is retrieved and inserted into the feedback record. Such information is typically readily available on a computer system. In step 622, the current application program and version is retrieved and inserted into the record. The "current" application program is the application program most recently used by the user before accessing feedback interface 42. The current application program may be running in the "background" (concurrently) behind the feedback interface in some situations. In step 624, the type, name, and location of the database currently being used by the user are retrieved and inserted into the feedback record, similarly to the network and application program characteristics described above. In step 626, the name and location of the document accessed by the user (for example, in a word processor or spreadsheet program) is retrieved and inserted into the record. The term "document" can refer to any type of data file used in an application program. The document name can be a filename, and the location can be the place or hierarchy where the document is stored (a disk directory structure, a disk drive, memory address, etc.) In step 628, the location in the document where the feedback was initiated is retrieved and inserted into the feedback record. This is the specific location in the document where the user was situated just prior to accessing the feedback interface 42. This location can be specified as a page number, paragraph number, line number, cell number (as in a spreadsheet), spatial coordinates, etc., or a combination of some or all of these.

In step 630, the version of the feedback record format is retrieved and inserted into the feedback record. The version is preferably indicated as a number or code. The format of feedback records may change over time as features are changed in the feedback system and different types and amounts of data are stored in the feedback record. The version number or code of the current record format is inserted into the record so that other application programs, such as the viewing interface 46, can determine the record's version. The application program can determine how many fields are in the record, how large each field is, what type of data is stored in each field of the record, etc. using its own stored information correlating a version number with a record format and thus correctly find data in the record according to that format. The process is then complete as indicated in step 632.

Figure 21:
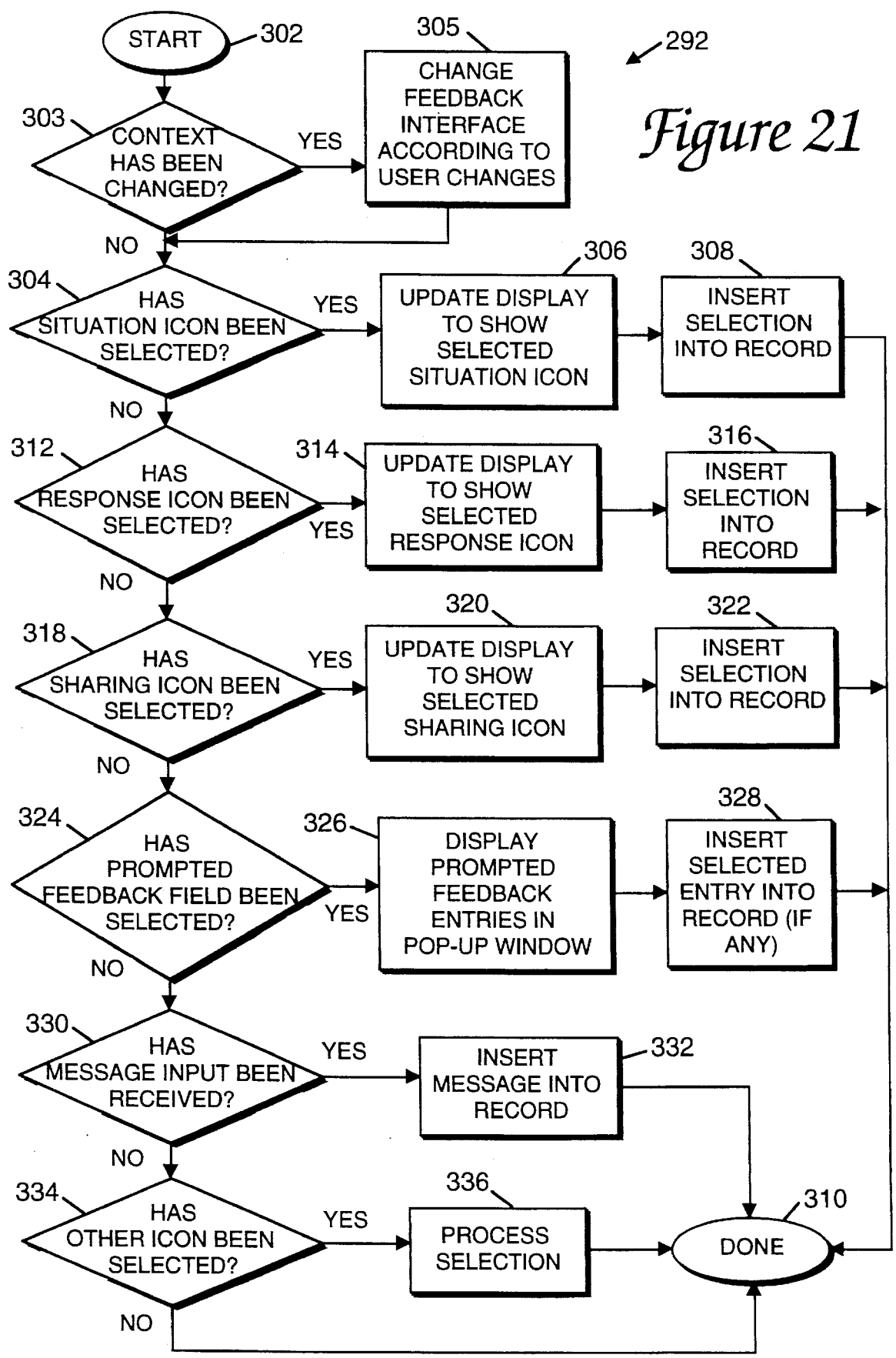
FIG. 21 is a flow diagram illustrating the "Process user input and fill record according" step of FIG. 20.

FIG. 21 is a flow diagram 292 illustrating the process user input and fill record step 292 of FIG. 19. The process starts at step 302, and, in a step 303, the logic checks if the context of the feedback interface has been changed. For example, the user can select different categories in context fields 57 of feedback interface 42. This can occur when the user desires the feedback to describe the context of a product, process, service, or issue which is not automatically known and specified from the user's context in the computer environment or from default settings. If the context is not changed by the user, then the last known user context, default context, or no context at all is used in the feedback interface, and the process continues to step 304. If the context is changed, the feedback interface is changed according to the user changes in step 305. This step can include changing the appearance, number, and/or function of icons and messages, such as attribute icons 76 shown in FIG. 4, prompted feedback items 121 and 123 of FIG. 6, and other functional icons. Other features may also change, such as the appearance of message window 80 and 168, menu selections available to the user, the amount or level of help available, etc. Preferably, the functionality of feedback interface 42 would change to be better tailored to the context specified by the user in step 303. For example, if a context of physics in a learning environment were specified, then icons, graphics, and options could reflect an educational science environment with physics-related attributes, etc. Similarly, in a business environment, attributes and menus could be tailored to a "employee services" context, for example. Once the feedback interface has been changed in step 305, the process continues to step 304.

In step 304, the logic checks whether a situation attribute icon 86 has been selected. If so, step 306 is initiated, in which the computer display is updated to show the selected situation icon. In next step 308, the selected situation attribute data is inserted into situation field 180 of feedback record 174. The process is then complete as indicated at step 310. If the situation icon was not selected in step 304, step 312 is initiated, in which the logic checks whether a response icon 88 has been selected. If so, the display is updated to show the selected response icon in step 314 and the response data is inserted into response field 182 of the feedback record in step 316; the process is then complete at step 310.

If the response icon was not selected in step 312, the logic checks to determine whether a sharing icon 90 is selected in step 318. If so, the display is updated to show the selected sharing icon in step 320 and the sharing data is inserted into sharing field 184 of the feedback record in step 322. The process is then complete at step 310. If the sharing icon was not selected in step 318, the logic checks if prompted feedback field 78 or 158 has been selected in step 324. If this field has been selected, in step 326 the prompted feedback entries are displayed in a pop-up window 120 as shown in FIG. 6. The predefined attributes and/or messages associated with the selected pop-up entry are inserted into the feedback record in step 328 the same way as any other (manual) feedback entry is inserted, and the process is complete at step 310. If the prompted feedback field was not selected at step 324, step 330 is initiated, in which the logic checks if message input has been entered into message window 80 or 168. If so, a field indicating the input mode and the entered message is inserted into data portion 178 of the feedback record in step 332 when the learner selects a "done" icon or similar control to indicate that he or she is finished inputting the message. The process is complete at step 310. If no message input is received in step 330, the logic checks if any other icons have been selected in step 334, such as other attribute icons, menu headings, or other prompts. If so, the selection is processed accordingly in step 336 and the process is complete at step 310. If no selection is made in step 334, the process is complete as indicated in step 310.

In the foregoing explanation the process has been described as if the checking steps 304, 312, 318, 324, 330 and 334 are serially executed. However, as will be appreciated by those skilled in the art, in practice such a checking algorithm is not specifically required. Rather, in practice, the various described functions (i.e. steps 306–308, 314–316, 320–322, 326–328, 332 and 336) are call routines which are executed when called. To call the functions, the reviewer can select the associated button, icon, etc. in the feedback interface. Alternatively, they could be called by selecting a menu item in a pull down menu, by keyboard commands or in any other suitable manner.

Figure 34:
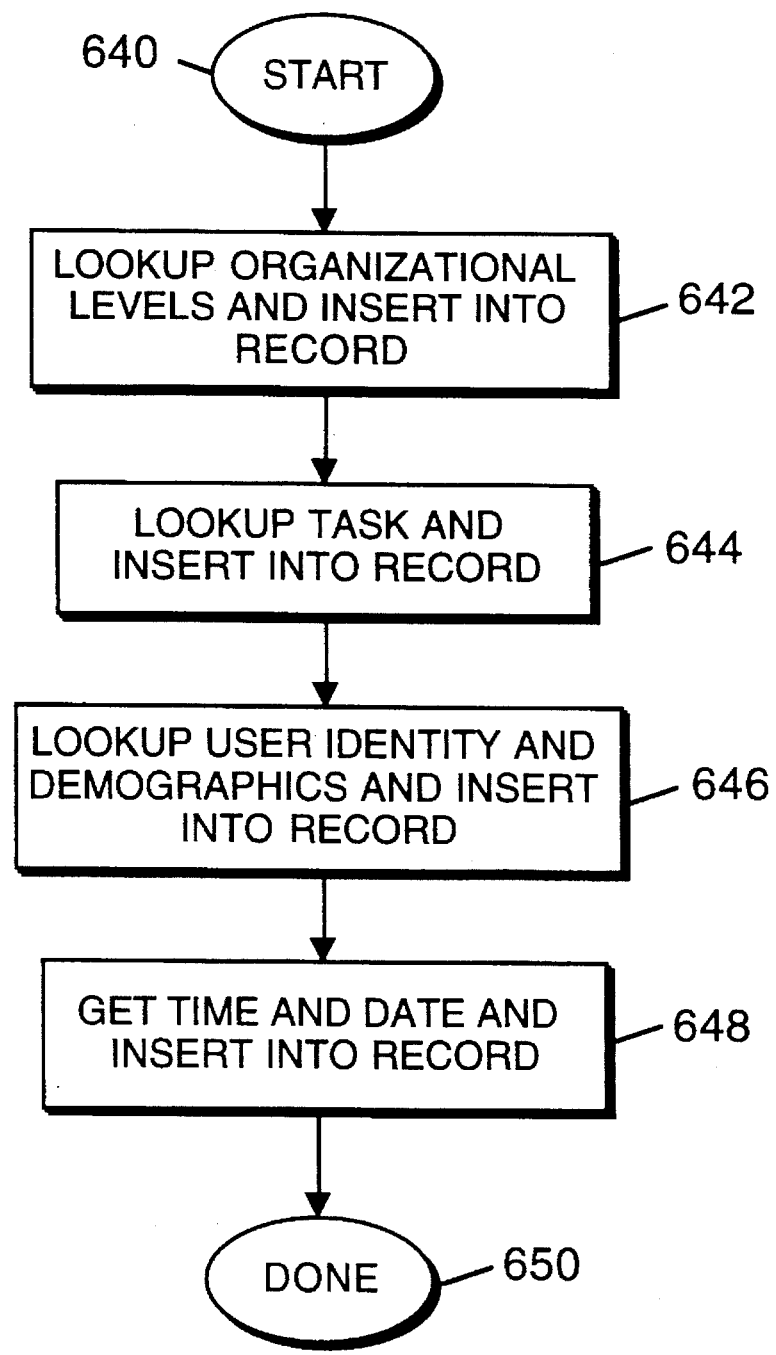
FIG. 34 is a flow diagram illustrating a step of FIG. 20 in which organizational attributes and personal attributes are retrieved and inserted into a feedback record.

FIG. 34 is a flow diagram illustrating step 295 of FIG. 20, in which organizational attributes and personal attributes are retrieved and inserted into the feedback record. The organizational attributes 514 and personal attributes 516 can preferably be automatically discerned by the feedback system and inserted into the record. This attribute information might have been entered into the system by the user at an earlier date, for example, or might be discernable from a database over a network. These attributes are inserted into the feedback record into appropriate fields, such as those included in other attribute fields 188 of FIG. 15.

The process begins at 640, and, in step 642, organizational levels are retrieved and inserted into the feedback record. Such organizational levels include the identification (and/or other characteristics) of the company, department, district, social club, or other organization of which the user who entered the feedback into the feedback record in step 292 of FIG. 20 is a member. In next step 644, the task of the user is retrieved and inserted into the record. In step 644, "task" refers to the organizational attributes 514 including product, service, job, task, method, procedure, and/or resource of the user, as listed in FIG. 28. In next step 646, the user identity (e.g., name) and demographics are retrieved and inserted into the feedback record. Other personal attributes 516 can also be inserted into the record, as described with reference to FIG. 28. In next step 648, the time and date when the user accessed the feedback interface 42 are entered into the feedback record into the appropriate field(s). The process is then complete as indicated at 650.

Figure 35:
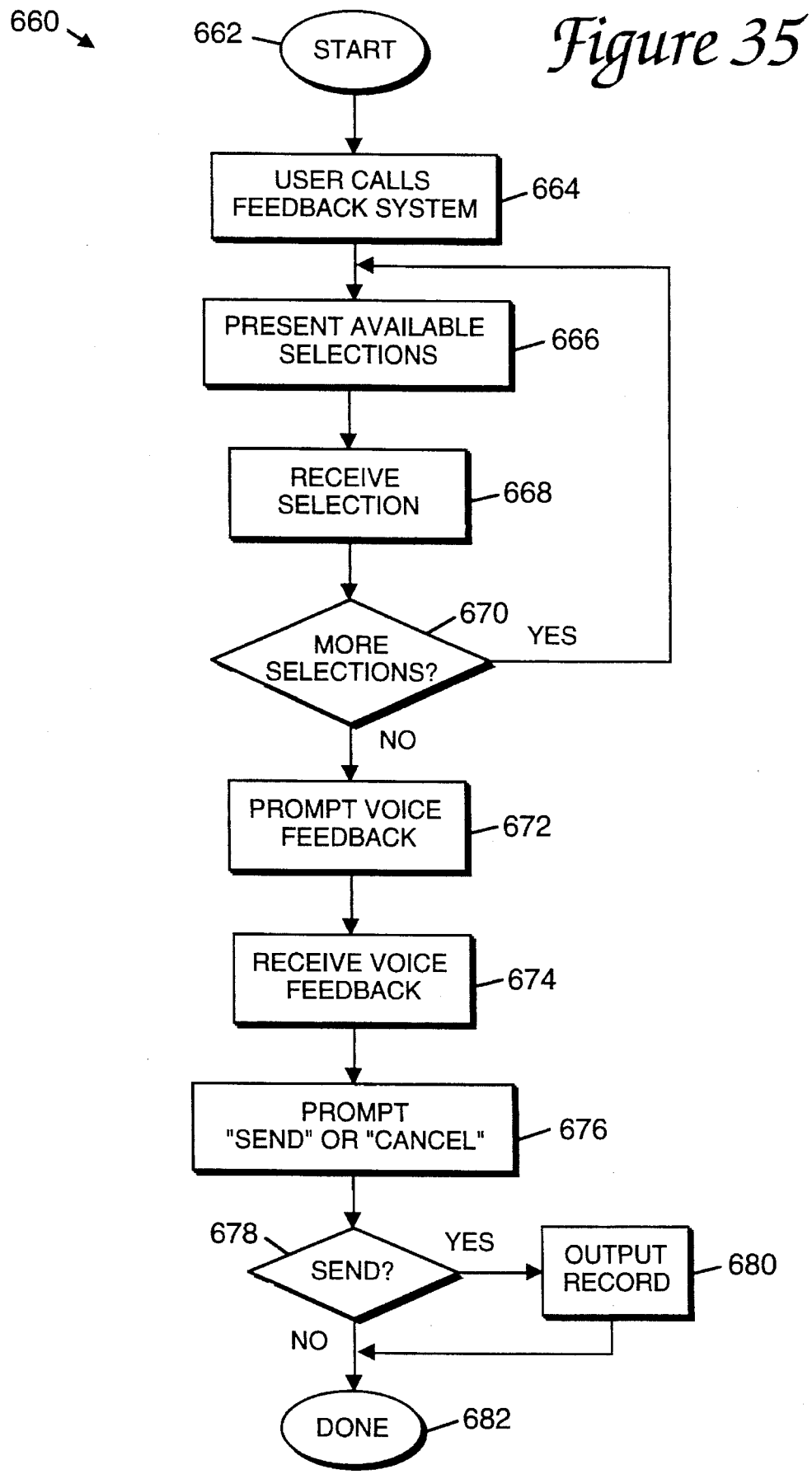
FIG. 35 is a flow diagram illustrating an alternate method of collecting feedback in a feedback system of the present invention.

FIG. 35 is a flow diagram illustrating an alternate method 660 of collecting feedback in a feedback system of the present invention. The method 660 is directed towards a feedback interface which presents options and collects feedback using voice input and audio output. Such an embodiment can be utilized, for example, in a telephone answering machine and/or voice recognition system. This system can be considered a computer environment in that presented options and a user's inputs in such a system are typically processed using a computer system or controller.

The process begins at 662. In a step 664, a user calls the feedback system, for example, on a telephone. In step 666, the feedback interface presents available selections by outputting voice descriptions of the selections which the user may choose. In step 668, the feedback interface receives a selection from the user. In this example, the user can enter selections through an input keypad, such as the buttons on a telephone. Alternatively, a user can speak selections which are received by a voice-recognition system. The user can preferably enter selections including a context and attributes in response to spoken menu offerings from the feedback interface. In step 670, the feedback interface (which can be controlled by a CPU) checks if there are more selections from the user. If so, the process returns to step 666 to present the available selections, such as another menu, to the user. If the user does not make more selections in step 670, then step 672 is implemented, in which the feedback interface prompts a voice feedback message. That is, the interface requests that the user enter message content for the current feedback item. In step 674, the interface receives voice feedback message content from the user. In this step, the user preferably speaks his or her message into a microphone or telephone receiver. The user can also preferably bypass inputting a message, if desired, by making an appropriate selection. In step 676, the feedback interface sends a "send or cancel" prompt to the user, who thus has the option to send the current feedback item to be stored and accessible to a reviewer, or to cancel the current feedback item. If the user has opted to send the feedback item in step 678, a feedback record as shown in FIG. 15 is filled with the appropriate information, and the record is output to storage block 44 or other storage medium. After the record is output, or if the user has not sent the record in step 678, the process is complete as indicated at 682.

Figure 22:
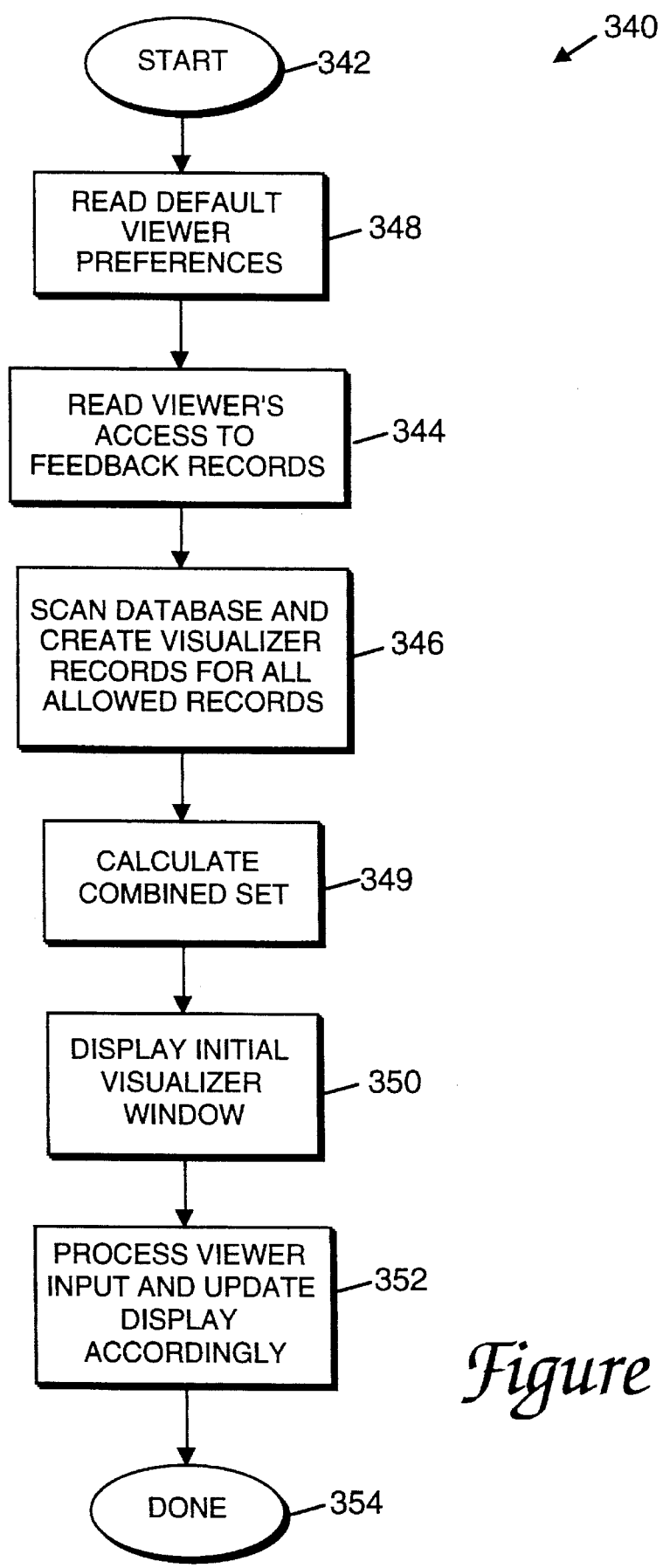
FIG. 22 is a flow diagram illustrating a preferred method of implementing the feedback viewing interface of the present invention.

FIG. 22 is a flow diagram illustrating a preferred method 340 of implementing the feedback viewing interface 46 or 46'. A reviewer can, at any time, access the viewing interface to access any feedback records stored in a database. The process begins at a step 342, and, in a step 348, the default reviewer preferences are read. The preferences are the viewing interface selections and preferences that the reviewer has designated to be applied to the feedback records whenever the viewing interface is first accessed. Default preferences can be considered a "saved setting" of selections which are read and applied to the presented feedback data, similar to the saved settings 252 described for viewing interface 46'.

Step 344 is optional and dependent on the characteristics of the feedback system that has been implemented. In step 344, the reviewer's access to the feedback records is read in by, for example, a CPU of the computer system which is being used by the reviewer. A specific reviewer might only be able to access a certain portion of the feedback records stored in the database due to organizational restrictions or necessity. Access can be based on attributes or other fields of the feedback records. For example, a teacher reviewer might only be able to access feedback records relating to his or her own course, in a physics context. In other embodiments, the feedback record database can be partitioned into different groups or clusters, and a reviewer might only be able to access a limited number of groups. Once the CPU knows the reviewer's access, only the accessible portion of the total amount of feedback records is read into memory.

Also within step 344, a definition file of information mapping the most updated organizational structure is optionally read into memory. The CPU needs this information to correctly categorize feedback records into the organizational trees 250 as shown in viewing interface 46'. Since an organizational structure is typically dynamic, the CPU must know the latest structure and where specific contexts and/or locations fit within the structure. This is described in more detail with respect to FIG. 23.

In step 346, the database of feedback records is scanned and a visualizer record is preferably created in memory for each allowed feedback record. That is, only the feedback records which the reviewer is able to access are examined to create a corresponding visualizer record. This step is described in more detail with reference to FIG. 23. In an alternative embodiment, records can be stored in storage block 44 so that they may be directly read by the viewing interface without having to create visualizer records.

In step 349, the CPU calculates the combined set of feedback records as determined by the default reviewer preferences read in step 348. That is, the accessible feedback records are organized to be displayed according to the reviewer preferences. The combined set, as explained previously, is the set of feedback records that have all the attributes, context, location, time range, and other qualifiers currently selected in the viewing interface. Step 349 is described in more detail below with reference to FIG. 24.

In step 350, the viewing interface 46 or 46' or "visualizer" is initially displayed. The viewing interface can be a separate window or dialog box, or it can occupy an entire screen. When displaying the viewing interface, the CPU uses segment counter values, calculated in step 349 and described with reference to FIG. 24, to display the specific bar chart levels. In step 352, viewer input is processed and the display of the viewing interface is updated in accordance with the viewer input. Step 352 is described in further detail with reference to FIG. 25. The process is then complete as indicated in step 354.

Figure 23:
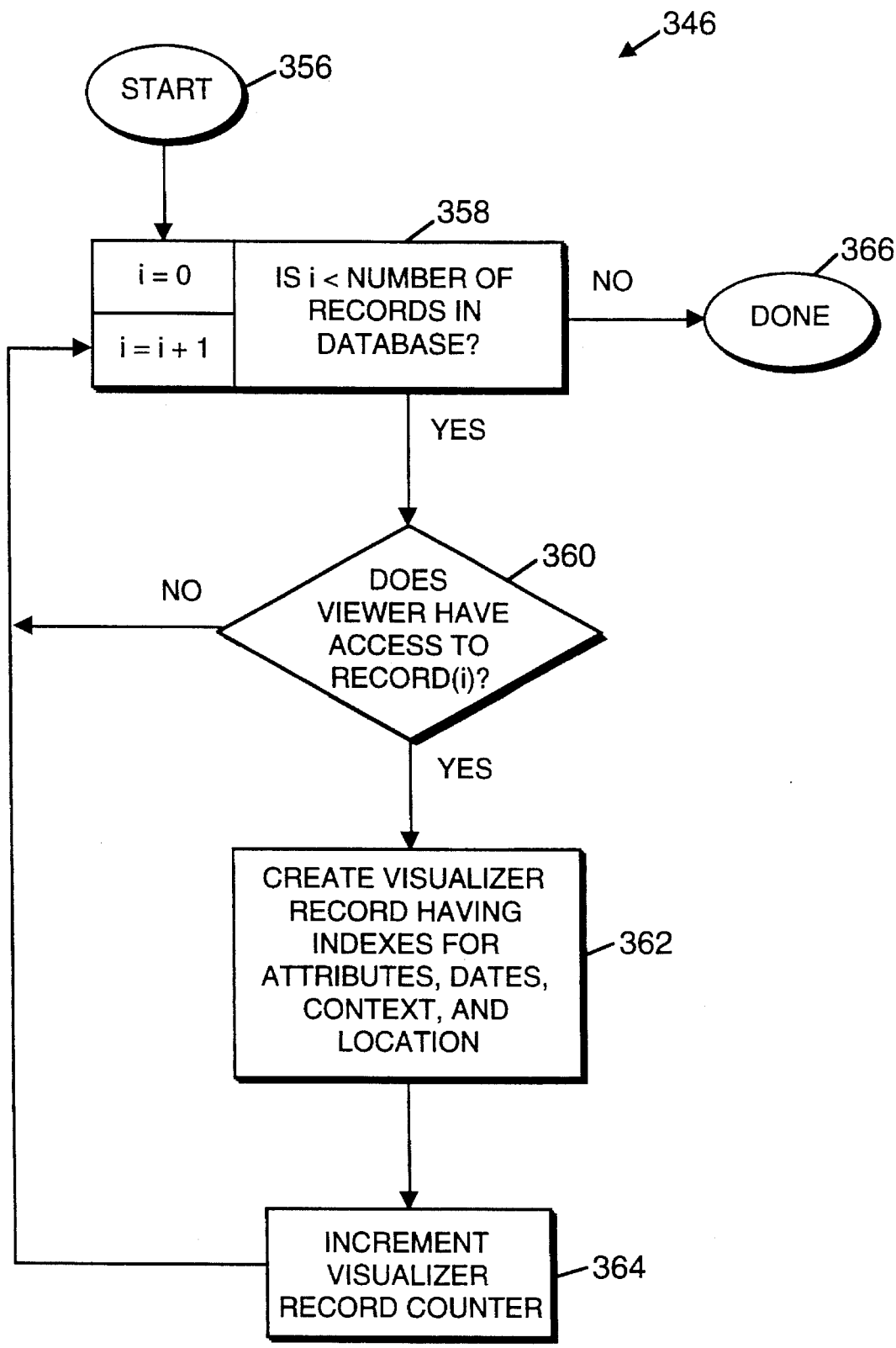
FIG. 23 is a flow diagram illustrating the "Scan database and create visualizer records" step of FIG. 22.

FIG. 23 is a flow diagram illustrating step 346 of FIG. 22, in which the database of feedback records is scanned and a visualizer record is created for each of the feedback records accessible to the reviewer. The process begins in a step 356, and, in a step 358, a counter "i" is initialized and checked if it is less than the number of feedback records stored in the database. If true, the process continues to step 360, in which the logic checks if the reviewer has access to record(i). This is preferably determined by comparing the reviewer access, which was read in step 344 of FIG. 22, to certain fields of the feedback record. For example, if the reviewer's access is limited to feedback records having a context of physics for students in the 9th district, then the CPU examines the context and learner location fields of the feedback record to determine if the feedback record is accessible. One method to accomplish this is to directly compare the context heading ID numbers stored in the feedback record with allowed context ID numbers. The CPU can also check the closed flag field 212 of record(i) at this time; if a feedback record is set as "closed", it is ignored. Or, if the reviewer has specified that she does not want to view feedback records she has already read, then the CPU can read the read status flag and corresponding responsible person from the records and ignore records having the read status flag set for this particular reviewer. Alternatively, a reviewer can select whether to view closed feedback records or records he or she has already read as a preference in the viewing interface 46 or 46' in step 352 of FIG. 22.

If the feedback record is not accessible by the reviewer, the process loops back to step 358, wherein counter "i" is incremented and the next record scanned. If the feedback record is accessible by the reviewer, the process continues to step 362, in which a visualizer record is created, preferably in RAM, corresponding to feedback record(i). The feedback records are preferably stored in RAM or similar memory with a relatively fast access time so that the records can be scanned and presented to the reviewer quickly. If all the visualizer records cannot fit into the available RAM on a system, other memory schemes can be used to supplement or replace RAM, such as "virtual memory" on a storage device.

Figure 23A:
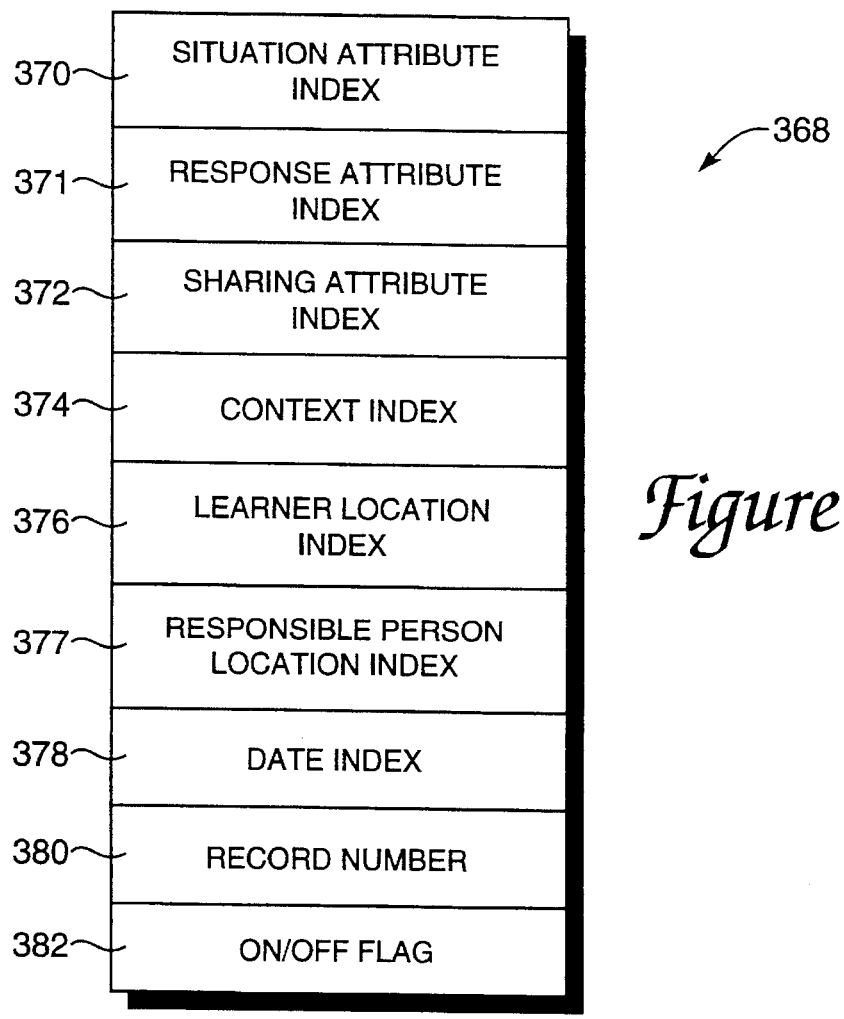
FIG. 23a is a schematic diagram of a visualizer record of the present invention.

A preferred visualizer record structure 368 is shown in FIG. 23a. The visualizer record includes a field for each filter of the viewing interface for storing an index to segments within the filter. An index describing each segment stored in record(i) is stored in the appropriate field of visualizer record 368. For the attributes 224 or 224', such as situation and sharing, the number or other identifier representing the segment is copied directly from the attribute field from feedback record(i) into the appropriate index field of the visualizer record. As shown in FIG. 23a, a situation attribute index field 370 of the visualizer record stores the segment number of the situation attribute stored in record(i). For example, if record(i) included a "problem" situation attribute segment, which is the third segment in the situation attribute filter, then the number 3 is preferably stored in the situation attribute field 180 of record(i). This number can also be used as an index, and thus is copied directly to the situation index field 370 of visualizer record 368. The response and sharing attribute indexes are obtained in a similar fashion. The context field 194 of record(i), however, might include a list of category names defining a context path, such as "Technical/Testing/Analog Testing" in embodiment 42, and representation mode icon/specific feedback icon/selected phrase in embodiment 130. The CPU can convert this category context to an index number and then store the index number in context index field 374 of visualizer record 368. Other attributes, such as technical attributes 512, organizational attributes 514, and personal attributes 516, can also be stored in fields of the visualizer record 368. Alternatively, these other attributes can remain in feedback record 174 and retrieved by viewing interface 46 when needed.

Figure 23B:
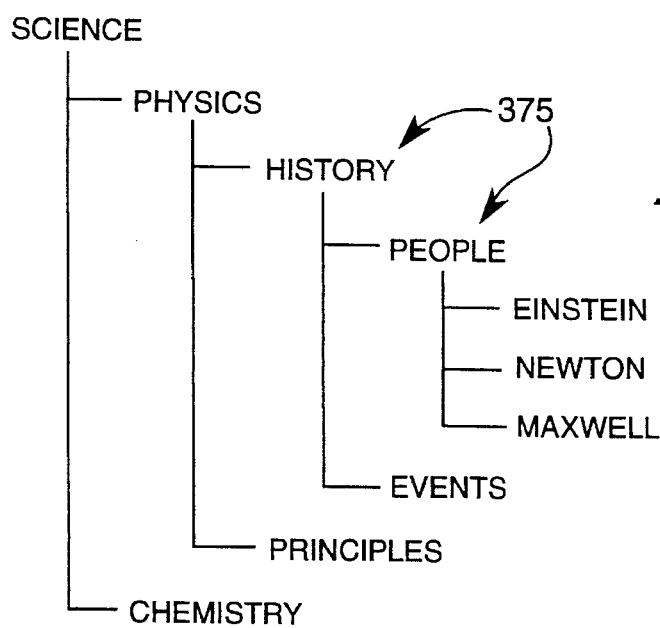
FIG. 23b is a schematic diagram of an example of an organizational tree structure used in an embodiment of the viewing interface of the present invention.

To convert a context path to an index number, the CPU can examine the current context organizational tree structure from a definition file loaded from the database. As shown in FIG. 23b, the context organizational tree has several categories 375 and sub-categories 375 defined in a particular tree structure. The CPU looks at the context path specified in record(i) and traces the path in the definition file tree by matching strings (or identity numbers) of the record's path categories with the ID numbers of the categories in the tree.

The index stored in context index field 374 is the ID number of the last category specified in the path. Thus, in FIG. 23b, the ID number of the category "Einstein" would be stored in index field 374 for a path that defined a context of "Physics/History/People/Einstein". The location organizational trees are implemented in a similar fashion using learner location index field 376 and author/responsible person location index field 377 (field 377 is an optional field in visualizer record 368).

The date index field 378 stores an index representing the date and time when the user created the feedback record. In the preferred embodiment, the date stored in date field 190 of record(i) is converted to the number of days following a predefined starting date, which is stored in date index field 378. For example, the date can be converted into an index number representing the number of days (or hours, etc.) since Jan. 1, 1980.

Record number field 380 stores an ID number for record(i) so that record(i) can be later referenced from the visualizer record 368 if more information is required from record(i). For example, the message of record(i), stored in data portion 178, might be selected to be viewed by a reviewer, and record(i) could then be accessed to retrieve the message data. On/off flag field 382 is used to store a flag indicating if record(i) is currently on or off, i.e. if record(i) is in the displayed combined set or not. This flag can be used by a visualizer CPU to determine which records should be displayed in the list of specific records which the reviewer wishes to view (described with reference to FIG. 25).

Referring back to FIG. 23, the process continues to step 364, in which a visualizer record counter is incremented. This counter indicates how many feedback records are read in from the database, and thus indicates the total number of accessible feedback records after all the records in the database have been scanned. The process then loops back to step 358, in which counter "i" is incremented and the next record(i) examined using the same process. Once "i" is greater than or equal to the number of records in the database, the process is complete as indicated in step 366.

Figure 24:
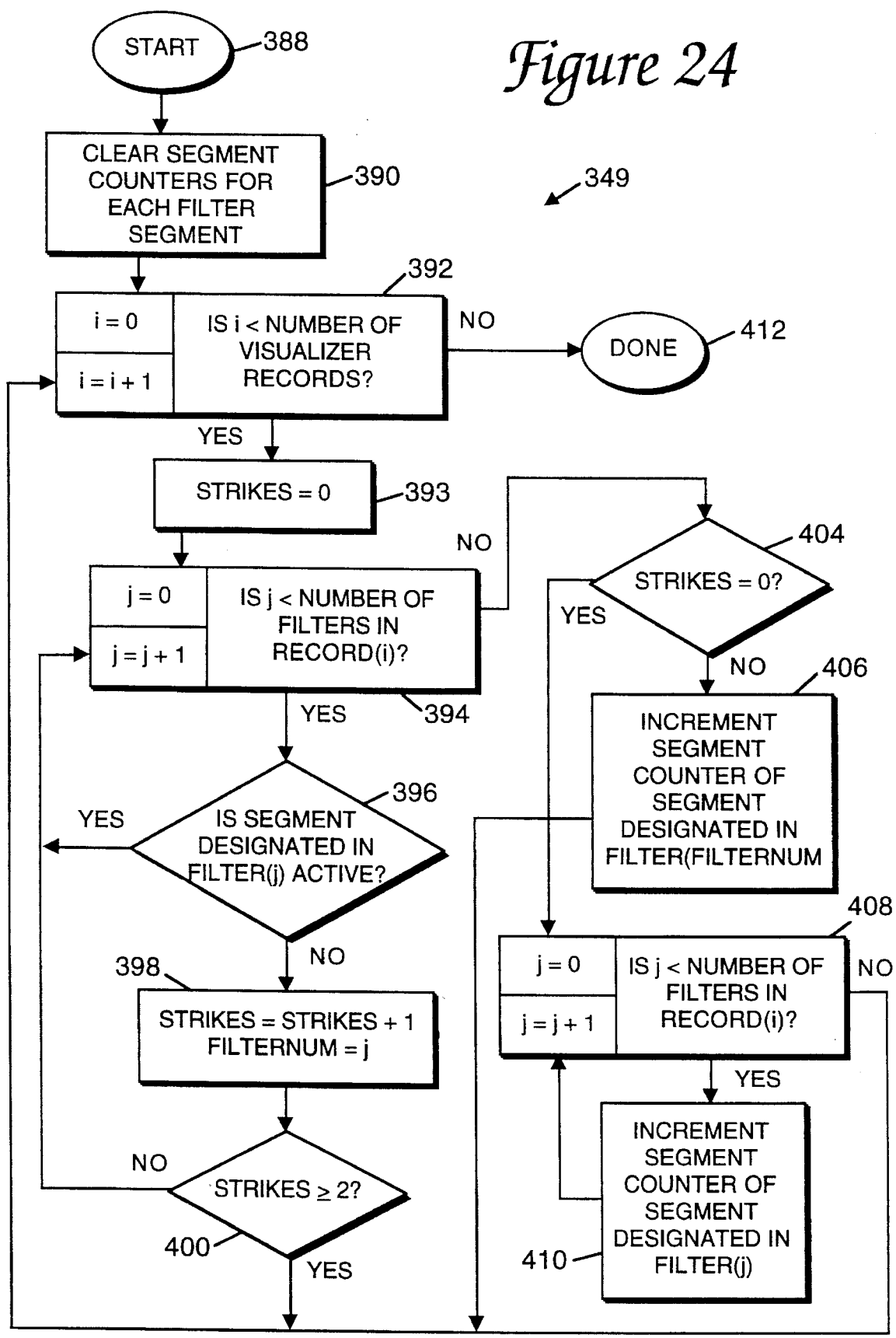
FIG. 24 is a flow diagram illustrating the "Calculate combined set" step of FIG. 22.

FIG. 24 is a flow diagram illustrating step 349 of FIG. 22, in which the combined set of feedback records is calculated. The process starts in a step 388, and, in next step 390, the segment counters for each filter segment are cleared. Each segment has a counter variable associated with it which is used to count the number of visualizer records having that segment which will be added or subtracted from the combined set. This counter number is used to display the bar chart levels and the numbers next to headings in organizational trees in the viewing interface. Each segment also has an on/off flag associated with it which is set when the reviewer selects or deselects a segment (see FIG. 27). In next step 392, a counter "i" is initialized and checked if it is less than the number of visualizer records. If it is, step 393 is implemented, in which a variable STRIKES is initialized to zero. The variable STRIKES represents the number of segments in the visualizer record that are currently non-active, i.e. not included in the combined set of records selected by the settings of the viewing interface.

In next step 394, a counter "j" is initialized and checked if it is less than the number of filters in the current visualizer record. Herein, the attribute windows 224 and 224', organizational trees 250 (and windows 218, 220 and 222), and time controls 268 and 269 are all considered filters, since they all can specify a subset of feedback records to be displayed. In the example of FIG. 23a, there are seven filters: the three attribute filters, three organizational tree filters (a context filter, a learner location filter, a responsible person/author location filter), and a date filter. Additional filters can be presented in viewing interface 46 or 46' in other embodiments.

If "j" is less than the number of filters in the visualizer record, then step 396 is implemented, in which the logic checks if the segment designated in filter(j) is active (in the combined set). This is checked by examining the states of the bar graphs, organizational trees, and time settings. For attribute windows 224 and 224', the segment bar graphs are checked if they are on or off, indicating if they are active or inactive, respectively. For organizational trees 250, a CPU implementing the viewing interface ("the CPU") checks if the designated context segment in the visualizer record is included within the currently-selected context category. For example, if the context index field includes a context of "Einstein", the CPU checks if the currently-selected context category of the viewing interface includes "Einstein" as a sub-category. If physics were the currently-selected context, the segment "Einstein" is included within that context category and thus is considered active. The CPU preferably uses a predefined organizational structure to compare the context index number with the active context and determine if the context in record(i) is active. A similar procedure is used for locations and dates.

If the segment designated in filter(j) is active, then the process loops back to step 394 to increment "j" to the next filter. If the segment in filter(j) is not active, then step 398 is implemented, in which STRIKES is incremented by one and a variable FILTERNUM is set equal to the current value of "j". In next step 400, the CPU checks if STRIKES is greater than or equal to 2. Two or more strikes for a visualizer record indicate that two or more segments in the record are currently inactive. For an inactive segment, a (unfilled) bar chart, if displayed, shows the amount of feedback records that will be added to the combined set if that segment is checked. If record(i) has two or more strikes, then two or more segments are unchecked and record(i) will not be added to the combined set when only one of those inactive segments is checked. Record(i) should therefore not increment any segment counters when it has two or more inactive segments, since it cannot contribute to the bar chart levels. Thus, if STRIKES is equal to two (or more), the process loops back to step 392, in which the counter "i" is incremented and the next record examined. If STRIKES is less than 2, then only one segment has been (so far) found to be unchecked; record(i) will be added to the combined set when that segment is checked. In this case, record(i) should contribute to the (unfilled) bar chart levels. The process loops back to step 394, in which the counter "j" is incremented and the next filter of visualizer record(i) is examined using the same process.

Once "j" has been incremented above the number of filters in visualizer record(i), either all the segments designated in record(i) have been determined to be active, or record(i) has, at most, one inactive segment. In the next step 404, the CPU checks if STRIKES=0 or 1. If STRIKES is equal to 1 (i.e. not equal to 0), then record(i) includes one inactive segment, and step 406 is implemented. In step 406, the segment counter of the inactive segment (designated as filter(FILTERNUM)) is incremented. This segment is the only inactive segment in record(i). Since it is the only inactive segment, the segment counter is incremented so that a bar chart will be displayed (an unfilled bar chart signifying the amount of feedback records that will be added to the combined set). After step 406, the process loops back to step 392, in which counter "i" is incremented so that the next visualizer record can be examined.

If STRIKES does equal zero in step 404, then record(i) includes no inactive segments. Step 408 is then implemented, in which a counter "j" is initialized and checked to determine whether it is less than the number of filters in visualizer record(i). If true, step 410 is implemented, in which the segment counter of the segment designated in filter(j) is incremented. Since the number of strikes equals zero, all the segments of record(i) are currently active. Therefore, each segment counter indicates the number of feedback records that will be subtracted from the combined set if that segment is unchecked by the reviewer (filled bar charts). After step 410 is complete, the process loops back to step 408, in which "j" is incremented and the next segment of filter(j) has its segment counter incremented. Once "j" has been incremented above the number of filters in visualizer record(i) in step 408, the process loops back to step 392, where counter "i" is incremented.

The process continues to examine each visualizer record in memory. Once counter "i" of step 392 has been incremented above the number of visualizer records, the process is complete as indicated in step 412. When the viewing interface is displayed, the CPU uses the segment counter values to display the appropriate bar chart levels and organizational tree heading numbers. The CPU checks the on/off flag for each segment to determine whether to display a filled or unfilled bar chart.

The calculating step 349 described in FIG. 24 can be implemented using alternate methods. For example, a doubly linked list structure can be used to link all of the accessible feedback records in memory. A number of pointers can be added to each feedback record in memory where each pointer represents an attribute and points to the next feedback record having the same attribute segment. The CPU can thus count a series of feedback records along a single pointer "thread" to determine each bar graph level in the viewing interface. A feedback record would have to be removed from a thread when one of its attribute segments was deselected by the reviewer, and correspondingly added to a thread when selected. Methods of adding and removing elements from linked lists are well-known to those skilled in the art, and can be found in such references as *The Art of Computer Programming*, Vol. 1 "Fundamental Algorithms," by Donald E. Knuth, Addison-Wesley, 1968.

Figure 25:
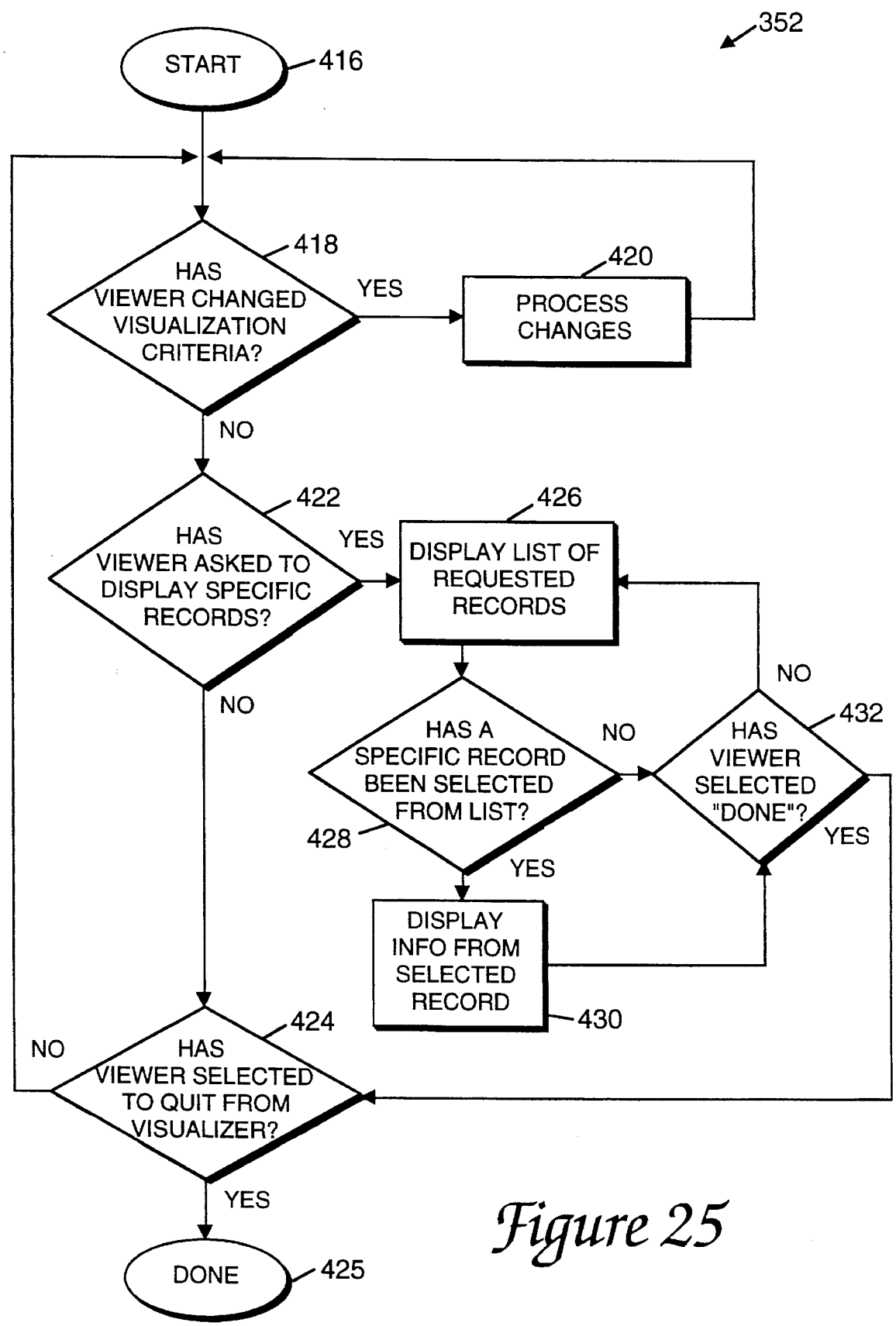
FIG. 25 is a flow diagram illustrating the "Process viewer input and update display accordingly" step of FIG. 22.

FIG. 25 is a flow diagram illustrating step 352 of FIG. 22, in which the reviewer input is processed and the display is updated accordingly. That is, the viewing interface window has been displayed with the reviewer default preferences selected and the combined set of feedback records is represented in the bar graphs of the various attribute windows and/or organizational trees. The process begins in a step 416, and, in a step 418, the CPU checks to determine whether the reviewer has changed the visualization criteria: has the viewer selected a segment of an attribute, a heading (segment) in an organizational tree, a time window bar graph segment, etc. These can also be referred to a viewer preferences (non-default preferences). If so, step 420 is implemented, in which the CPU processes the changes for the new visualization criteria and updates the display accordingly. This step is described in more detail with reference to FIG. 26. After step 420, the process loops back to step 418.

If the viewer has not changed the visualization criteria in step 418, then step 422 is initiated, in which the CPU checks to determine whether the viewer has asked to display information from specific records. Such information preferably includes the message data portion 178 of a feedback record. Other information stored in the feedback record can also be displayed. In the viewing interface 46, the viewer selects to display this information preferably by selecting a control in message window 234. In viewing interface 46', it is preferably accomplished by selecting a menu item from a general list and selecting a subset of records from successive menus. In interface 46", a list is always displayed by default in window 554. Alternately, a filter can be selected to view specific feedback messages having that filter's attribute, date, context, etc. Techniques for providing selections from menus or other controls are well known to those skilled in the art. Alternatively, a reviewer can select to display specific feedback record content by "double clicking" a right mouse button when the mouse is pointing to a segment bar graph or by similarly selecting a segment or organizational tree heading/category.

If the viewer has not selected to display specific feedback records, step 424 is implemented, which asks if the viewer has selected to quit from the viewing interface (i.e. "visualizer"). If so, the process is complete as indicated in step 425. If "quit" is not selected, the process loops back to step 418.

If the viewer selected to display a list of requested records in step 422, then step 426 is initiated, in which a list of requested feedback records is displayed, preferably in a separate window or screen. In viewing interface 46, the records displayed in the list are preferably the visualizer records currently in the combined set of selected records. In viewing interface 46', the reviewer can select a subset of feedback records from menus; or, in the alternate embodiment, if the viewer double-clicks a bar graph, the records displayed in the list are the visualizer records having the double-clicked segment. The CPU can determine the number of visualizer records in the combined set by examining on/off field 382 of each visualizer record and incrementing a counter appropriately. Alternatively, a list of individual feedback records within a specified context can always be displayed, as in viewing interface 46".

In the next step 428, the CPU checks whether a specific record has been selected from the list of displayed records. If a specific feedback record has been selected, step 430 is implemented, in which the selected record's information (i.e., message) content from data portion 178 is displayed. This content is displayed in window 556 of viewing interface 46". Since the visualizer records in memory preferably do not include message data or other similar information, a selected visualizer record can reference its associated feedback record stored on the database 44. This is accomplished using feedback record number field 380, which is a pointer to the associated feedback record in the database. Once the feedback record is accessed, the message data can be sent to the viewing interface and displayed for the reviewer.

Once the reviewer has viewed the feedback record information, or if no record was chosen from the list in step 428, then in step 432 the CPU checks whether the reviewer is finished with the display of specific records. If not, the process loops back to step 426 to redisplay the list of records. If so, then the process continues to step 424, described previously.

Figure 26:
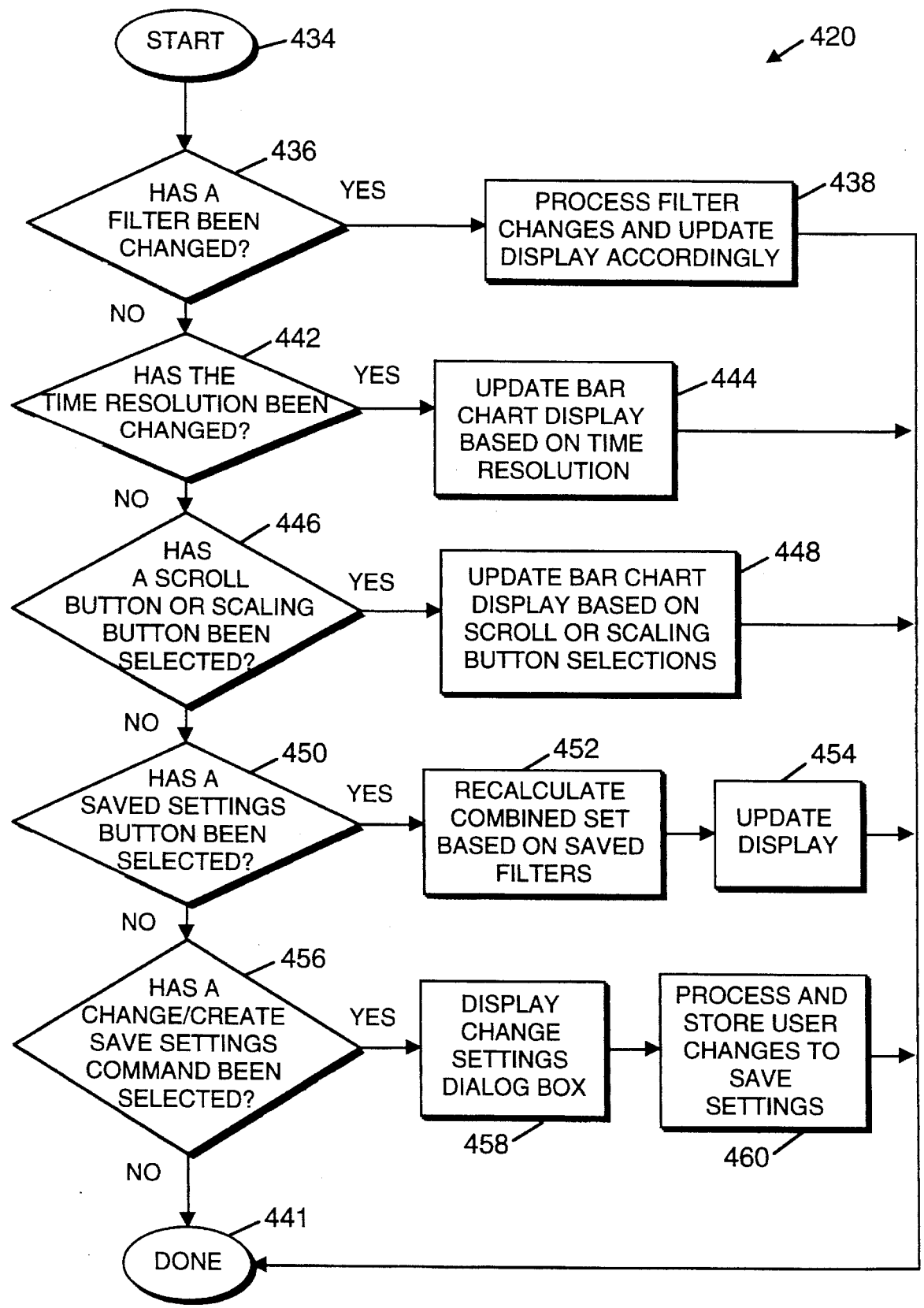
FIG. 26 is a flow diagram of the "Process changes" step of FIG. 25.

FIG. 26 is a flow diagram illustrating step 420 of FIG. 25. When the reviewer has changed the visualization criteria of viewing interface 46 or 46', the new visualizer record distribution is calculated and the results displayed. The viewing interface 46' is assumed to be the main embodiment in this process. A similar process can be implemented for other embodiments, such as viewing interface 46. The process begins in step 434, and, in a step 436, the CPU checks to determine whether a filter segment has been changed, i.e., selected or unselected. The CPU preferably checks all of the filters, including the attribute filters 224 or 224', the organizational charts (or category headings), and the time display settings (except for time resolution, which is checked in step 442 below). If a segment has been changed, the process continues to step 438, in which the filter changes are processed according to the type of command received by the reviewer. This step is described in greater detail below with reference to FIG. 27. In step 440, the data display is updated with the processed changes, and the process then is complete as indicated in step 441.

If a filter segment was not changed in step 436, then step 442 is initiated, in which the CPU checks whether the time resolution has been changed using resolution control 269 of viewing interface 46' (or one of fields 223 of interface 46). If the time resolution has been changed, step 444 is implemented, in which the bar chart display in time window 222' is updated according to the newly-chosen resolution. The process is then complete as indicated in step 441.

If the time resolution was not changed in step 442, then step 446 is initiated, in which the logic checks whether the reviewer has selected a scrolling button 273 to scroll the time window over bar graphs currently not displayed, or a scaling button 270 and 272 to change the horizontal and/or vertical scale of the time bar chart display. If a scroll or scaling button has been selected, the bar chart display is updated accordingly based on the scroll or scaling button selections, as shown in step 448. The process is then complete as indicated in step 441.

If no scroll or scaling buttons have been selected in step 446, step 450 is initiated, in which the CPU checks if a saved settings button 275 of viewing interface 46' has been selected. If so, step 452 is initiated to recalculate the combined set based on the saved selections of the reviewer. This calculation is accomplished as described with reference to FIG. 24. The recalculated settings are then displayed in step 454, and the process is complete at step 441. If a saved settings button was not selected, the CPU checks if a change/create save settings button 276 is selected in step 456. If so, step 458 is implemented, in which a dialog box or window for inputting the change settings is displayed. In step 460, the reviewer's input is processed and the current viewing interface settings are stored to a saved settings button. The process is then complete as indicated in step 441. If none of the above selections or changes have been implemented, the process is complete as indicated in step 441 and loops back to step 418 of FIG. 25. Other filters, menu selections, icons, or other selections can also cause the combined set to be recalculated and the various displays to be updated similarly to those filters and controls described above.

In the foregoing explanation the process has been described as if the checking steps 418, 422, and 424 of FIG. 25 and steps 436, 442, 446, 450, and 456 of FIG. 26 are serially executed. However, as described above with reference to FIG. 21, such a checking algorithm is not specifically required. Tho various described functions can be implemented as call routines which are executed when called. To call the functions, the reviewer can select the associated button, bar graph, tree heading, icon, etc. in the viewing interface. Alternatively, they could be called by selecting a menu item in a pull down menu, by keyboard commands or in any other suitable manner.

Figure 27:
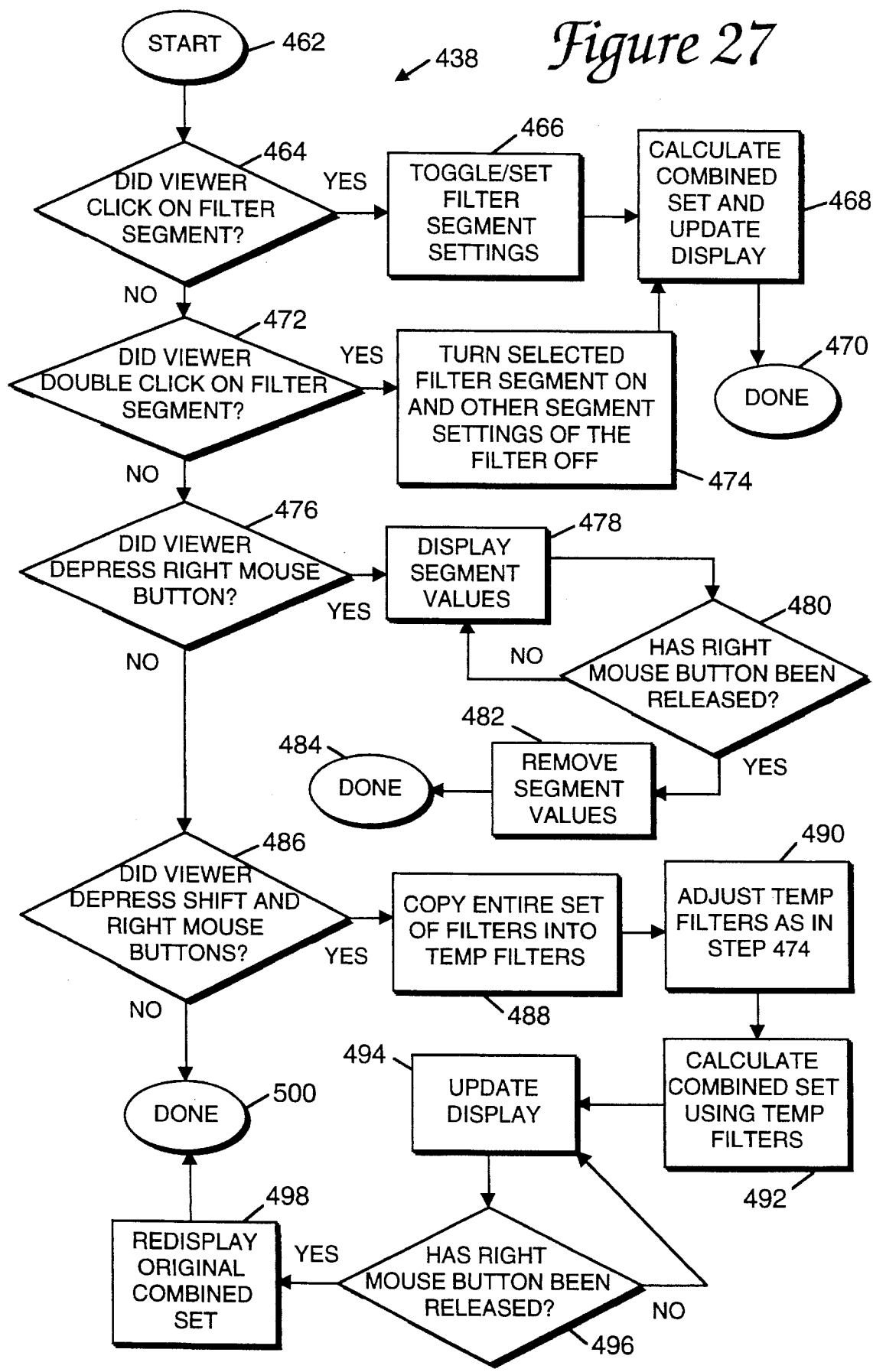
FIG. 27 is a flow diagram of the "Process filter changes and update display accordingly" step of FIG. 26.

FIG. 27 is a flow diagram 438 illustrating a preferred method of processing reviewer changes to segments in a filter and updating the display if necessary. In the description of the process that follows, it is assumed that the reviewer is using a mouse, pen, or similar pointing device that includes two buttons for inputting different types of input commands. Other input devices which allow different input commands, such as a keyboard, voice-recognizing software, etc. can also be used.

The process starts at step 462, and, in step 464, the CPU checks to determine whether the viewer made a single click of the standard button on a pointing device (typically the left button in mouse based systems) when the pointing device was pointing to a filter segment. The filter segment can be a bar chart of an attribute or time display, organization tree category, menu heading, etc. If such a selection is made, step 466 is implemented, in which the selected filter segment settings are toggled or set, i.e. the on/off flag for the selected segments are set appropriately. For example, a month time span can be selected, and this selection would set the segment on/off flag to "on" for every day segment occurring within the selected month. Thereafter, in step 468, the combined set is calculated according to the new segment selections as described above with reference to FIG. 24, and the display is updated with the newly-calculated combined set. The process is then complete as indicated at 470.

If the viewer did not single click on a filter segment, step 472 is implemented, in which the CPU checks if the reviewer "double-clicked" on a filter segment, preferably with the same mouse or pointer button used in step 464. If so, step 474 is implemented, in which the selected filter segment is turned on (i.e. made active) and the other segments of that filter are turned off (made inactive). For example, if the reviewer double clicks on the "problem" situation attribute segment, "problem" is checked (turned on) while all the other situation attribute segments ("question", "suggestion", "disaster", etc.) are unchecked (turned off). If the reviewer double-clicks an organizational tree category, all the other categories in the tree are turned off. The process then continues to step 468 to recalculate the combined set based on the filter changes and update the display. The process is then complete as shown in step 470.

If the reviewer did not double click on a filter segment, step 476 is implemented, in which the CPU checks whether the viewer depressed a second button on the pointing device, as for example, the right mouse button. If so, step 478 is implemented, in which segment values are displayed. Each segment has a value associated with it which represents the number of feedback records having that segment. Some of the segment values are already preferably displayed as bar charts. Step 478 will preferably display the value in numeric form in a new window or dialog box. Alternatively, a segment value can be displayed next to the bar chart or category heading that represents it. After step 478, step 480 is implemented, in which the CPU checks whether the right mouse button has been released. If not, the segment values continue to be displayed in step 478. If the right mouse button is released, the segment values are removed from the screen in step 482 and the process is complete as indicated in step 484. The segment values are thus preferably displayed only as long as the right mouse button is continuously depressed.

If the reviewer did not depress the right mouse button in step 476, the CPU checks if the viewer has depressed the SHIFT key on a keyboard and the right mouse button concurrently in step 486. Other combinations of input buttons and/or keys can also be used, such as a third mouse button. If the SHIFT and right mouse buttons are depressed, step 488 is initiated, in which all of the settings of the filters of the viewing interface are copied into a set of temporary filters. In step 490, the temporary filters are adjusted in a similar fashion as described in step 474 when a double click is selected, i.e. the selected segment is turned on and the other segments of that filter are turned off. In step 492, the combined set is calculated as described with reference to FIG. 24 using the temporary filter settings. In step 494, the newly-calculated combined set is displayed in the viewing interface. In step 496, the CPU checks if the right mouse button has been released; if not, the combined set based on the temporary filters continues to be displayed in step 494. If the right mouse button has been released, the original combined set of the filter settings before step 486 is redisplayed in the viewing interface, and the process is complete as indicated in step 500.

Similarly to FIGS. 21, 25, and 26, the checking steps 464, 472, and 476 and 486 of FIG. 27 are described as being serially implemented. The various described functions stemming from these decision steps can also be implemented as call routines which are executed when called. The reviewer can select specific buttons to call an associated routine. Alternatively, the routines could be called by selecting a menu item in a pull down menu or in any other suitable manner.

Although only a few embodiments of the present invention have been described in detail herein, it should be understood that the present invention may be embodied in many other specific forms without departing from the spirit or scope of the invention. Particularly, although specific user interfaces have been described for obtaining the feedback records, it should be apparent that a wide variety of different display based interfaces can be used to obtain the desired feedback. In addition to display based interfaces, the interfaces could be voice activated or receive inputs through a wide variety of different input mechanisms as well. The actual contents of the feedback records may also be widely varied to suit the needs of a particular system. For example, in simplified systems, many of the described fields may be eliminated. One of the features of the described feedback system is that the user is given the ability to select predefined specific attributes that describe the nature of the feedback itself. Although specific attributes have been described, the appropriate attributes for a given situation may vary widely and may be widely varied.

Similarly, although a specific visualizer interface has been described in detail, it should be apparent that a wide variety of alternative visualizer interfaces could be used to visualize the data in accordance with the invention. For example, filters based on the organizational structure of the reviewing group have been discussed. However, in many applications, such a filter would not be necessary. Similarly, the gathering of data based on the physical location of the feedback source has been described in conjunction with the ability to filter information based on this information. Again, in many instances, such a level of detail would not be necessary or even desired. Accordingly, in such systems, this filtering aspect of the visualizer could be eliminated. Further, the data gathering on the user interface side could also be eliminated. A system for filtering feedback records based on the time of the feedback has also been described. However, again, in many applications, there would be no need to provide such filtering or even record such data in the feedback records in the first place.

The feedback system of the present invention has been described as applied to various specific implementations. For example, feedback in association with instructional materials; manuals; products being tested by users; and training material are all contemplated. However, it should be appreciated that the described feedback system may be used in a wide variety of other situations as well. For example, the described feedback system may be incorporated directly into products so that manufacturers can continually receive feedback as to the use of their products. A feedback interface and feedback system can also be provided as an add-on device for a pre-existing product. For example, a feedback software module can be added to a computer system as add-on software to provide user feedback within application programs previously being used on the computer system, such as word processors. Similarly, the feedback system can be used in connection with automated telecommunications equipment such as voice mail systems, interactive TV activities, home shopping, automatic answering systems and automated teletransaction systems. It can even be incorporated into devices such as ATMs, photocopy machines and the like. Thus, it should be appreciated that the described feedback system can be applied to a wide variety of applications. In some such systems, it may be desirable to permit tho recordation of voice or graphic messages in addition to textual feedback. Therefore, the present examples and embodiments are to be considered as illustrative and not restrictive, and the invention is not to be limited to the details given herein, but may be modified within the scope of the appended claims.

What is claimed is:

1. A method for acquiring user feedback from a user during operation of a computer environment, wherein the computer environment includes an enter feedback mode command that the user may activate to provide feedback and wherein when an enter feedback mode command is received, the method comprises the steps of:

creating a feedback record in response to a user activating said enter feedback mode command;

recording the user's feedback context within a product, process, service, or issue in the feedback record after said enter feedback mode command has been activated, the feedback record being independent of and separate from the product, process, service, or issue;

displaying a multiplicity of attributes that the user may select to identify the nature of the user feedback and displaying a plurality of attribute categories in which the attributes are arranged, each of the categories organizing a plurality of the attributes into a related group to readily describe and categorize the feedback entered by the user, the attributes being arranged in each category as different options for the user to select within each category; and recording the attributes selected by the user and each attribute category in the feedback record after said enter feedback mode command has been activated, wherein just one attribute in each category may be selected by the user and stored in the feedback record to describe the user's experiences as related to the particular category in which the one attribute is included, where the feedback record is available to be evaluated with a plurality of other feedback records by a reviewer who is interested in user feedback so that the reviewer can provide help to the user or improve the product, process, service, or issue, wherein the reviewer's analysis of a pattern and distribution of said feedback records in the categories is facilitated by providing the same categories in each of the feedback records.

2. A method as recited in claim 1 further comprising the step of recording the time and date at which the feedback is made in the feedback record.

3. A method as recited in claim 1 further comprising the step of recording an indication of the physical location of the user in the feedback record.

4. A method as recited in claim 1 further comprising the step of recording an identification of the user in the feedback record.

5. A method as recited in claim 1 further comprising the steps of recording comments made by the user in the feedback record.

6. A method as recited in claim 5 further comprising the step of displaying a feedback message box on a display screen of the computer system, the message box being arranged to receive the comment inputs from the user.

7. A method as recited in claim 1 wherein the computer environment includes educational software.

8. A method as recited in claim 1 wherein the computer environment includes manual type software.

9. A method as recited in claim 1 wherein the computer environment includes test software.

10. A method as recited in claim 1 wherein the computer environment implements software and wherein the enter feedback mode command is provided within add-on software.

11. A method as recited in claim 1 wherein the feedback mode is entered by selecting a feedback icon displayed in a graphical user interface and a feedback dialog box is displayed when the feedback icon is selected, the dialog box including:

a plurality of attribute icons that serve as the attribute indicia; and a feedback message box arranged to receive comment inputs from the user.

12. A method as recited in claim 11 wherein the dialog box further includes at least one prompted feedback indicator that is selectable by the user, wherein when a prompted feedback indicator is selected, a list of feedback items most commonly entered by a plurality of users of the computer environment or other computer environments is presented to the user, wherein one of the common feedback items can be selected by the user to store the selected feedback item in the feedback record.

13. A method as recited in claim 12 wherein said list of feedback items includes only feedback items having said context of said user feedback and entered by said plurality of users.

14. A method as recited in claim 1 further comprising displaying the contents of at least one past feedback record when the user selects to view said past feedback record, the past feedback record being a stored feedback record previously entered by said user, and wherein said user can select said past feedback record to be the user's current feedback to said reviewer.

15. A method as recited in claim 14 wherein said user can view a subset of a plurality of past feedback records by selecting one of said attributes or by selecting a context, wherein only past feedback records having said selected attribute or selected context are displayed and may be selected as said user's current feedback.

16. A method as recited in claim 1 wherein the attributes are arranged in a plurality of attribute categories such that a plurality of attributes are included in each attribute category, and just one attribute in each attribute category may be selected by said user and stored in the feedback record.

17. A method as recited in claim 16 wherein the attribute categories include:

a situation category which includes a plurality of attributes indicative of the type of comments that the user would like to make;

a sharing category which includes a plurality of attributes indicative of whom the user would like to know the identity of the user; and a response category which includes a plurality of attributes indicative of the type or urgency of response from a reviewer that is desired by the user.

18. A method as recited in claim 16 wherein each of said attributes in an attribute category indicates a particular level in a sequential scale of attributes organized in that category, the scale of attributes providing a range of possible responses for the user between two extreme levels of the scale within the attribute category.

19. A method as recited in claim 1 further comprising a step of providing said feedback record to said reviewer using a computer network.

20. A feedback interface for collecting user feedback during use of a computer environment, the feedback interface comprising:

means for creating a feedback record, wherein the feedback record is created when a user inputs an enter feedback command, said feedback command being input during or subsequent to the user's experience of a product, process, service, or issue, wherein the user wishes to provide user feedback about the product, process, service or issue;

means for automatically determining a user's feedback context after the enter feedback command is input;

means for displaying an input area on a display screen in which the user is to input feedback data, said means for displaying including:

means for displaying a plurality of subject fields describing the feedback context, wherein the user can specify a different context for the user feedback by selecting a descriptive subject for at least one of said fields from a list of predefined subjects provided for each of said fields; and means for displaying a plurality of attributes which the user can select to define the feedback data, said displayed attributes being associated with said context displayed in said plurality of subject fields;

means for recording the feedback data, including the attributes and the feedback context, in the feedback record; and means for providing the feedback record to at least one reviewer who is interested in user feedback for improvement of the product, process, service, or issue or to help users of the computer environment.

21. A feedback interface as recited in claim 20 wherein said means for displaying displays the subject fields arranged in a hierarchy, and wherein the subject fields are provided in an order such that each subject field more narrowly defines the context than subject fields provided earlier in the order.

22. A feedback interface as recited in claim 21 wherein the means for displaying displays a message input area for the user to input a message, said message input area receiving text input from the user.

23. A feedback interface as recited in claim 21 wherein said means for displaying includes means for selecting a feedback mode, wherein said user can select said feedback mode from modes including a contribute mode, collaborate mode, and feedback mode, where said contribute mode allows said user to enter information that the user wishes to add to the computer environment, said collaborate mode allows said user to share information with at least one other user of said computer environment, and said feedback mode allows said user to provide feedback to said reviewer.

24. A feedback interface as recited in claim 20 wherein an appearance and function of said displayed attributes differ according to said displayed feedback context selected by said user and recorded by said means for recording, such that each feedback context is associated with its own set of attributes.

25. A feedback interface as recited in claim 16 wherein a subset of a set of standard menu selection icons is provided for a user of said computer environment to access functions and information of said computer environment, and wherein said means for displaying includes means for displaying said set of standard icons, such that said user can select one of said subset of provided icons or one of said standard icons not in said subset to comment about said selected icon.

26. A method as recited in claim 20 further comprising a step of automatically collecting system discernible attributes of a computer system implementing said computer environment and storing said system discernible attributes in said feedback record, said system discernible attributes including descriptions of a hardware platform of said computer system, components connected to said computer system, and an operating system in use on said computer system.

27. A method for acquiring user feedback from a user during use of a computer environment and a feedback environment, wherein the computer environment provides an enter feedback mode command that the user may activate to provide feedback concerning a context of a product, process, service, or issue experienced by the user, and wherein when an enter feedback mode command is received, the method comprises the steps of:

creating a feedback record in response to a user activating said enter feedback mode command, said enter feedback mode command being activated during or subsequent to the user's experience of said context when the user wishes to provide user feedback about the context;

recording the user's feedback context in the feedback record after said enter feedback mode command has been activated;

displaying a multiplicity of attribute indicia that the user may select to identify the nature of the user feedback, said attribute indicia being arranged into a plurality of attribute categories, each attribute category including a plurality of attributes;

displaying a prompted feedback indicator that is selectable by the user, wherein when the prompted feedback indicator is selected, a list of feedback items that have been previously entered by a plurality of users of the feedback environment is presented to the user so as to enable the user to quickly select and enter feedback that matches any of the listed feedback items and thereby reinforce the importance of the selected feedback item to users of the feedback environment; and recording selected attributes in the feedback record after said enter feedback mode command has been activated, the attributes identifying the nature of the feedback provided by the user, wherein just one attribute in each attribute category may be selected by the user and stored in the feedback record, and wherein the feedback record is one of a plurality of feedback records available to a reviewer of feedback who is interested in user feedback for improvement of the product, process, service, or issue or to help users of the computer environment or the feedback environment.

28. A method as recited in claim 27 further comprising the step of recording an indication of the physical location of the user in the feedback record.

29. A method as recited in claim 28 further comprising the step of recording a personal identification of the user in the feedback record.

30. A method as recited in claim 29 further comprising the step of recording organizational attributes of the user within an organizational hierarchy in the feedback record, said organizational attributes including the user's company, department, and title in a business organization.

31. A method as recited in claim 27 wherein each feedback record is arranged to store a description of the technical attributes of a computer system implementing the computer environment on which the feedback record was created, said technical attributes including a hardware platform of said computer system, components connected to said computer system, and an operating system in use on said computer system.

32. A method as recited in claim 27 wherein said list of feedback items only includes a predetermined number of the most commonly-entered feedback items previously input by a plurality of users of the feedback environment, wherein one of the common feedback items can be selected by the user to store the selected common feedback item in the feedback record, and wherein when a feedback item in said list is selected by the user, at least one attribute associated with the selected feedback item is automatically selected and recorded in said feedback record.

33. A method as recited in claim 32 wherein the displayed attribute categories include:

a situation category which includes a plurality of attributes indicative of the type of comments that the user would like to make;

a sharing category which includes a plurality of attributes indicative of whom the user would like to know the identity of the user; and a response category which includes a plurality of attributes indicative of the speed of response that is desired by the user from a reviewer.

34. A method as recited in claim 33 wherein said situation category includes attributes of problem, idea, suggestion, complaint, and disaster.

35. A method as recited in claim 32 wherein each of said attributes in a category indicates a particular level in a sequential scale of attributes organized in that category, the scale of attributes providing a range of possible responses for the user between two extreme levels of the scale within the attribute category.

36. A method as recited in claim 32 wherein an appearance and meaning of said displayed categories and attributes change depending on the feedback context of the user.

37. A method as recited in claim 27 wherein said list of feedback items includes reviewer feedback items provided by a reviewer of said feedback from one or more of said plurality of users, said reviewer feedback items indicating a subject of interest provided by a reviewer, said reviewer feedback items being selectable by the user to store the selected reviewer feedback item in the feedback record such that said reviewer receives user feedback relation to the reviewer feedback items.

38. A method as recited in claim 27 wherein said list of feedback items only includes feedback items having said context of said user feedback.

39. A method as recited in claim 27 wherein said feedback items in said list each include a feedback message that was previously sent to a reviewer by a user of said feedback environment.

40. A method as recited in claim 27 wherein said feedback is entered by said user during display of document content in said computer environment, wherein the feedback concerns the document content, and wherein the user's location within the document content is recorded as said context in the feedback record after the enter feedback mode command has been activated.

* * * * *